(12) United States Patent
Haruguchi et al.

(10) Patent No.: US 11,047,981 B2
(45) Date of Patent: Jun. 29, 2021

(54) DISTANCE MEASUREMENT DEVICE

(71) Applicant: Panasonic Intellectual Property Management Co., Ltd., Osaka (JP)

(72) Inventors: Takashi Haruguchi, Kyoto (JP); Toshihiro Koga, Osaka (JP); Masaharu Fukakusa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 489 days.

(21) Appl. No.: 16/038,210

(22) Filed: Jul. 18, 2018

(65) Prior Publication Data

US 2019/0041515 A1 Feb. 7, 2019

(30) Foreign Application Priority Data

Aug. 2, 2017 (JP) .............................. JP2017-150300
Aug. 4, 2017 (JP) .............................. JP2017-151919
(Continued)

(51) Int. Cl.
*G01C 3/08* (2006.01)
*G01S 17/08* (2006.01)
(Continued)

(52) U.S. Cl.
CPC ............ *G01S 17/08* (2013.01); *G01S 7/4812* (2013.01); *G01S 7/4813* (2013.01);
(Continued)

(58) Field of Classification Search
CPC ........ G01S 17/08; G01S 17/42; G01S 7/4812; G01S 7/4813; G01S 7/4817; G01S 7/4865
(Continued)

(56) References Cited

U.S. PATENT DOCUMENTS

| 7,545,485 B2 * | 6/2009 | Okada ................... G01S 7/4812 356/4.01 |
| 2005/0024625 A1 * | 2/2005 | Mori ....................... G01S 17/42 356/4.01 |

(Continued)

FOREIGN PATENT DOCUMENTS

| CN | 105467398 | 4/2016 | |
| DE | 2015200224 A1 * | 7/2016 | ........... G01S 7/4812 |
| JP | 408194061 A * | 7/1996 | |

*Primary Examiner* — Mark Hellner
(74) *Attorney, Agent, or Firm* — McDermott Will and Emery LLP

(57) ABSTRACT

There is provided a distance measurement device that can successfully take in reflected light from a distance measurement area, and at the same time, can achieve compactness of the distance measurement device. The distance measurement device includes a fixed part, a rotating part that is rotatably disposed on the fixed part, a laser light source that is disposed in the fixed part, and a photodetector that is disposed in the fixed part. The distance measurement device further includes a beam splitter that is disposed in the fixed part and separates an optical path of projection light emitted from the laser light source from an optical path of reflected light reflected by a distance measurement area and an imaging lens that is disposed in a common optical path of projection light and reflected light and is used for taking in reflected light reflected by the distance measurement area.

19 Claims, 49 Drawing Sheets

(30) Foreign Application Priority Data

Aug. 23, 2017 (JP) .............................. JP2017-160424
Aug. 23, 2017 (JP) .............................. JP2017-160426

(51) Int. Cl.
  *G01S 7/481* (2006.01)
  *G01S 7/4865* (2020.01)
  *G01S 17/42* (2006.01)

(52) U.S. Cl.
  CPC .......... *G01S 7/4817* (2013.01); *G01S 7/4865* (2013.01); *G01S 17/42* (2013.01)

(58) Field of Classification Search
  USPC ...................................................... 356/4.01
  See application file for complete search history.

(56) References Cited

U.S. PATENT DOCUMENTS

| | | | | |
|---|---|---|---|---|
| 2008/0075325 A1* | 3/2008 | Otani | ................... | G01C 15/002 |
| | | | | 382/106 |
| 2012/0218546 A1* | 8/2012 | Ogawa | .................. | G01S 7/4812 |
| | | | | 356/243.1 |
| 2016/0011311 A1* | 1/2016 | Mushimoto | ........... | G01S 7/4817 |
| | | | | 250/236 |

* cited by examiner

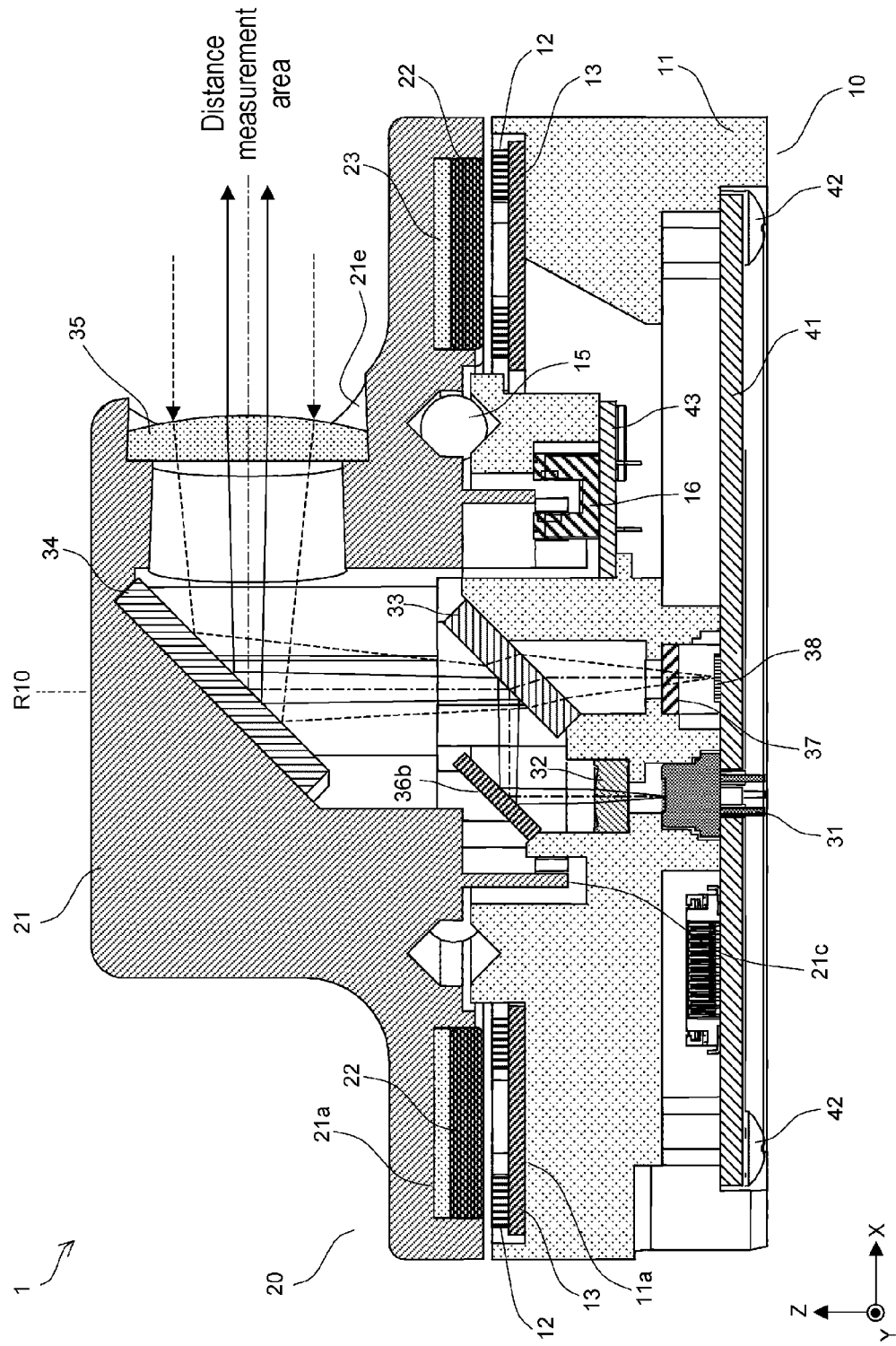

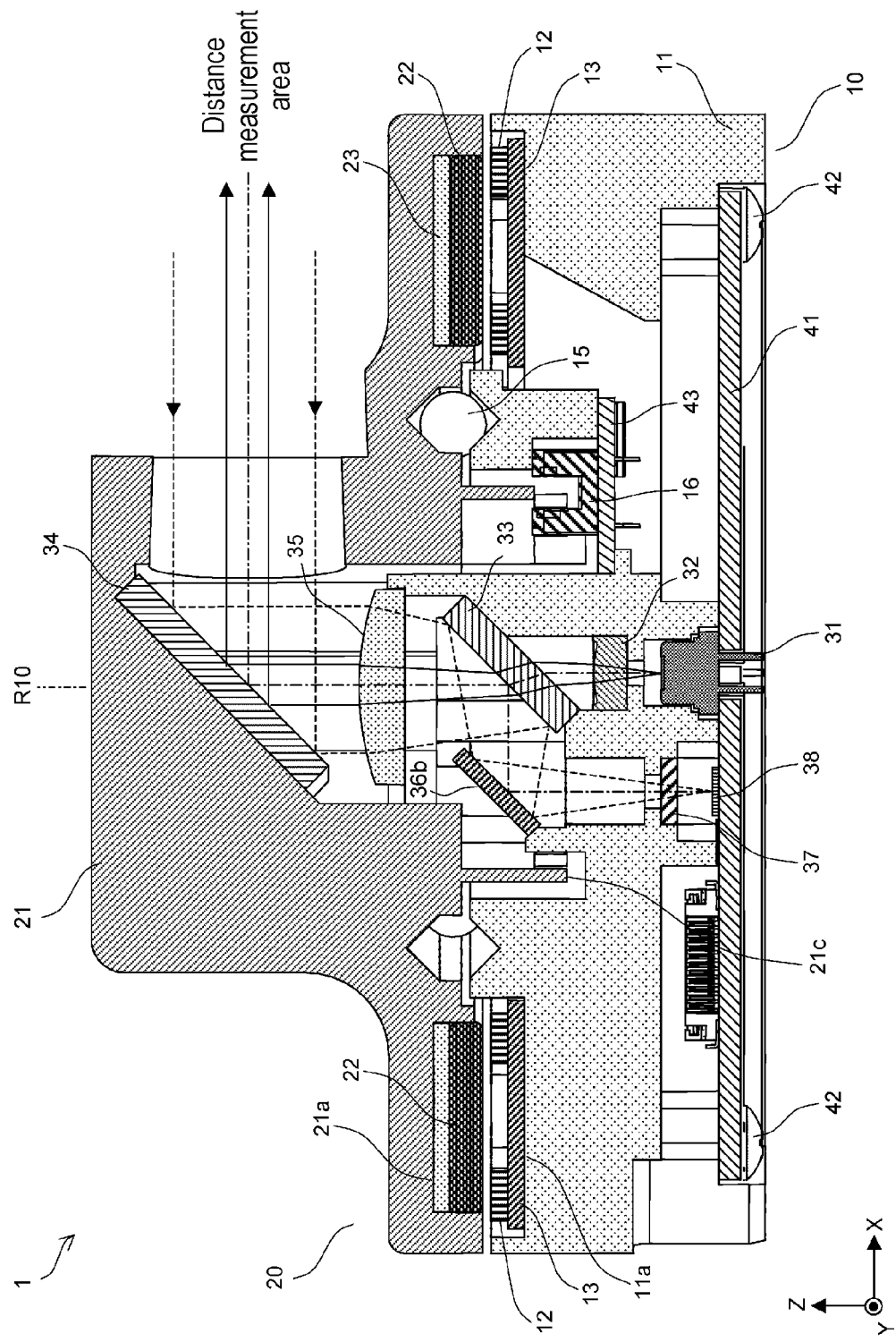

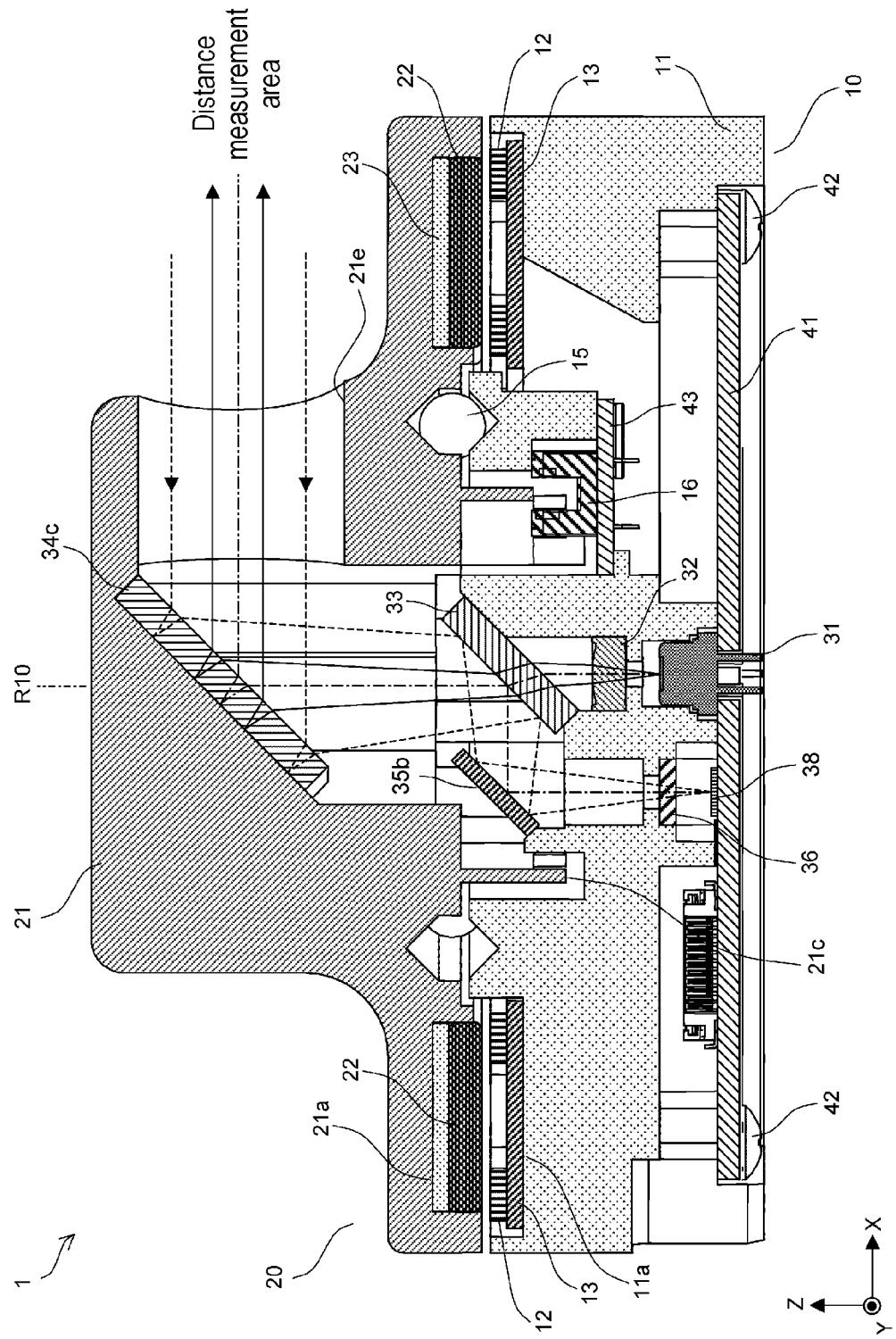

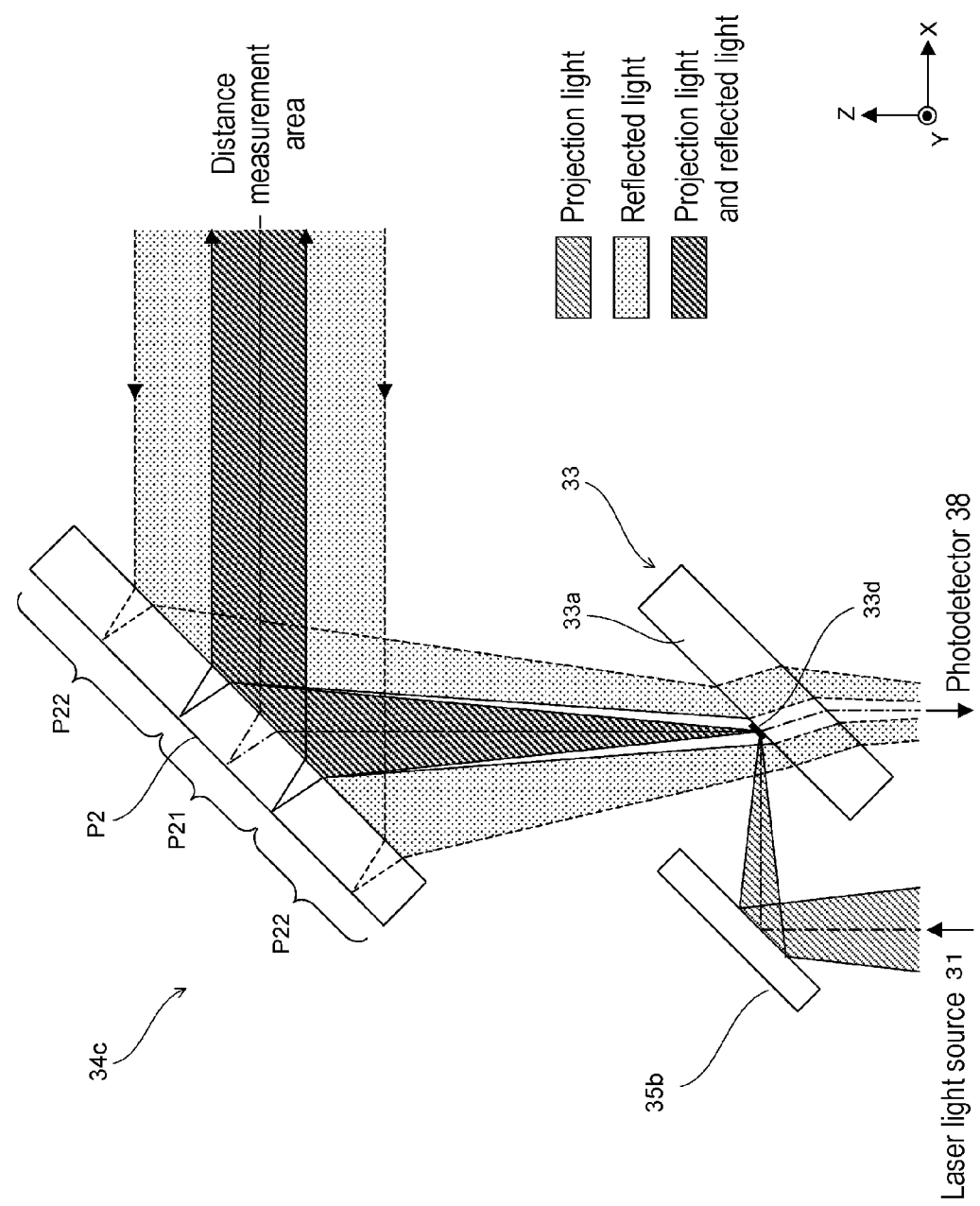

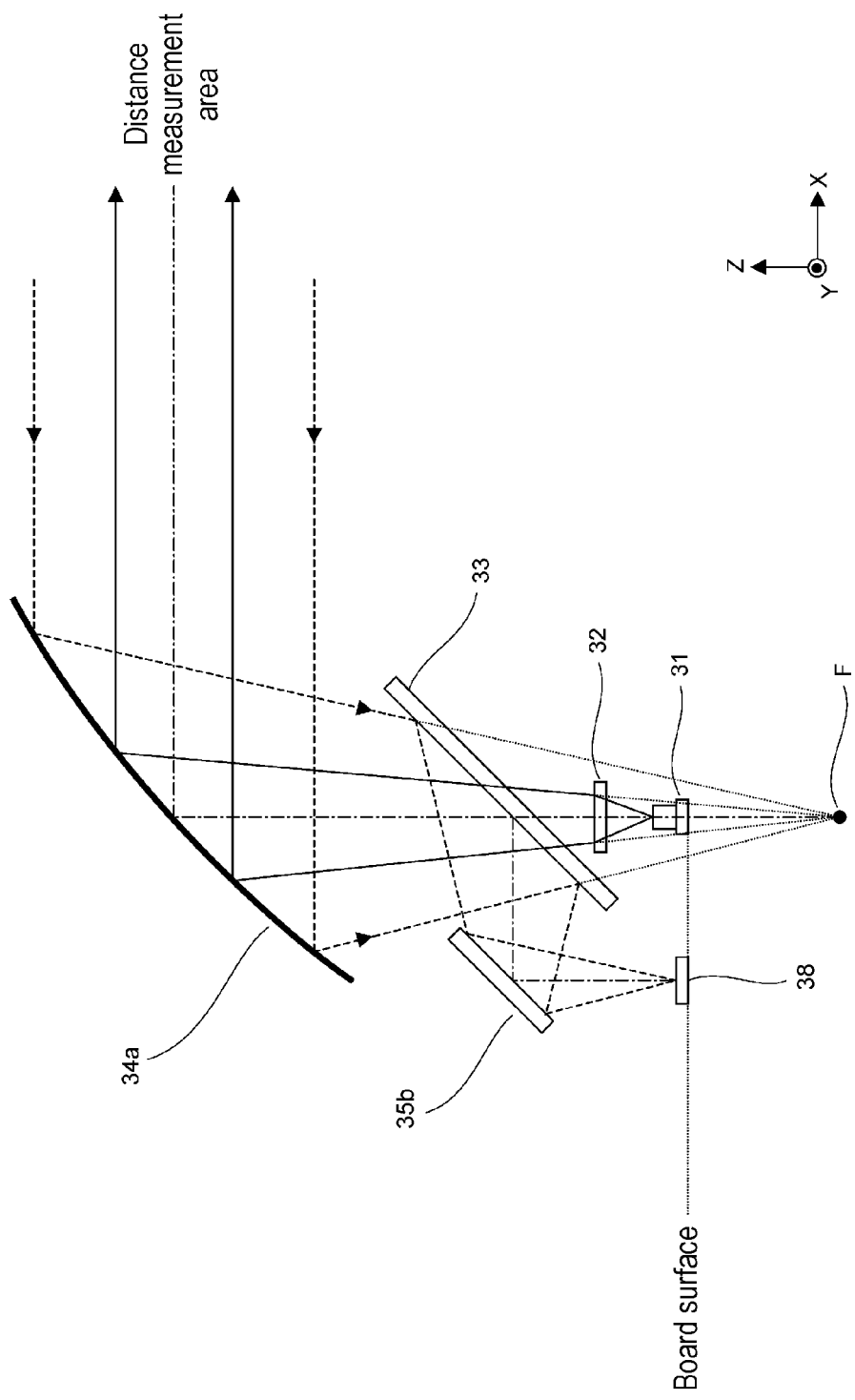

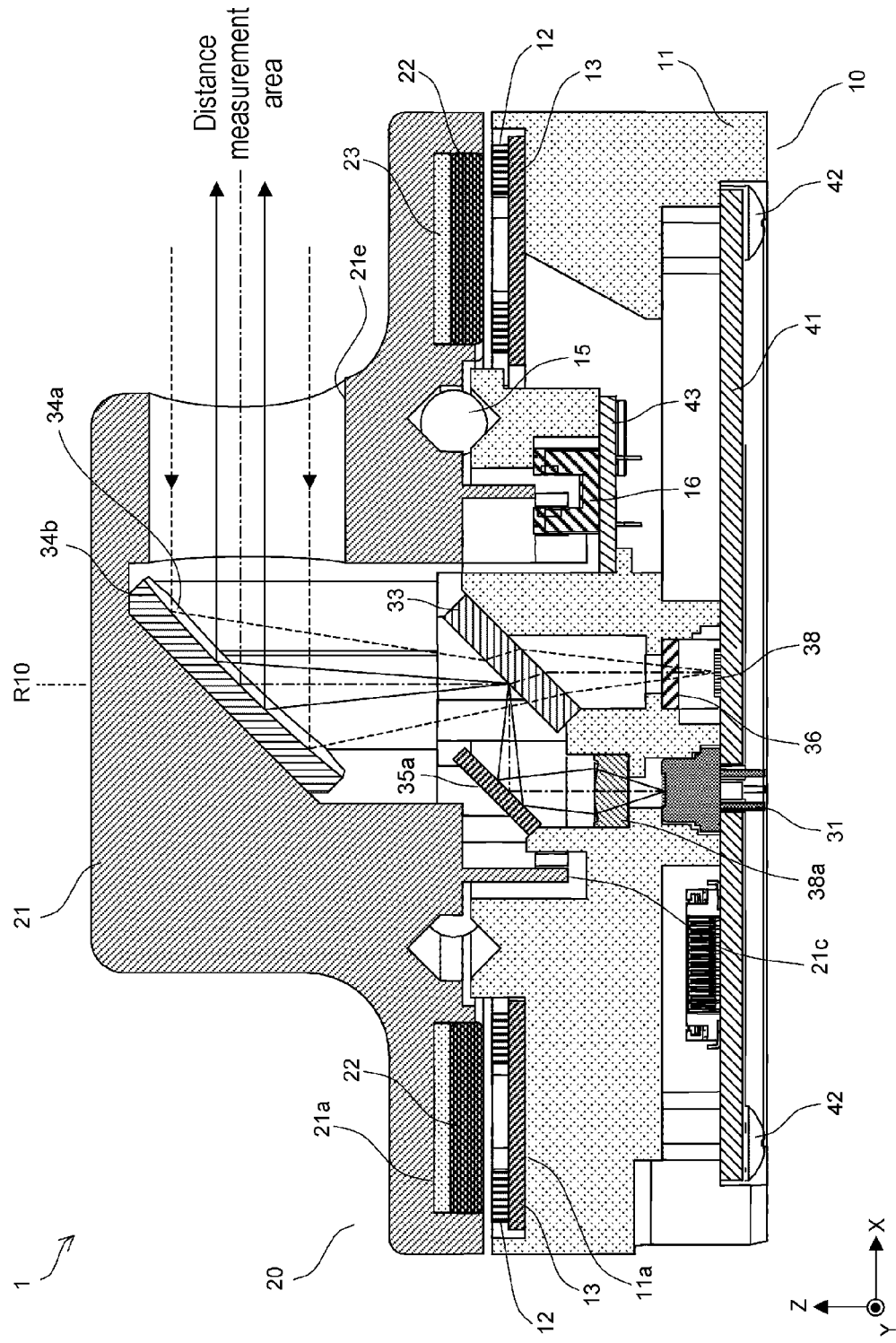

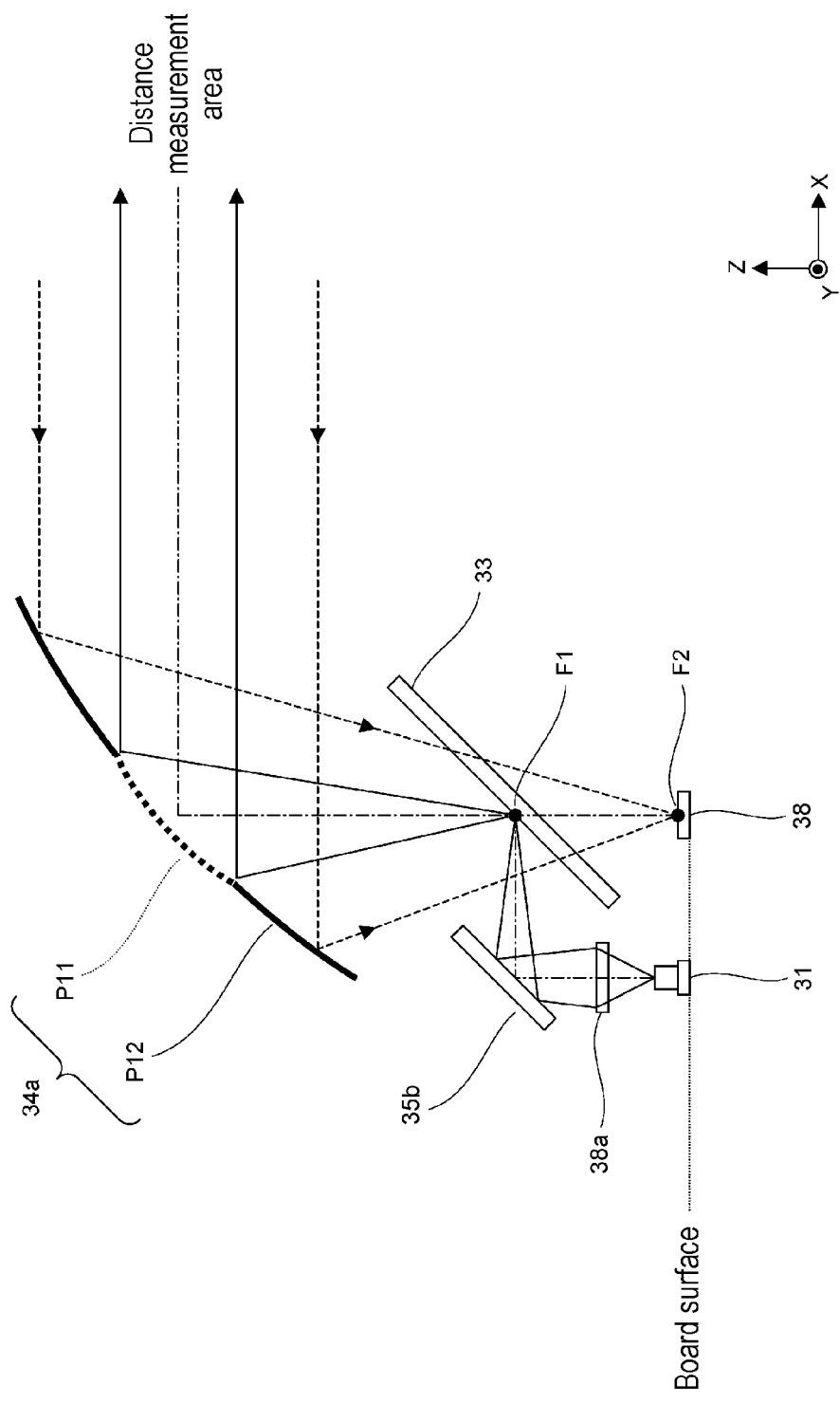

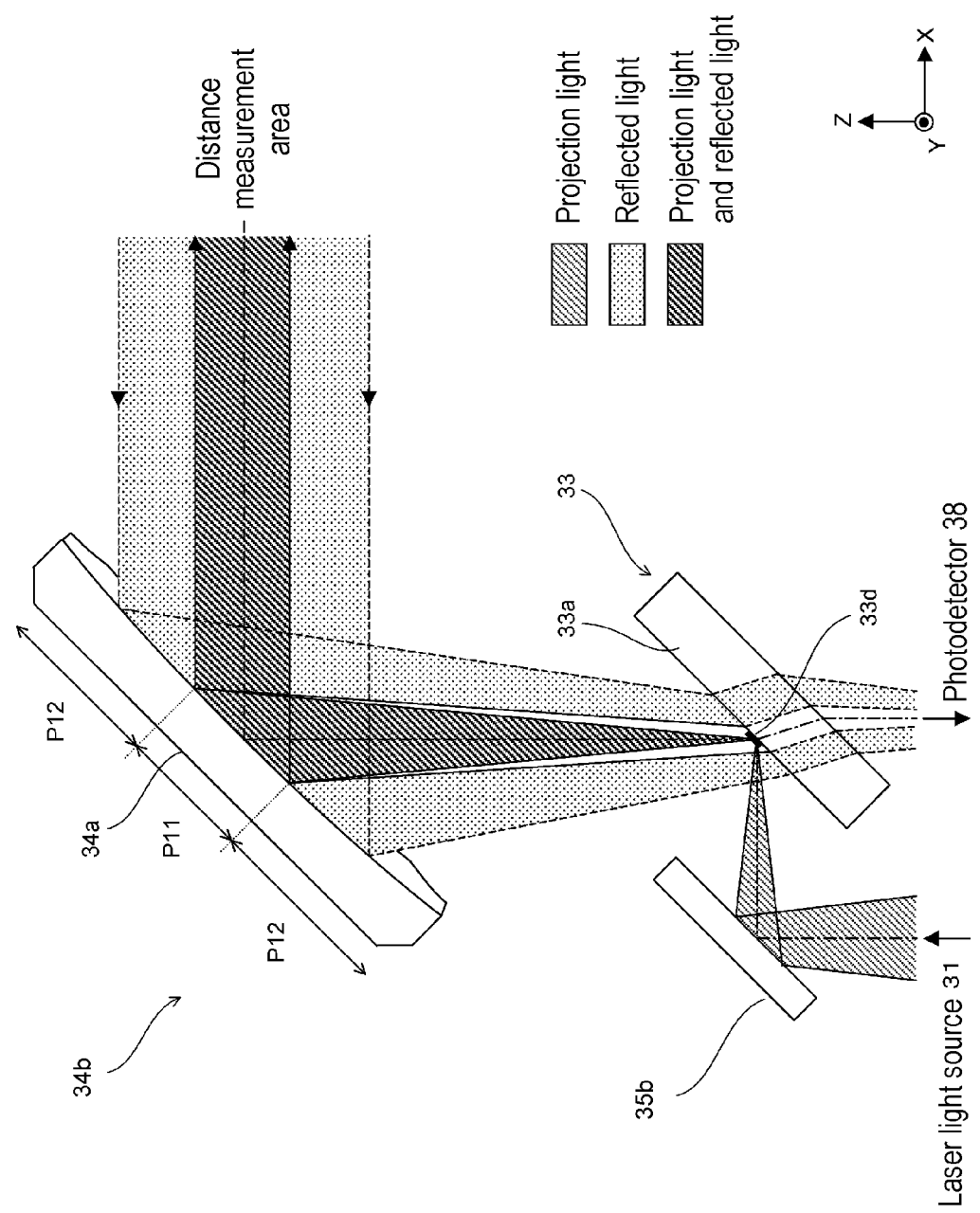

DISTANCE MEASUREMENT DEVICE

BACKGROUND

1. Technical Field

The present disclosure relates to a distance measurement device that measures a distance to an object using light.

2. Description of the Related Art

Conventionally, a distance measurement device that measures a distance to an object using light has been incorporated in various apparatuses. For example, a system using triangulation method has been known as a system of measuring a distance using light. This system measures the distance to an object based on an angle between a light emission direction and a traveling direction of reflected light generated by reflection of the light on the object. When the distance to the object is long, however, it is difficult for this system to accurately measure the distance. To solve such a problem, it is possible to employ a system of measuring the distance to an object based on time (runtime) required from light emission to receiving of reflected light.

The following PTL 1 describes a distance measurement device that measures a distance to an object based on runtime. In the distance measurement device, an imaging lens is disposed on a fixed side of the device, whereas a mirror rotating about an optical axis of the imaging lens is disposed on a rotating side of the device. The mirror is disposed to be inclined to the optical axis of the imaging lens by a predetermined angle. In addition, a light emitting element and a collimator lens are embedded in a center of the imaging lens. Light emitted from the light emitting element is converted into parallel light by the collimator lens, and the parallel light then travels along the optical axis of the imaging lens. This parallel light is reflected by the mirror to be projected on a distance measurement area. Reflected light from the distance measurement area is taken in by the imaging lens. The reflected light taken in by the imaging lens is condensed on a photodetector disposed on the fixed side of the device.

CITATION LIST

Patent Literature

PTL 1: Chinese Patent Application Publication No. 105467398

SUMMARY

A light emitting element is embedded in an imaging lens in a configuration of PTL 1, and thus an area of the imaging lens capable of taking in reflected light from an object is extremely limited. For this reason, a diameter of the imaging lens has to be increased to take in more reflected light, which leads to an increase in size of a fixed side of a device.

The present disclosure has been achieved in view of the above problems, and an object of the present disclosure is to provide a distance measurement device that can successfully take in reflected light from a distance measurement area, and at the same time, can achieve compactness of the device.

A main aspect of the present disclosure relates to a distance measurement device. The distance measurement device of the aspect includes a fixed part and a movable part that is movably disposed on the fixed part. A light source, a photodetector, and a beam splitter are disposed in the fixed part. The beam splitter separates an optical path of projection light emitted from the light source from an optical path of reflected light reflected by a distance measurement area. A reflecting member is disposed in the movable part. The reflecting member guides the projection light having passed through the beam splitter to the distance measurement area and guides the reflected light reflected by the distance measurement area to the beam splitter.

According to the distance measurement device of the present aspect, a lens part for taking in reflected light is disposed at a position different from the light source. It is thus possible to prevent a reduction in a quantity of light taken in due to the light source being disposed in the lens part. It is thus possible to take in reflected light from the distance measurement area more successfully by the lens part. In addition, the lens part is disposed at a position different from the light source, and thus it is not necessary to increase a diameter of the lens part for the purpose of increasing the quantity of reflected light taken in. Consequently, it is possible to prevent an increase in size of the distance measurement device according to an increase in size of the lens part. Moreover, the beam splitter separates the optical path of projection light emitted from the light source from the optical path of reflected light reflected by the distance measurement area. Consequently, even if the lens part is disposed in a common optical path, reflected light from the distance measurement area can be smoothly guided to the photodetector.

According to the main aspect of the present disclosure, the reflecting member is preferably a movable mirror.

Another main aspect of the present disclosure relates to a distance measurement device. The distance measurement device of the aspect includes a fixed part, a movable part that is rotatably disposed on the fixed part, a light source that is disposed in the fixed part, a photodetector that is disposed in the fixed part, and an imaging lens that is disposed in an optical path of projection light from the light source to a distance measurement area and condenses reflected light of the projection light reflected by the distance measurement area on the photodetector. A through-hole passing through the imaging lens is further formed in an area of the imaging lens through which the projection light passes.

According to the distance measurement device of the present aspect, the imaging lens and the light source are individually disposed, and thus it is not necessary to perform a complicated operation of placing the light source in the imaging lens. The through-hole passing through the imaging lens is formed in the area through which projection light passes. It is thus possible to prevent a part of projection light from being reflected on an incident surface of the imaging lens and becoming stray light, and to prevent such stray light from entering the photodetector.

Yet another main aspect of the present disclosure relates to a distance measurement device. The distance measurement device of the aspect includes a fixed part, a movable part that is rotatably disposed on the fixed part, a light source that is disposed in the fixed part and emits projection light for distance measurement, and a photodetector that is disposed in the fixed part and receives reflected light reflected by a distance measurement area. The distance measurement device further includes a beam splitter that is disposed in the fixed part and separates an optical path of projection light to the distance measurement area from an optical path of reflected light to the photodetector, and a Fresnel lens mirror that is disposed in the rotating part so as to be inclined to a common optical path of projection light and reflected light, guides projection light having passed through the beam splitter to the distance measurement area, and condenses the reflected light reflected by the distance measurement area on the photodetector.

According to the distance measurement device of the present aspect, reflected light is condensed by the Fresnel lens mirror, and thus it is not necessary to dispose an imaging lens in an optical system. It is thus possible to prevent an influence of stray light generated by the imaging lens. In addition, the Fresnel lens mirror is disposed so as to be inclined to the common optical path of projection light and reflected light. It is thus possible to prevent a part of projection light reflected by the Fresnel lens mirror from becoming stray light and being directed to the photodetector. Consequently, it is possible to prevent an influence of stray light on a detection signal. Moreover, the Fresnel lens mirror has a function as a mirror, that is, a function of reflecting projection light to the distance measurement area and reflecting reflected light from the distance measurement area to the photodetector and a function as a lens, that is, a function of condensing reflected light on the photodetector. A number of optical components disposed in the optical system can thus be reduced. Consequently, a configuration of the distance measurement device can be simplified.

Yet another main aspect of the present disclosure relates to a distance measurement device. The distance measurement device of the aspect includes a fixed part, a movable part that is rotatably disposed on the fixed part, a light source that is disposed in the fixed part and emits projection light for distance measurement, and a photodetector that is disposed in the fixed part and receives reflected light reflected by a distance measurement area. The distance measurement device further includes a beam splitter that is disposed in the fixed part and separates an optical path of projection light to the distance measurement area from an optical path of reflected light to the photodetector, and a parabolic mirror that is disposed in the rotating part so as to be inclined to a common optical path of projection light and reflected light, guides projection light having passed through the beam splitter to the distance measurement area, and condenses the reflected light reflected by the distance measurement area on the photodetector.

According to the distance measurement device of the present aspect, reflected light is condensed by the parabolic mirror, and thus it is not necessary to dispose an imaging lens in an optical system. It is thus possible to prevent an influence of stray light generated by the imaging lens. In addition, the parabolic mirror is disposed so as to be inclined to the common optical path of projection light and reflected light. It is thus possible to prevent a part of projection light reflected by the parabolic mirror from becoming stray light and being directed to the photodetector. Consequently, it is possible to prevent an influence of stray light on a detection signal. Moreover, the parabolic mirror has a function as a mirror, that is, a function of reflecting projection light to the distance measurement area and reflecting reflected light from the distance measurement area to the photodetector and a function as a lens, that is, a function of condensing reflected light on the photodetector. The number of optical components disposed in the optical system can thus be reduced. Consequently, the configuration of the distance measurement device can be simplified.

As described above, the distance measurement device of the present disclosure can successfully take in reflected light from a distance measurement area and at the same time, can effectively achieve compactness of the distance measurement device.

The distance measurement device of the present disclosure can eliminate a complicated operation and at the same time, can reduce an influence of stray light on a detection signal.

According to the distance measurement device of the present disclosure, it is possible to provide a distance measurement device in which an influence of stray light on a detection signal can be reduced with a simple configuration.

Effects or meanings of the present disclosure will be further clarified in the following description of the exemplary embodiments. However, the exemplary embodiments described below are merely examples in carrying out the present disclosure, and the present disclosure is not at all limited to the examples described in the following exemplary embodiments.

BRIEF DESCRIPTION OF THE DRAWINGS

FIG. 6 is a cross-sectional view showing a configuration of a distance measurement device according to a modification 1A;

FIG. 8 is a cross-sectional view showing a configuration of a distance measurement device according to a modification 1B;

FIG. 19 is a cross-sectional view showing the configuration of the distance measurement device according to the third exemplary embodiment;

FIG. 26 schematically shows a light beam area of laser light and reflected light near the beam splitter according to the modification 3A;

FIG. 33 is a cross-sectional view for explaining an optical action of a parabolic mirror according to the fourth exemplary embodiment;

FIG. 35 is a cross-sectional view showing a configuration of a distance measurement device according to a modification 4A;

FIG. 37 is a cross-sectional view for explaining an optical action of a parabolic mirror according to the modification 4A; and FIG. 38 schematically shows a light beam area of laser light and reflected light near the beam splitter according to the modification 4A.

DETAILED DESCRIPTION

Hereinafter, exemplary embodiments of the present disclosure will be described with reference to the drawings. For the sake of convenience, X, Y and Z axes perpendicular to one another are added to respective drawings. A direction of the Z axis is a height direction of distance measurement device 1.

First Exemplary Embodiment

Figure 1:
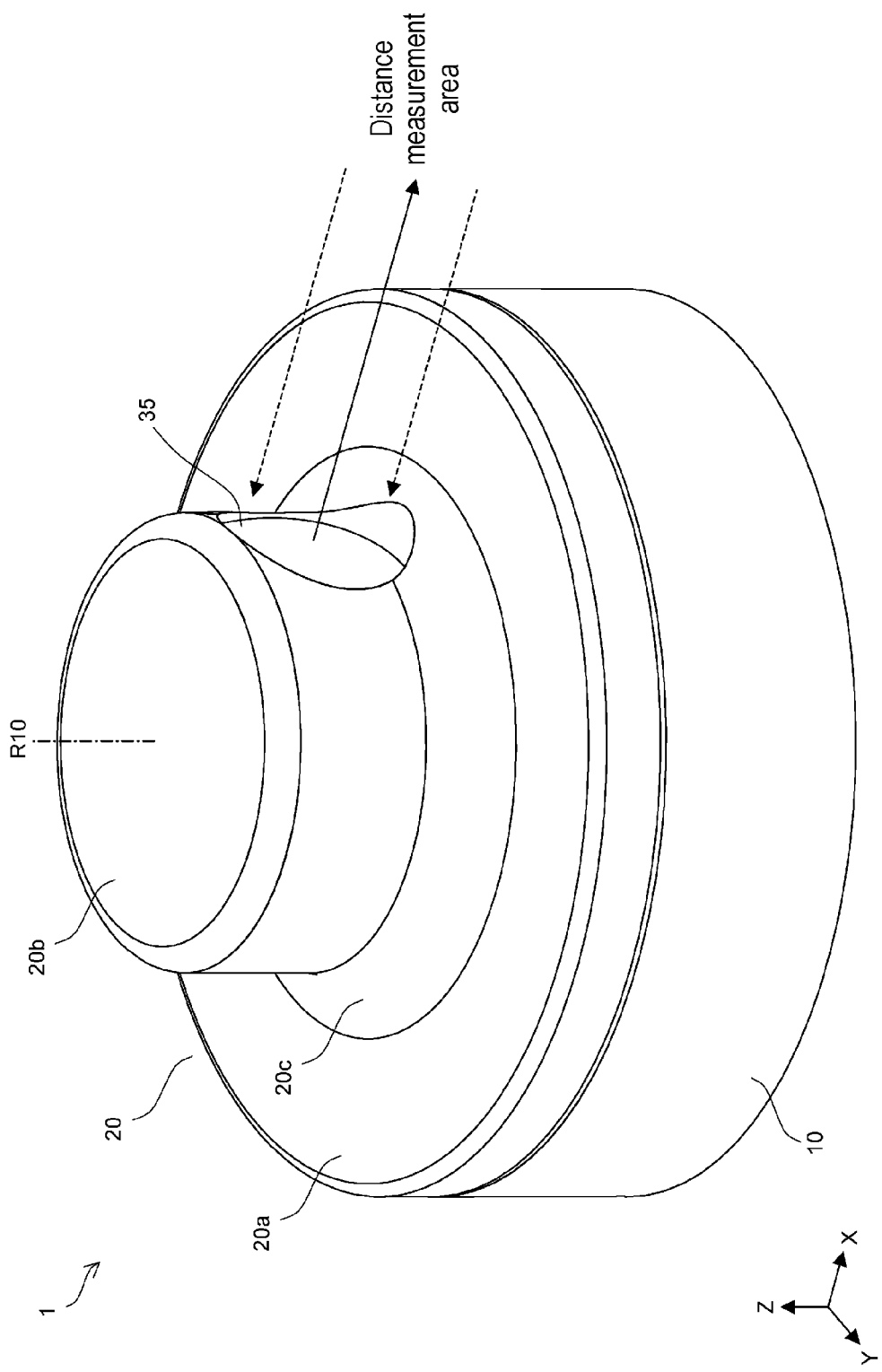
FIG. 1 is a perspective view showing a configuration of a distance measurement device according to a first exemplary embodiment.

FIG. 1 is a perspective view showing a configuration of distance measurement device 1 according to a first exemplary embodiment.

As shown in FIG. 1, distance measurement device 1 includes fixed part 10 formed in a cylindrical shape and rotating part 20 rotatably disposed on fixed part 10. Rotating part 20 is constituted by large diameter part 20a having a substantially same diameter as fixed part 10, small diameter part 20b having a smaller diameter than large diameter part 20a, and inclined part 20c connecting large diameter part 20a and small diameter part 20b. Large diameter part 20a and small diameter part 20b are both formed in a cylindrical shape. Fixed part 10, and large diameter part 20a and small diameter part 20b of rotating part 20 are coaxially disposed. Imaging lens 35 is disposed on a side surface of small diameter part 20b so as to be externally exposed. Laser light (projection light) is projected from imaging lens 35 to a distance measurement area. Imaging lens 35 constitutes a lens part taking in reflected light reflected from the distance measurement area.

Rotating part 20 rotates about rotating axis R10 that is parallel to the Z axis and passes through a center of small diameter part 20b. When rotating part 20 rotates, an optical axis of laser light projected from imaging lens 35 rotates about rotating axis R10. The distance measurement area is thus rotated accordingly. As described later, distance measurement device 1 measures a distance to an object present in the distance measurement area based on a time difference (runtime) between a timing when laser light is projected on the distance measurement area and a timing when reflected light of the laser light from the distance measurement area is received. Specifically, the time difference is multiplied by a speed of light, so that the distance to the object is calculated. As rotating part 20 rotates once about rotating axis R10 as described above, distance measurement device 1 can measure the distance to an object present in a range of 360°.

Figure 2:
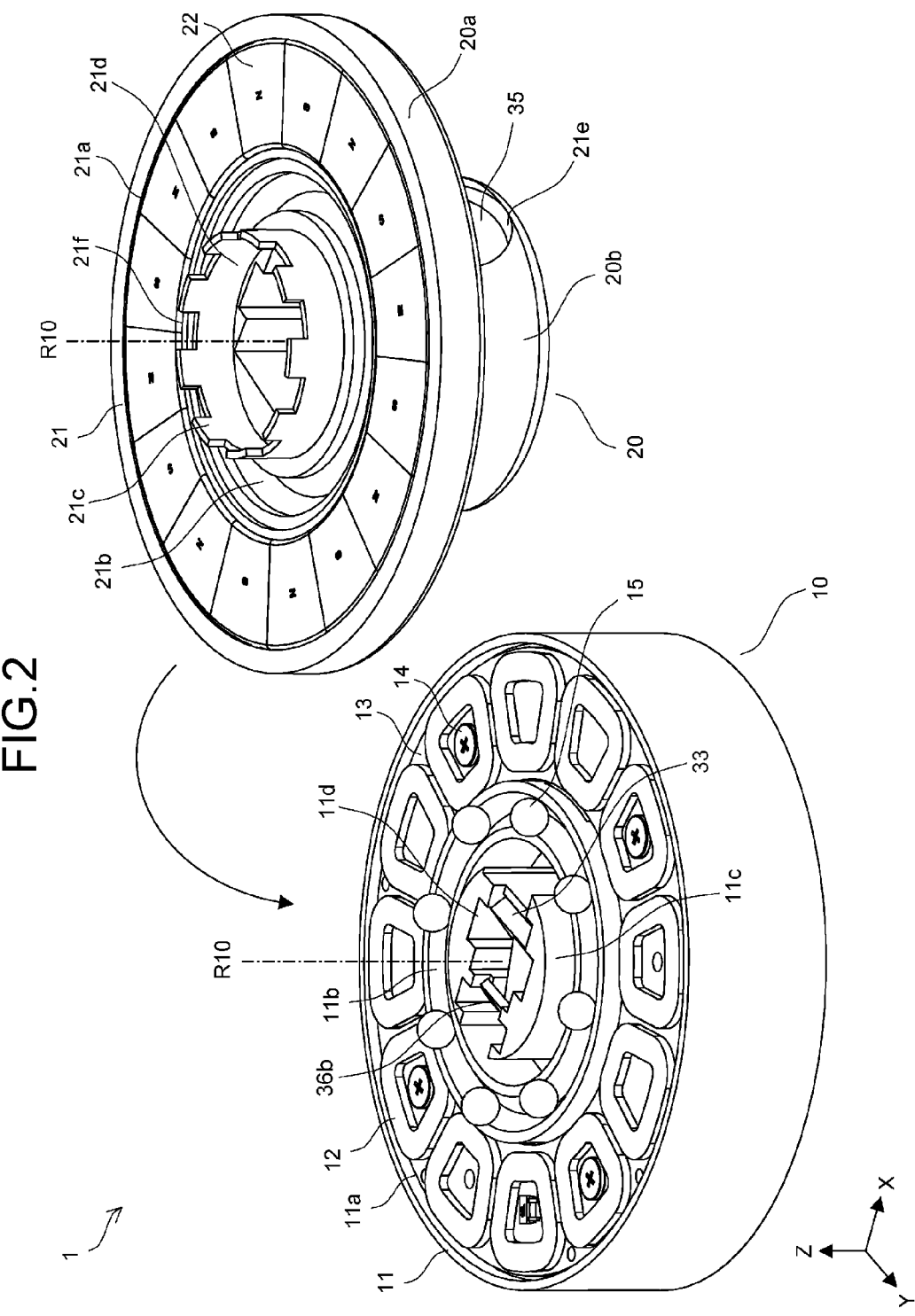
FIG. 2 is a perspective view showing the configuration of the distance measurement device according to the first exemplary embodiment in a state where a fixed part and a rotating part are separated from each other.

FIG. 2 is a perspective view showing the configuration of distance measurement device 1 in a state where fixed part 10 and rotating part 20 are separated from each other.

As shown in FIG. 2, fixed part 10 includes support base 11 formed in a cylindrical shape, coils 12, yoke 13, and bearing balls 15. Support base 11 is composed of, for example, a resin. Recess 11a is formed in an upper surface of support base 11 along a circumferential direction about rotating axis R10. Yoke 13, which is a thin plate, is fitted into recess 11a. Yoke 13 has a disc shape with a center part removed. Yoke 13 is fixed on support base 11 by screws 14.

In addition, a plurality of coils 12 are circumferentially arranged on an upper surface of yoke 13. In this case, 12 coils 12 are mounted on the upper surface of yoke 13. Yoke 13 constitutes a linear motor for rotating rotating part 20 with magnets 22 on a side of rotating part 20.

On the upper surface of support base 11, guide trench 11b with a fixed depth is formed inside of recess 11a to extend circumferentially. A shape of guide trench 11b cut along a plane vertical to the circumferential direction is a V-shape. Guide trench 11b extends circumferentially. Guide trench 11b is used for circumferentially guiding bearing balls 15. Bearing balls 15 are fitted into guide trench 11b. A spacer for keeping a constant distance between bearing balls 15 may be further fitted into guide trench 11b.

Projection 11c having a cylindrical shape is formed in a center part of support base 11, and recess 11d is formed in projection 11c. Optical members constituting an optical system to be described later are disposed in recess 11d. FIG. 2 shows beam splitter 33 and mirror 36b as the optical members.

FIG. 2 shows rotating part 20 upside down. Rotating part 20 includes support member 21 and magnets 22. Although not shown in FIG. 2, yoke 23 (see FIG. 3) is also placed in rotating part 20. In the state of FIG. 2, yoke 23 is covered by magnets 22.

Recess 21a is formed in large diameter part 20a of rotating part 20 along the circumferential direction about rotating axis R10. Yoke 23, which is a thin plate (see FIG. 3), is fitted into recess 21a. Yoke 23 has a disc shape with the center part removed. Yoke 23 is fixed on large diameter part 20a by thermosetting adhesives or integral molding of metal and resin.

In addition, a plurality of magnets 22 are circumferentially arranged so as to cover yoke 23. These magnets 22 are arranged in a manner that polarities of adjacent magnets 22 are opposite to each other. In this case, 16 magnets 22 are mounted so as to cover yoke 23. Magnets 22 constitute the linear motor for rotating rotating part 20 with coils 12 on a side of fixed part 10.

In support member 21, guide trench 21b with a fixed depth is formed inside of recess 21a to extend circumferentially. A shape of guide trench 21b cut along a plane vertical to the circumferential direction is a V-shape. Guide trench 21b extends circumferentially. Guide trench 21b is used for circumferentially guiding bearing balls 15 with guide trench 11b on the side of fixed part 10. When rotating part 20 is placed on fixed part 10 as shown in FIG. 1, bearing balls 15 are sandwiched between guide trench 11b on the side of fixed part 10 and guide trench 21b on the side of rotating part 20. Rotating part 20 is thus supported by fixed part 10 so as to be rotatable about rotating axis R10.

Wall 21c having a cylindrical shape is formed in a center part of support member 21, and opening 21d is formed inside of wall 21c. Rotating mirror 34 to be described later (see FIG. 3) is placed in opening 21d. Opening 21d is connected to opening 21e formed in the side surface of small diameter part 20b. Imaging lens 35 is placed in opening 21e. Cut-away parts 21f are circumferentially formed in wall 21c at fixed intervals. Cut-away part 21f is used for detecting a rotation state of rotating part 20.

When rotating part 20 is placed on fixed part 10 as described above, rotating part 20 is supported by fixed part 10 through bearing balls 15 so as to be rotatable about rotating axis R10. In this state, magnets 22 arranged on the side of rotating part 20 respectively face coils 12 arranged on the side of fixed part 10. In this way, the linear motor for driving rotating part 20 in a rotating direction is configured.

In addition, in this state, magnetic attraction force is generated between magnets 22 on the side of rotating part 20 and yoke 13 on the side of fixed part 10. This magnetic attraction force attracts rotating part 20 to fixed part 10, thus keeping a support state of rotating part 20 by fixed part 10. That is, yoke 13 constitutes a magnetic part generating magnetic attraction force for preventing fall-off of rotating part 20 between yoke 13 and magnets 22. Support base 11 may be composed of a magnetic body for the purpose of generating the magnetic attraction force.

Figure 3:
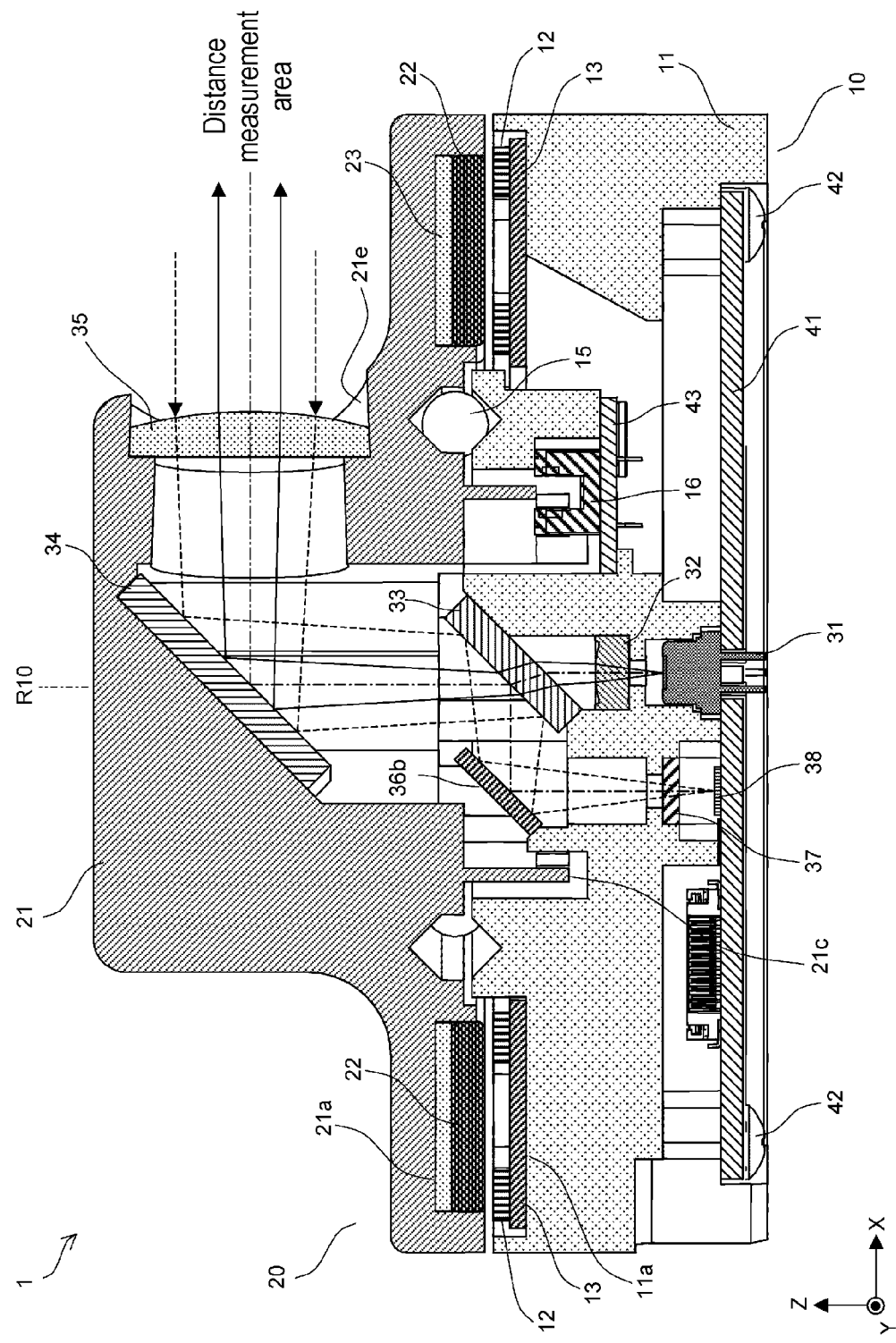
FIG. 3 is a cross-sectional view showing the configuration of the distance measurement device according to the first exemplary embodiment.

FIG. 3 is a cross-sectional view showing the configuration of distance measurement device 1. FIG. 3 is a cross-sectional view obtained by cutting distance measurement device 1 shown in FIG. 1 at a center position in a direction of the Y axis along a plane parallel to an X-Z plane. In FIG. 3, laser light (projection light) emitted from laser light source 31 to a distance measurement area is shown by solid lines, whereas reflected light reflected by the distance measurement area is shown by broken lines. A one-dot chain line drawn in the optical system shows an optical axis of the optical system.

As shown in FIG. 3, distance measurement device 1 includes, as components of the optical system, laser light source 31, relay lens 32, beam splitter 33, rotating mirror 34, imaging lens 35, mirror 36b, filter 37, and photodetector 38. Laser light source 31 and photodetector 38 are placed on circuit board 41. Relay lens 32, beam splitter 33, mirror 36b, and filter 37 are placed in support base 11 on the side of fixed part 10. Rotating mirror 34 and imaging lens 35 are placed in support member 21 of rotating part 20.

Laser light source 31 emits laser light of a predetermined wavelength. Laser light source 31 is, for example, a semiconductor laser. An emission optical axis of laser light source 31 is parallel to the Z axis. Laser light source 31 is placed on circuit board 41 placed on a lower surface of support base 11. Circuit board 41 is placed on the lower surface of support base 11 by screws 42. A radiation angle of laser light emitted from laser light source 31 is reduced by relay lens 32, and then the laser light enters beam splitter 33. Laser light is transmitted through beam splitter 33 to be directed to rotating mirror 34.

Figure 4A:
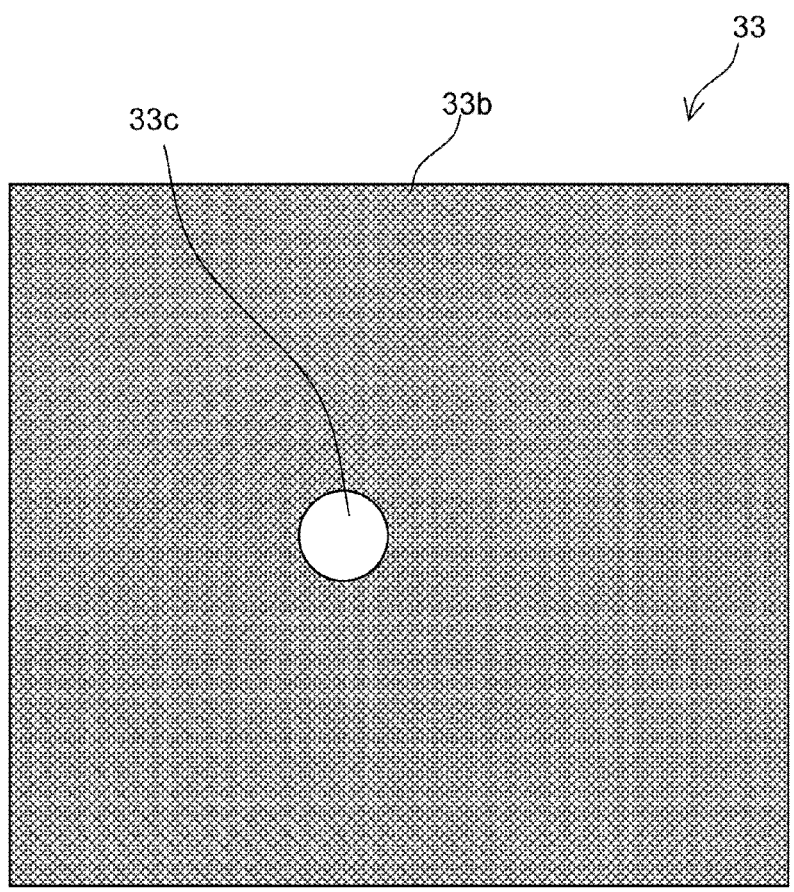
FIG. 4A is a plan view showing a configuration of a beam splitter according to the first exemplary embodiment.
Figure 4B:
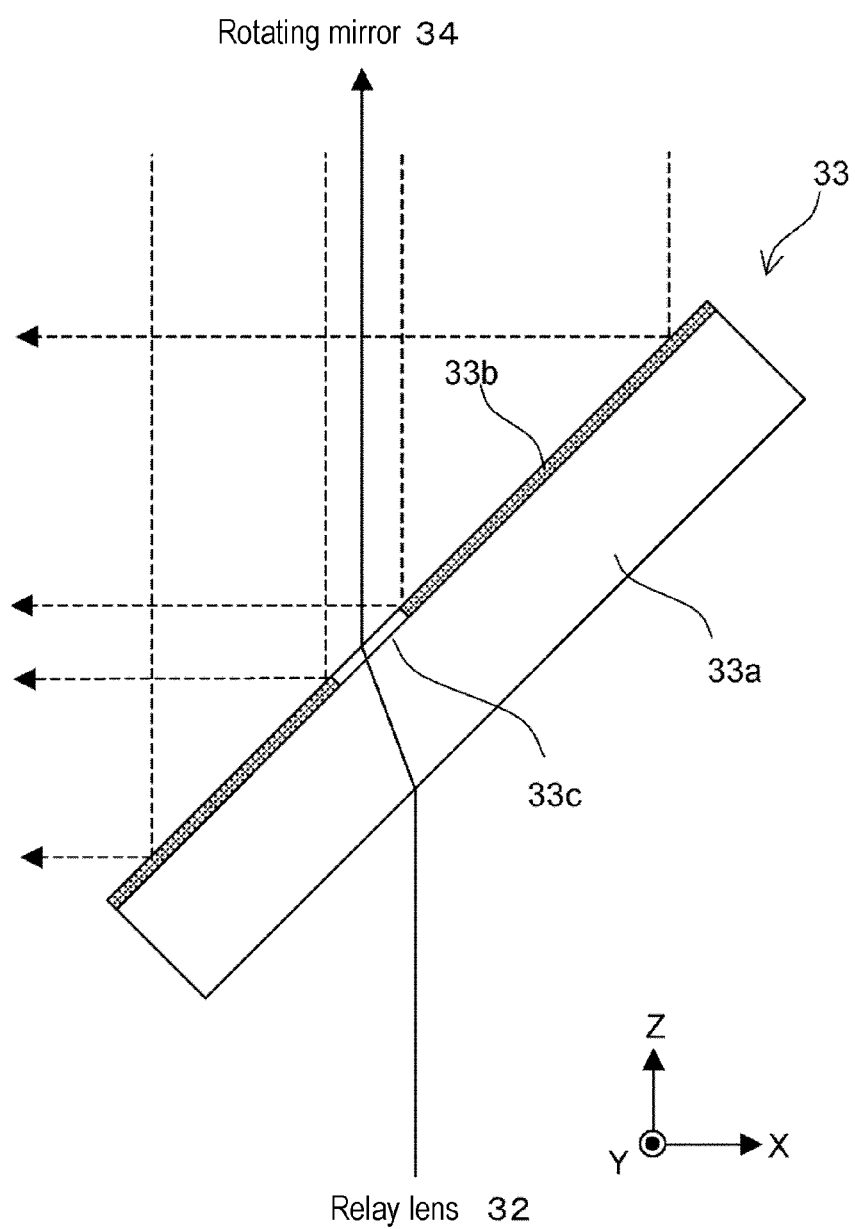
FIG. 4B is a side view showing the configuration of the beam splitter according to the first exemplary embodiment.

FIG. 4A is a plan view showing a configuration of beam splitter 33 and FIG. 4B is a side view showing the configuration of beam splitter 33.

As shown in FIGS. 4A and 4B, beam splitter 33 is configured by forming reflection film 33b on a surface of transparent substrate 33a with a fixed thickness. Reflection film 33b is formed on an overall area other than circular hole 33c. Hole 33c is set to be slightly larger than an area through which laser light entering from a side of relay lens 32 passes. Consequently, substantially all the laser light entering from the side of relay lens 32 is transmitted through beam splitter 33 to be directed to rotating mirror 34. Beam splitter 33 is disposed so as to be inclined to the Z axis by 45°.

Returning to FIG. 3, rotating mirror 34 is a plate-shaped total reflection mirror. Rotating mirror 34 is placed in support member 21 in a manner that a reflecting surface opposes beam splitter 33. The reflecting surface of rotating mirror 34 is a plane. Rotating mirror 34 is disposed in a manner that the reflecting surface is inclined to the Z axis by 45°. An optical axis of laser light having been transmitted through beam splitter 33 is bent by 90° by rotating mirror 34. That is, the laser light is reflected by rotating mirror 34 in a direction of imaging lens 35.

Imaging lens 35 is placed in a manner that an optical axis is parallel to the X axis. Imaging lens 35 converts laser light entering from a side of rotating mirror 34 into substantially parallel light and projects the substantially parallel light to a distance measurement area. Imaging lens 35 does not have to be constituted by a lens, and may be constituted by a plurality of lenses in combination.

When an object is present in the distance measurement area, laser light projected on the distance measurement area is reflected by the object to be directed again to imaging lens 35. Reflected light from the object is thus taken in by imaging lens 35. While being transmitted through imaging lens 35, reflected light is subjected to a convergence action by imaging lens 35. Reflected light having been taken in by imaging lens 35 is reflected by rotating mirror 34 to enter beam splitter 33.

With reference to FIG. 4B, reflected light entering beam splitter 33 is reflected by reflection film 33b in a negative direction of the X axis. FIG. 4B shows reflected light by broken lines. Reflected light entering hole 33c is not reflected and is transmitted through beam splitter 33. Reflected light entering the area of reflection film 33b other than hole 33c is reflected by reflection film 33b in the negative direction of the X axis to be directed to mirror 36b. For the sake of convenience, while reflected light is shown as parallel light in FIG. 4B, the reflected light is actually converging light.

Returning to FIG. 3, reflected light reflected by beam splitter 33 is reflected by mirror 36b in the negative direction of the Z axis. Mirror 36b is a total reflection mirror having a reflecting surface on its one surface. Mirror 36b is placed in a manner that the reflecting surface is inclined to the Z axis by 45°. Reflected light reflected by mirror 36b is transmitted through filter 37 to converge on photodetector 38.

Filter 37 is configured to transmit light of a wavelength band of laser light emitted from laser light source 31 and to block light of other wavelength bands. A pinhole having a substantially same diameter as a beam diameter of reflected light entering filter 37 may be formed in an incident surface or an emitting surface of filter 37. The pinhole can remove more stray light. Photodetector 38 outputs a detection signal based on a quantity of light received. When a pinhole is formed in filter 37, the optical system may be adjusted in a manner that the pinhole is positioned at a focus position of imaging lens 35.

The optical system shown in FIG. 3 is laid out in a manner that an optical path length from imaging lens 35 to photodetector 38 is substantially equal to a focal length of imaging lens 35. Relay lens 32 adjusts a divergence angle of laser light in a manner that laser light emitted from laser light source 31 is converted into parallel light by imaging lens 35. As shown in FIG. 3, even if an optical path length from imaging lens 35 to laser light source 31 is different from the optical path length from imaging lens 35 to photodetector 38, laser light source 31 and photodetector 38 can be placed on identical circuit board 41.

In the configuration of FIG. 3, in addition to circuit board 41, sub-board 43 is placed in support base 11 and detector 16 is disposed on sub-board 43. Detector 16 includes an emission part and a light receiving part opposing the emission part. Detector 16 is disposed in a manner that wall 21c on the side of rotating part 20 shown in FIG. 2 is positioned in a gap between the emission part and the light receiving part.

As the rotating part 20 rotates and cut-away part 21f formed in wall 21c is positioned between the emission part and the light receiving part of detector 16, light from the emission part is received by the light receiving part, so that a high-level signal is output from detector 16. When cut-away part 21f passes, light from the emission part is blocked by wall 21c and a signal from detector 16 falls to a low-level. Consequently, when rotating part 20 rotates, a pulse signal having a period based on a rotational speed is output from detector 16. This signal enables the rotation state of rotating part 20 to be detected. Sub-board 43 is electrically connected to circuit board 41 by signal lines (not shown).

Figure 5:
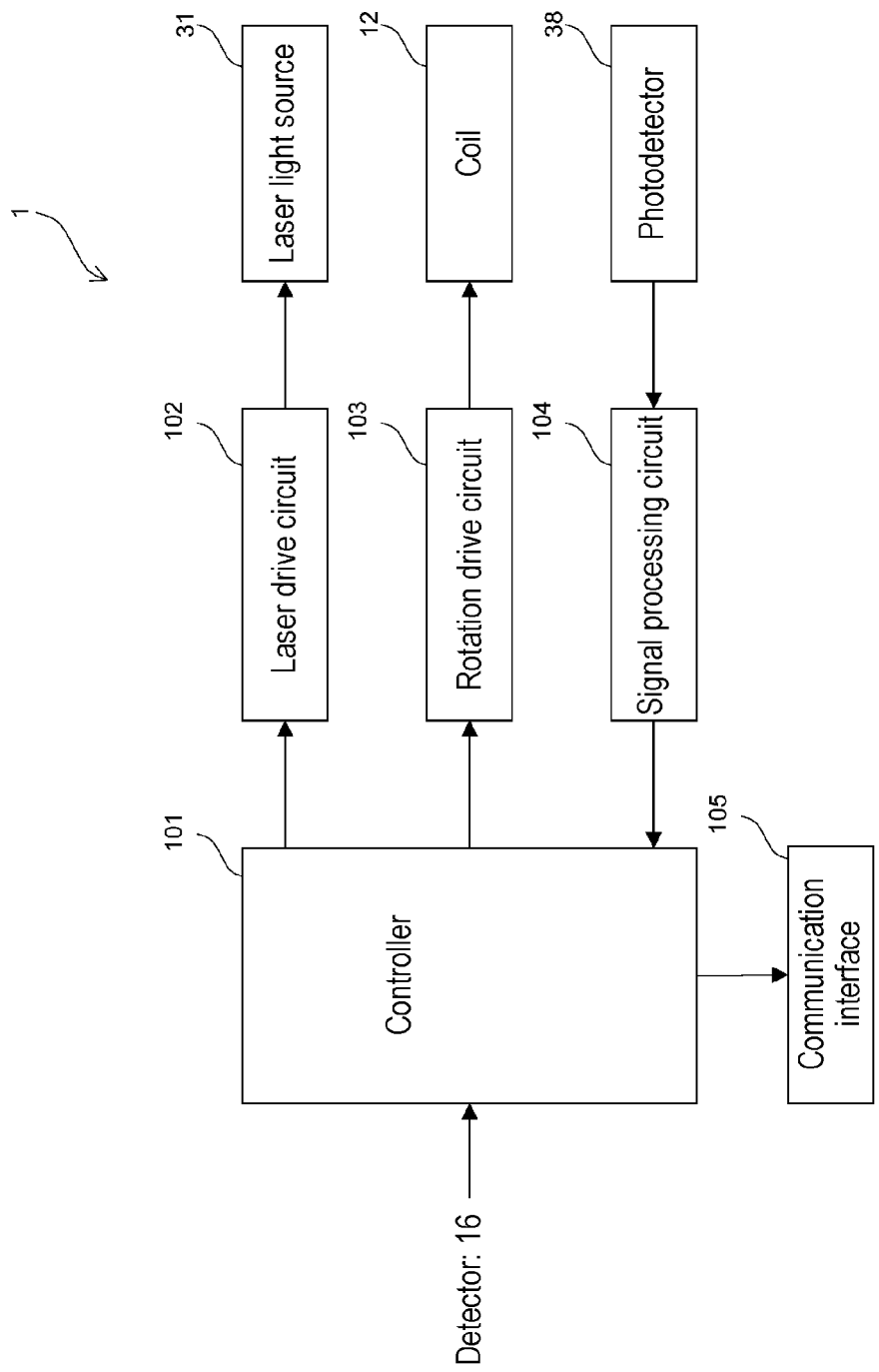
FIG. 5 is a circuit block diagram showing the configuration of the distance measurement device according to the first exemplary embodiment.

FIG. 5 is a circuit block diagram showing the configuration of distance measurement device 1.

As shown in FIG. 5, distance measurement device 1 includes controller 101, laser drive circuit 102, rotation drive circuit 103, and signal processing circuit 104 as components of a circuit unit.

Controller 101 includes an arithmetic processing circuit such as a CPU (Central Processing Unit) and a memory, and controls components based on a predetermined control program. Laser drive circuit 102 drives laser light source 31 in response to control of controller 101. Rotation drive circuit 103 conducts current through coils 12 in response to the control of controller 101. For example, controller 101 controls rotation drive circuit 103 in a manner that rotating part 20 rotates at a predetermined rotational speed, based on a pulse signal input from detector 16. In response thereto, rotation drive circuit 103 adjusts a quantity of current conducting through coils 12 and a conduction timing.

Signal processing circuit 104 performs amplification and noise reduction on a detection signal input from photodetector 38 and outputs a resultant signal to controller 101. Communication interface 105 is used for communication with apparatuses in which distance measurement device 1 is installed.

In a distance measurement operation, controller 101 controls rotation drive circuit 103 to rotate rotating part 20, and at the same time, controls laser drive circuit 102 to output laser light of predetermined pulses from laser light source 31 at every predetermined timing. Based on a detection signal of photodetector 38 input from signal processing circuit 104, controller 101 detects a light receiving timing of a laser light pulse emitted at each emission timing. Controller 101 then measures a distance to an object present in a distance measurement area at each emission timing, based on a time difference (runtime) between the emission timing and the light receiving timing of laser light.

Specifically, controller 101 multiplies the time difference (the runtime) by the speed of light to calculate the distance to the object. Controller 101 transmits data of the distance calculated as described above, as needed, via communication interface 105 to an apparatus in which distance measurement device 1 is installed. Based on the distance data received, the apparatus determines the distance to an object present in the range of 360° and executes predetermined control.

Effects of First Exemplary Embodiment

The first exemplary embodiment described above achieves the following effects.

Imaging lens 35 (lens part) for taking in reflected light is disposed at a different position from laser light source 31 (light source). It is thus possible to prevent a reduction in a quantity of light taken in due to the light source being disposed in imaging lens 35 (lens part). It is thus possible to take in reflected light from a distance measurement area more successfully by imaging lens 35 (lens part). In addition, imaging lens 35 (lens part) is disposed at a different position from laser light source 31 (light source), and thus it is not necessary to increase the diameter of imaging lens 35 (lens part) for the purpose of increasing the quantity of reflected light taken in. Consequently, it is possible to prevent an increase in size of distance measurement device 1 according to an increase in size of imaging lens 35 (lens part). Moreover, beam splitter 33 separates an optical path of projection light emitted from laser light source 31 (light source) from an optical path of reflected light reflected by a distance measurement area. Consequently, if imaging lens 35 (lens part) is disposed in a common optical path, reflected light from the distance measurement area can be smoothly guided to photodetector 38. Consequently, the present exemplary embodiment can successfully take in reflected light from the distance measurement area and at the same time, effectively achieve compactness of distance measurement device 1.

As shown in FIG. 3, laser light source 31 and photodetector 38 are disposed on common circuit board 41, and mirror 36b that reflects reflected light passing through beam splitter 33 to guide the reflected light to circuit board 41 is disposed in fixed part 10. As laser light source 31 and photodetector 38 that require power supply are placed on common circuit board 41, the configuration can be simplified and a cost reduction can be achieved. As mirror 36b bends the optical path of reflected light, the reflected light can be smoothly guided to photodetector 38 placed on circuit board 41.

As shown in FIGS. 4A and 4B, beam splitter 33 includes a reflection area (reflection film 33b) reflecting reflected light and a transmission area (hole 33c) transmitting laser light (projection light). More reflected light can thus be guided to photodetector 38 and reflected light can be detected successfully.

As shown in FIG. 3, relay lens 32 is disposed between laser light source 31 and beam splitter 33. As described above, relay lens 32 condenses laser light emitted from laser light source 31, and thus an area of laser light transmitting through beam splitter 33 can be reduced and the reflection area of reflected light on beam splitter 33 can be increased accordingly. More reflected light can thus be guided to photodetector 38.

As shown in FIG. 2, distance measurement device 1 includes a group of coils (12 coils 12) arranged around rotating axis R10 of rotating part 20 on a surface of fixed part 10 on the side of rotating part 20, and a group of magnets (16 magnets 22) arranged around rotating axis R10 so as to oppose the group of coils on a surface of rotating part 20 on the side of fixed part 10. As rotating part 20 is driven by a non-contact linear motor constituted by the group of coils and the group of magnets, distance measurement device 1 can be made compact as shown in FIG. 1, while the optical path of the optical system and a space for disposing the optical system are kept in a center part of distance measurement device 1.

As shown in FIG. 2, distance measurement device 1 includes guide trench 11b (first trench) disposed around rotating axis R10 on the surface of fixed part 10 on the side of rotating part 20 and guide trench 21b (second trench) disposed on the surface of rotating part 20 on the side of fixed part 10 so as to oppose guide trench 11b (first trench). In addition, distance measurement device 1 includes bearing balls 15 fitted into guide trench 11b (first trench) and sandwiched between guide trench 11b (first trench) and guide trench 21b (second trench) and yoke 13 (magnetic part) that is disposed in fixed part 10 so as to oppose magnets 22 and that generates magnetic attraction force between yoke 13 and magnets 22. With this configuration, the support state of rotating part 20 by fixed part 10 is kept using magnetic attraction force between magnets 22 and yoke 13 constituting a part of the linear motor. A mechanism of supporting rotating part 20 by fixed part 10 can be simplified and thus distance measurement device 1 can be made compact as a whole. Rotating part 20 can be rotatably supported by fixed part 10 only by placing rotating part 20 on fixed part 10.

Modification 1A

In addition to the configuration of distance measurement device 1 described in the first exemplary embodiment, various modifications can be made.

For example, it may be configured as shown in FIG. 6 that laser light emitted from laser light source 31 is reflected by beam splitter 33 and reflected light from a distance measurement area is transmitted through beam splitter 33 to be guided to photodetector 38. Similarly to FIG. 3, FIG. 6 is a cross-sectional view obtained by cutting distance measurement device 1 shown in FIG. 1 at the center position in the direction of the Y axis along a plane parallel to the X-Z plane.

Figure 7A:
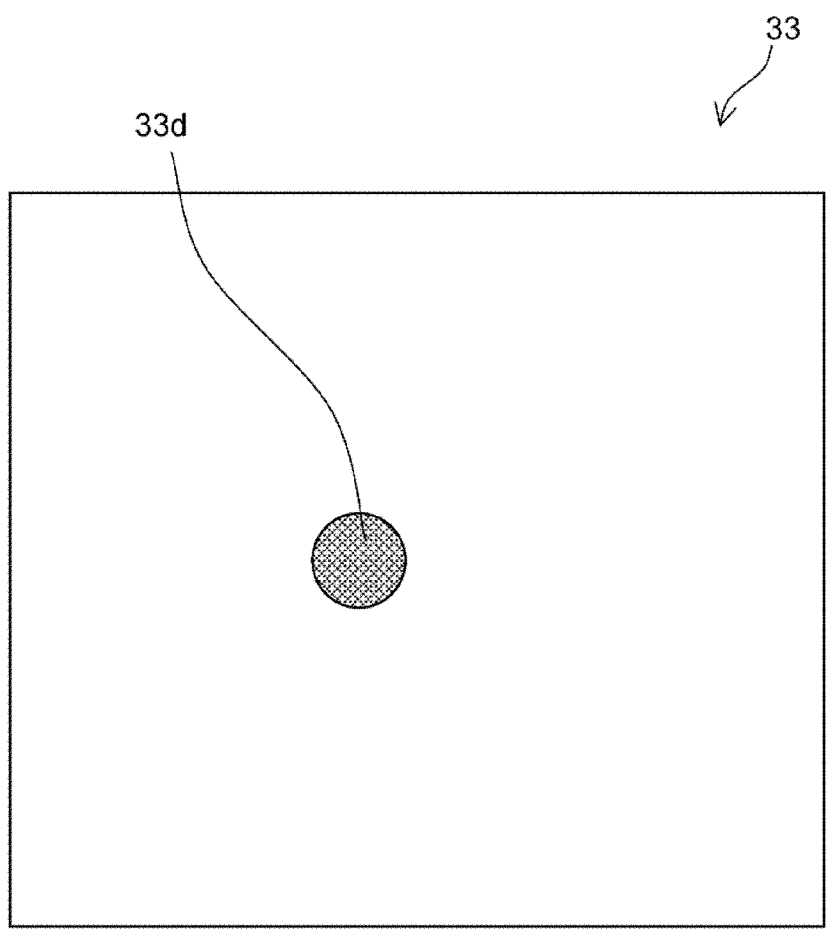
FIG. 7A is a plan view showing a configuration of a beam splitter according to the modification 1A.
Figure 7B:
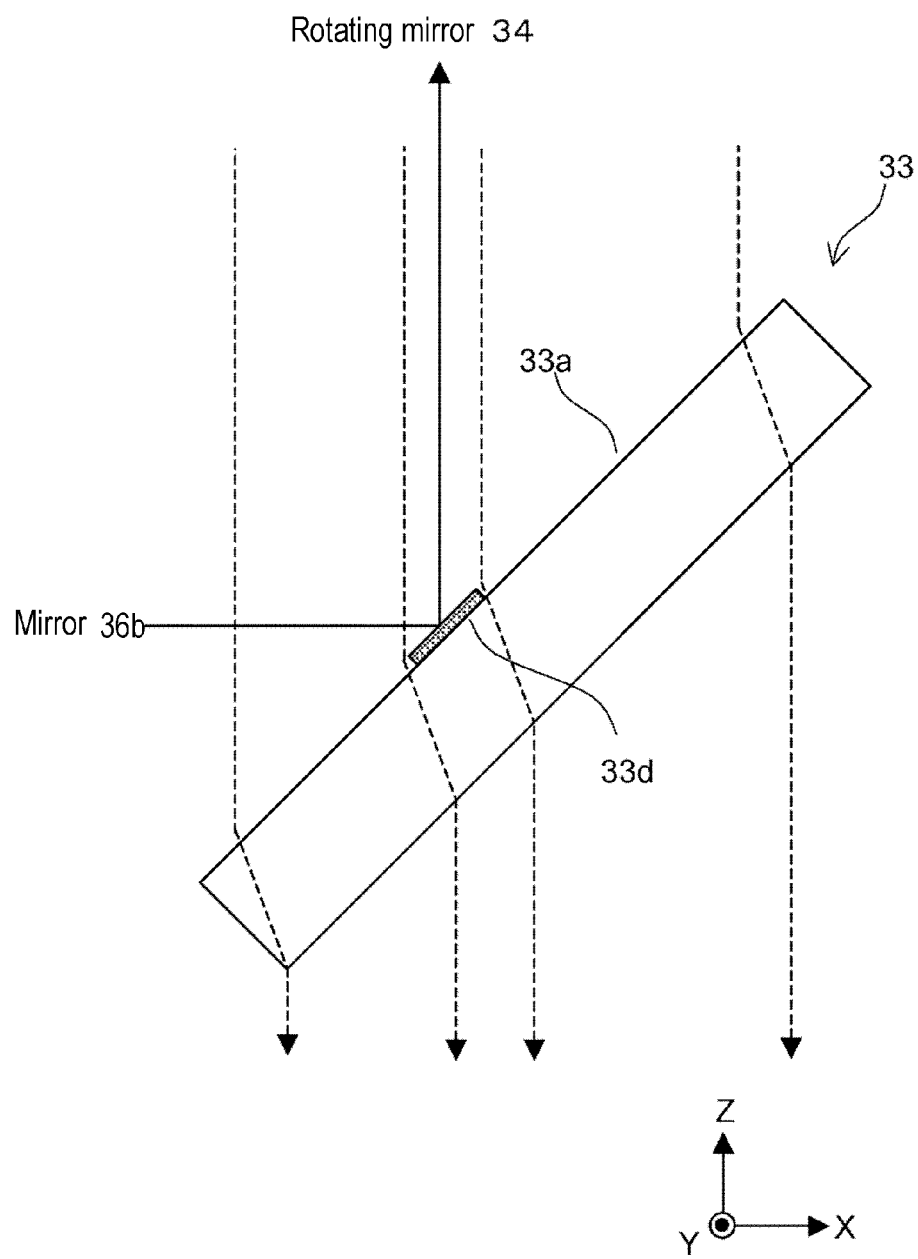
FIG. 7B is a side view showing the configuration of the beam splitter according to the modification 1A.

In this case, laser light emitted from laser light source 31 is reflected by mirror 36b to be guided to beam splitter 33. A configuration of beam splitter 33 is changed to the configuration shown in FIGS. 7A and 7B. That is, as shown in FIGS. 7A and 7B, reflection film 33d is formed on an incident area of laser light (projection light) on a surface of beam splitter 33 on a positive side of the Z axis, and the reflection film is not formed on other areas. Other configurations of modification 1A shown in FIG. 6 are similar to those of the first exemplary embodiment described above.

The modification 1A shown in FIG. 6 may achieve similar effects as those of the first exemplary embodiment described above. However, an optical path of reflected light is not bent by beam splitter 33 and mirror 36b in the configuration of modification 1A. As compared to the first exemplary embodiment described above, an optical path length from imaging lens 35 to photodetector 38 becomes shorter. For this reason, it is necessary to reduce a focal length of imaging lens 35 as compared to the first exemplary embodiment described above, and thus the incident area of reflected light on beam splitter 33 is reduced. Consequently, in the configuration of modification 1A, influences of opening accuracy of a beam splitter, mispositioning in mounting, and the like appear significantly as variations in the quantity of reflected light taken in by photodetector 38, as compared to the first exemplary embodiment described above. To guide more stable reflected light to photodetector 38, as in the first exemplary embodiment described above, it is preferably configured that the optical path of reflected light is bent by beam splitter 33 and mirror 36b.

In the configuration of FIG. 6, a relay lens that converges reflected light may be provided between beam splitter 33 and filter 37. Such a configuration can increase the focal length of imaging lens 35, and thus the incident area of reflected light on beam splitter 33 can be increased accordingly. Therefore, more reflected light can be guided to photodetector 38.

Modification 1B

Imaging lens 35 is not necessarily disposed at the position described in the first exemplary embodiment, and may be disposed at any other positions in the common optical path of laser light (projection light) and reflected light. For example, as shown in FIG. 8, imaging lens 35 may be disposed not on the side of rotating part 20 but on the side of fixed part 10. In a modification of FIG. 8, imaging lens 35 is disposed in support base 11 of fixed part 10 between beam splitter 33 and rotating mirror 34. Specifically, imaging lens 35 is placed on projection 11c at the center of support base 11 shown in FIG. 2.

While rotating part 20 is driven by the linear motor constituted by a group of coils and a group of magnets in the first exemplary embodiment described above, rotating part 20 may be driven by other drive mechanisms. For example, a gear may be formed on an overall outer circumferential surface of rotating part 20, and it is possible to configure a drive mechanism in which the gear meshes with a gear placed on a drive shaft of a motor.

The light source is not limited to laser light source 31 and may be an LED or the like. The shape of guide trenches 11b, 21b is not limited to a V-shape, and may be any other shapes capable of guiding bearing balls 15. The projection direction of laser light (projection light) is not necessarily a direction vertical to rotating axis R10, and may be inclined to the direction vertical to rotating axis R10 by a predetermined angle. The number of coils 12 arranged, the number of magnet 22 arranged, and the number of bearing balls 15 may be appropriately changed.

Second Exemplary Embodiment

Figure 9:
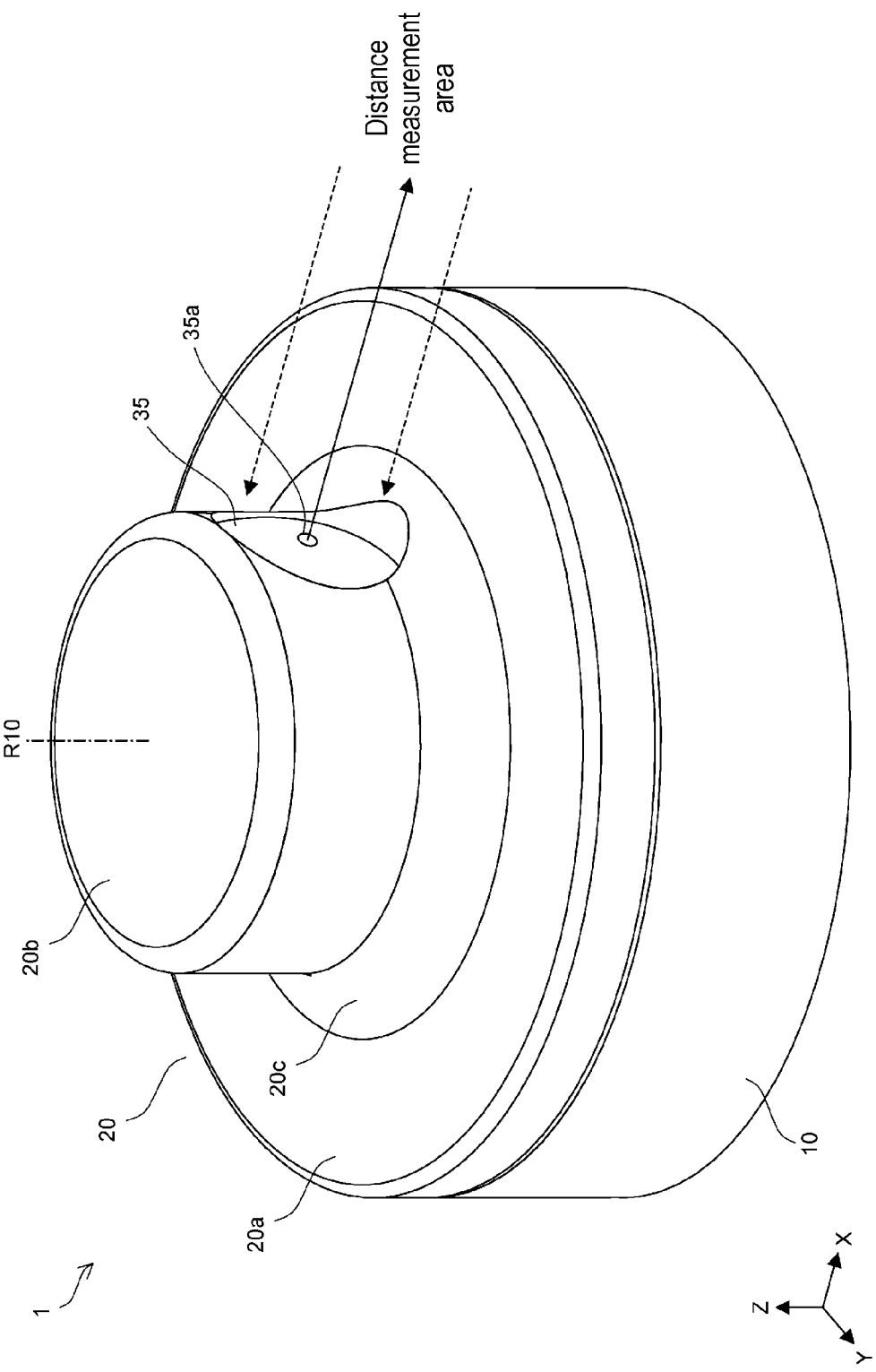
FIG. 9 is a perspective view showing a configuration of a distance measurement device according to a second exemplary embodiment.

FIG. 9 is a perspective view showing a configuration of distance measurement device 1 according to a second exemplary embodiment.

As shown in FIG. 9, distance measurement device 1 includes fixed part 10 formed in a cylindrical shape and rotating part 20 rotatably disposed on fixed part 10. Rotating part 20 is constituted by large diameter part 20a having a substantially same diameter as fixed part 10, small diameter part 20b having a smaller diameter than large diameter part 20a, and inclined part 20c connecting large diameter part 20a and small diameter part 20b. Large diameter part 20a and small diameter part 20b are both formed in a cylindrical shape. Fixed part 10, and large diameter part 20a and small diameter part 20b of rotating part 20 are coaxially disposed. Imaging lens 35 is disposed on a side surface of small diameter part 20b so as to be externally exposed. Laser light (projection light) is projected from imaging lens 35 to a distance measurement area. Imaging lens 35 constitutes a lens part taking in reflected light reflected by the distance measurement area.

Rotating part 20 rotates about rotating axis R10 that is parallel to the Z axis and passes through the center of small diameter part 20b. When rotating part 20 rotates, the optical axis of laser light projected from imaging lens 35 rotates about rotating axis R10. The distance measurement area is thus rotated accordingly. As described later, distance measurement device 1 measures the distance to an object present in the distance measurement area based on a time difference (runtime) between a timing when laser light is projected on the distance measurement area and a timing when reflected light of the laser light from the distance measurement area is received. Specifically, the time difference is multiplied by the speed of light, so that the distance to the object is calculated. As rotating part 20 rotates once about rotating axis R10 as described above, distance measurement device 1 can measure the distance to an object present in the range of 360°.

Figure 10:
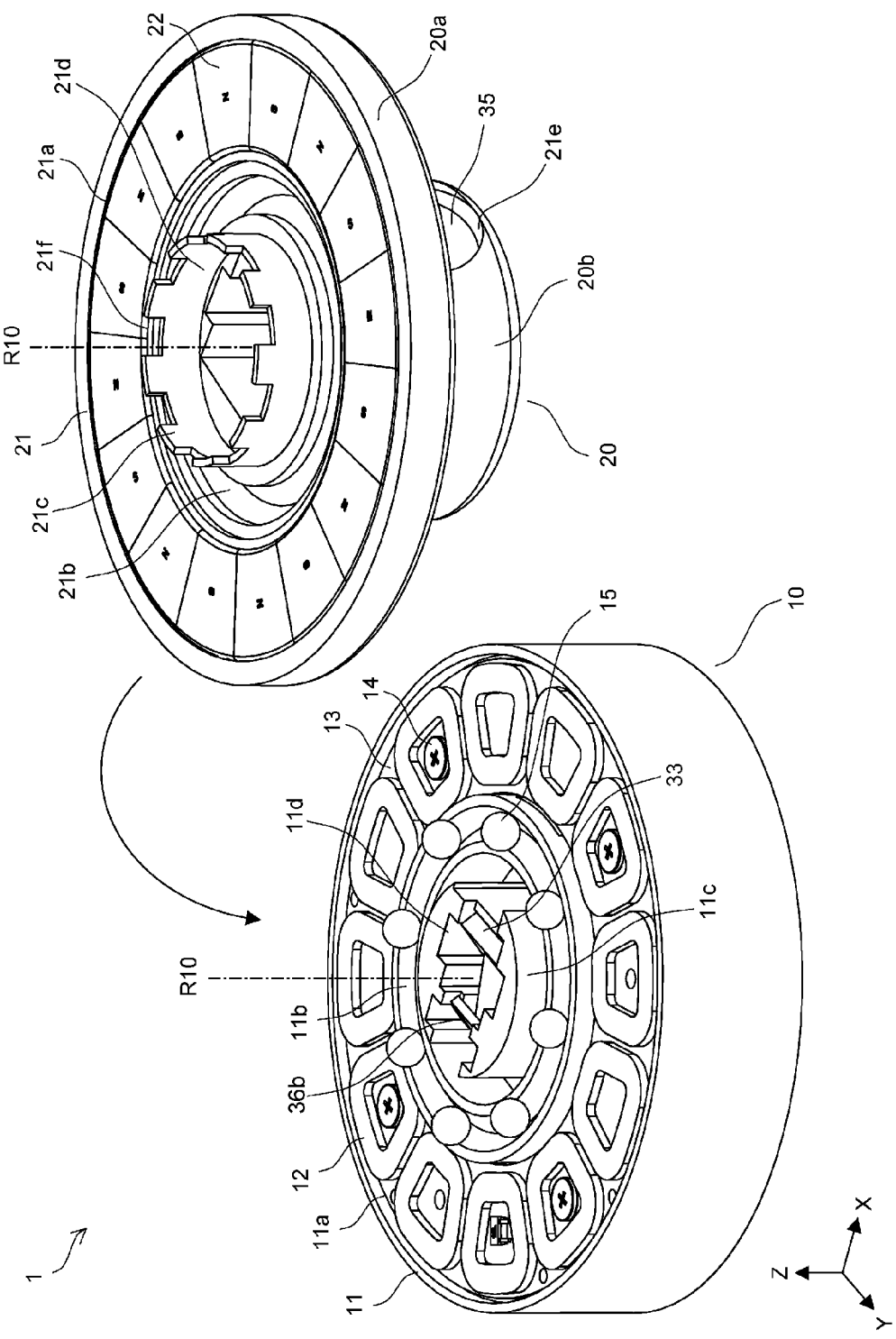
FIG. 10 is a perspective view showing the configuration of the distance measurement device according to the second exemplary embodiment in a state where a fixed part and a rotating part are separated from each other.

FIG. 10 is a perspective view showing the configuration of distance measurement device 1 in a state where fixed part 10 and rotating part 20 are separated from each other.

As shown in FIG. 10, fixed part 10 includes support base 11 formed in a cylindrical shape, coils 12, yoke 13, and bearing balls 15. Support base 11 is composed of, for example, a resin. Recess 11a is formed in an upper surface of support base 11 along a circumferential direction about rotating axis R10. Yoke 13, which is a thin plate, is fitted into recess 11a. Yoke 13 has a disc shape with the center part removed. Yoke 13 is fixed on support base 11 by screws 14.

In addition, a plurality of coils 12 are circumferentially arranged on an upper surface of yoke 13. In this case, 12 coils 12 are mounted on the upper surface of yoke 13. Yoke 13 constitutes a linear motor for rotating rotating part 20 with magnets 22 on a side of rotating part 20.

On the upper surface of support base 11, guide trench 11b with a fixed depth is formed inside of recess 11a to extend circumferentially. The shape of guide trench 11b cut along a plane vertical to the circumferential direction is a V-shape. Guide trench 11b extends circumferentially. Guide trench 11b is used for circumferentially guiding bearing balls 15. Bearing balls 15 are fitted into guide trench 11b. A spacer for keeping a constant distance between bearing balls 15 may be further fitted into guide trench 11b.

Projection 11c having a cylindrical shape is formed in a center part of support base 11, and recess 11d is formed in projection 11c. Optical members constituting an optical system to be described later are disposed in recess 11d. FIG. 10 shows beam splitter 33 and mirror 36b as the optical members.

FIG. 10 shows rotating part 20 upside down. Rotating part 20 includes support member 21 and magnets 22. Although not shown in FIG. 10, yoke 23 (see FIG. 11) is also placed in rotating part 20. In the state of FIG. 10, yoke 23 is covered by magnets 22.

Recess 21a is formed in large diameter part 20a of rotating part 20 along the circumferential direction about rotating axis R10. Yoke 23, which is a thin plate (see FIG. 11), is fitted into recess 21a. Yoke 23 has a disc shape with the center part removed. Yoke 23 is fixed on large diameter part 20a by thermosetting adhesives or integral molding of metal and resin.

In addition, a plurality of magnets 22 are circumferentially arranged so as to cover yoke 23. These magnets 22 are arranged in a manner that polarities of adjacent magnets 22 are opposite to each other. In this case, 16 magnets 22 are mounted so as to cover yoke 23. Magnets 22 constitute the linear motor for rotating rotating part 20 with coils 12 on the side of fixed part 10.

In support member 21, guide trench 21b with a fixed depth is formed inside of recess 21a to extend circumferentially. The shape of guide trench 21b cut along a plane vertical to the circumferential direction is a V-shape. Guide trench 21b extends circumferentially. Guide trench 21b is used for circumferentially guiding bearing balls 15 with guide trench 11b on the side of fixed part 10. When rotating part 20 is placed on fixed part 10 as shown in FIG. 9, bearing balls 15 are sandwiched between guide trench 11b on the side of fixed part 10 and guide trench 21b on the side of rotating part 20. Rotating part 20 is thus supported by fixed part 10 so as to be rotatable about rotating axis R10.

Wall 21c having a cylindrical shape is formed in a center part of support member 21, and opening 21d is formed inside of wall 21c. Rotating mirror 34 to be described later (see FIG. 11) is placed in opening 21d. Opening 21d is connected to opening 21e formed in the side surface of small diameter part 20b. Imaging lens 35 is placed in opening 21e. Cut-away parts 21f are circumferentially formed in wall 21c at fixed intervals. Cut-away part 21f is used for detecting the rotation state of rotating part 20.

When rotating part 20 is placed on fixed part 10 as described above, rotating part 20 is supported by fixed part 10 through bearing balls 15 so as to be rotatable about rotating axis R10. In this state, magnets 22 arranged on the side of rotating part 20 respectively face coils 12 arranged on the side of fixed part 10. In this way, the linear motor for driving rotating part 20 in a rotating direction is configured.

In addition, in this state, magnetic attraction force is generated between magnets 22 on the side of rotating part 20 and yoke 13 on the side of fixed part 10. This magnetic attraction force attracts rotating part 20 to fixed part 10, thus keeping a support state of rotating part 20 by fixed part 10. That is, yoke 13 constitutes a magnetic part generating magnetic attraction force for preventing fall-off of rotating part 20 between yoke 13 and magnets 22. Support base 11 may be composed of a magnetic body for the purpose of generating the magnetic attraction force.

Figure 11:
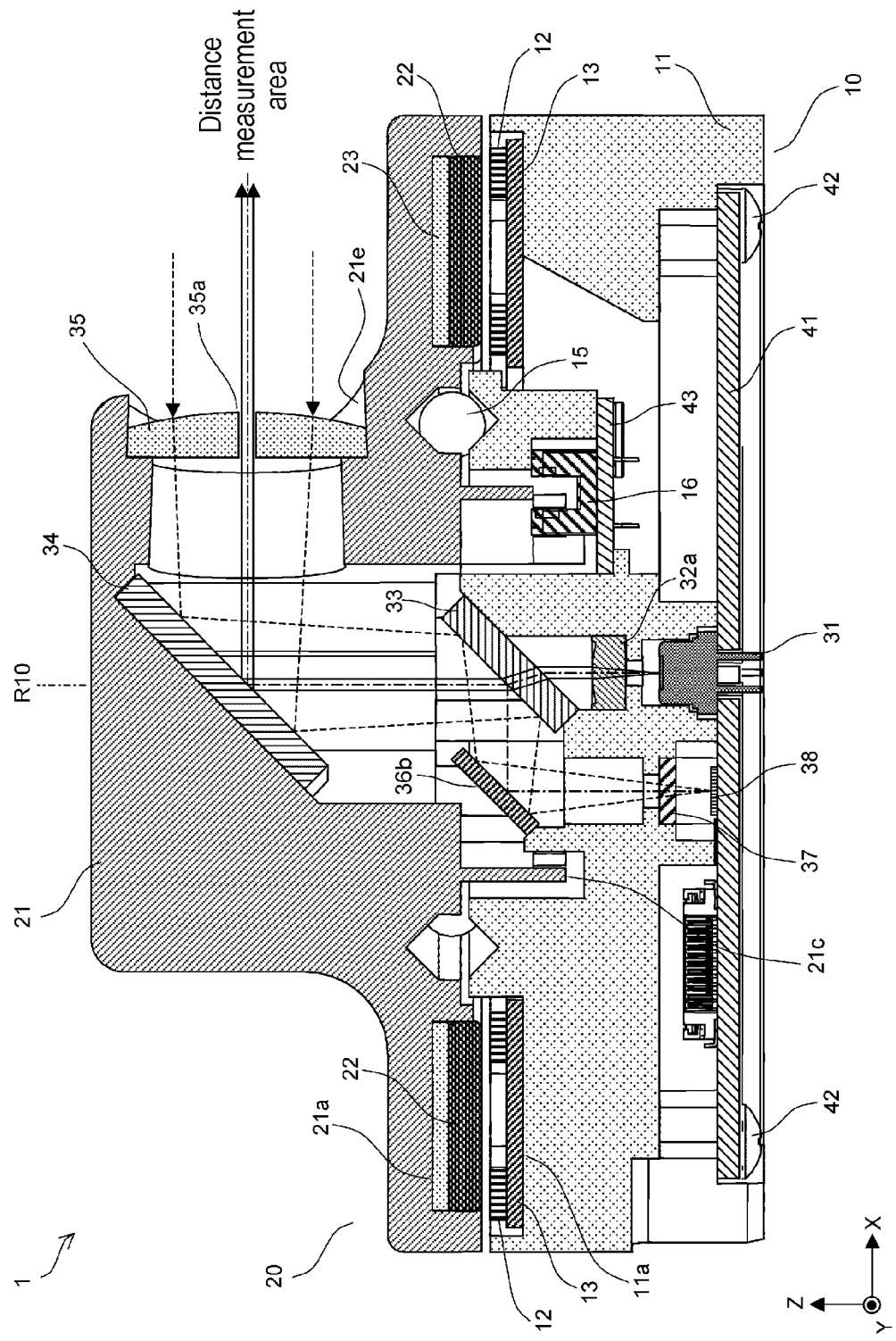
FIG. 11 is a cross-sectional view showing the configuration of the distance measurement device according to the second exemplary embodiment.

FIG. 11 is a cross-sectional view showing the configuration of distance measurement device 1. FIG. 11 is a cross-sectional view obtained by cutting distance measurement device 1 shown in FIG. 9 at the center position in the direction of the Y axis along a plane parallel to an X-Z plane. In FIG. 11, laser light (projection light) emitted from laser light source 31 to a distance measurement area is shown by solid lines, whereas reflected light reflected by the distance measurement area is shown by broken lines. A one-dot chain line drawn in the optical system shows an optical axis of the optical system.

As shown in FIG. 11, distance measurement device 1 includes, as components of the optical system, laser light source 31, collimator lens 32a, beam splitter 33, rotating mirror 34, imaging lens 35, mirror 36b, filter 37, and photodetector 38. Laser light source 31 and photodetector 38 are placed on circuit board 41. Collimator lens 32a, beam splitter 33, mirror 36b, and filter 37 are placed in support base 11 on the side of fixed part 10. Rotating mirror 34 and imaging lens 35 are placed in support member 21 of rotating part 20.

Laser light source 31 emits laser light of a predetermined wavelength. Laser light source 31 is, for example, a semiconductor laser. An emission optical axis of laser light source 31 is parallel to the Z axis. Laser light source 31 is placed on circuit board 41 placed on a lower surface of support base 11. Circuit board 41 is placed on the lower surface of support base 11 by screws 42. Laser light emitted from laser light source 31 is converted into parallel light by collimator lens 32a, and then the parallel light enters beam splitter 33. Laser light is transmitted through beam splitter 33 to be directed to rotating mirror 34. Beam splitter 33 separates an optical path of laser light (projection light) emitted from laser light source 31 from an optical path of reflected light reflected by the distance measurement area.

Figure 12A:
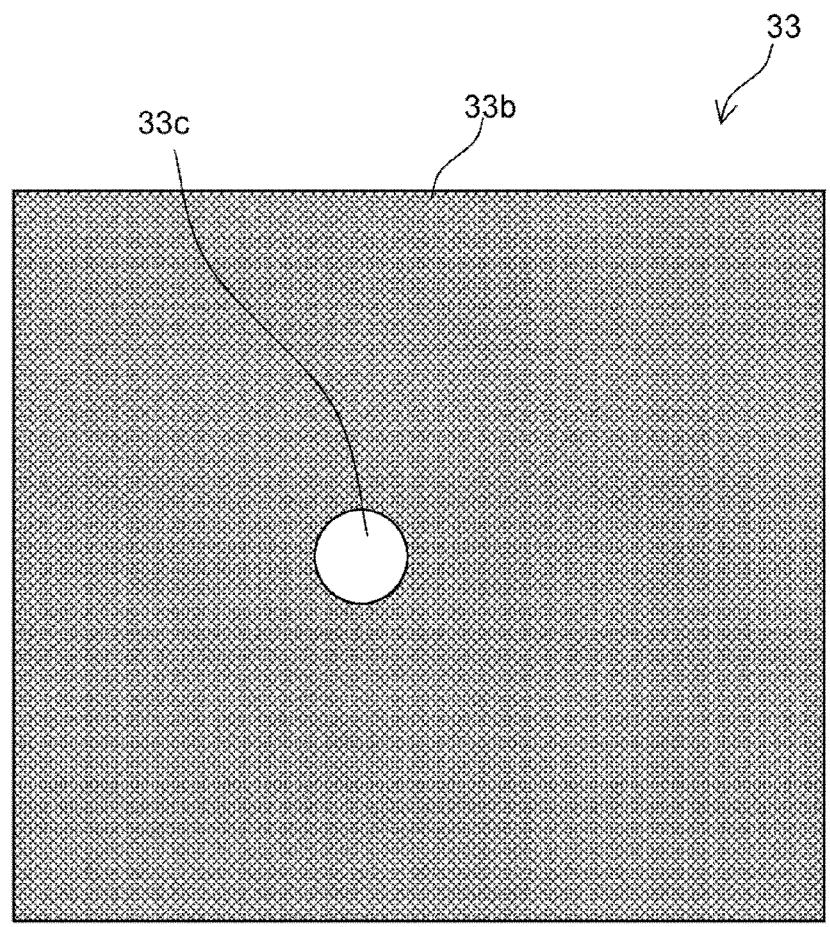
FIG. 12A is a plan view showing a configuration of a beam splitter according to the second exemplary embodiment.
Figure 12B:
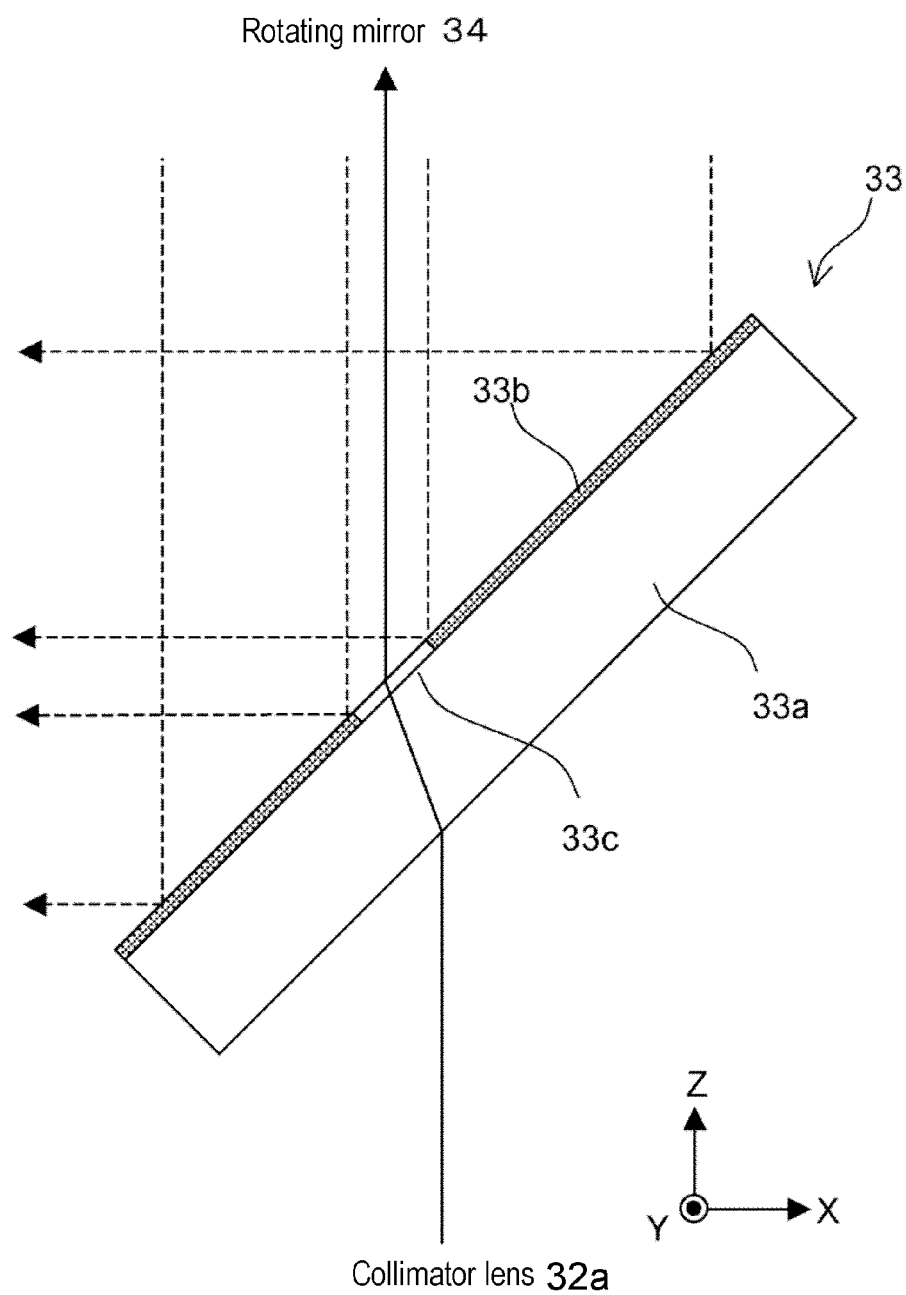
FIG. 12B is a side view showing the configuration of the beam splitter according to the second exemplary embodiment.

FIG. 12A is a plan view showing a configuration of beam splitter 33 and FIG. 12B is a side view showing the configuration of beam splitter 33.

As shown in FIGS. 12A and 12B, beam splitter 33 is configured by forming reflection film 33b on a surface of transparent substrate 33a with a fixed thickness. Reflection film 33b is formed on an overall area other than circular hole 33c. Hole 33c is set to be slightly larger than an area through which laser light entering from a side of collimator lens 32a passes. Consequently, substantially all the laser light entering from the side of collimator lens 32a is transmitted through beam splitter 33 to be directed to rotating mirror 34. Beam splitter 33 is disposed so as to be inclined to the Z axis by 45°.

Returning to FIG. 11, rotating mirror 34 is a plate-shaped total reflection mirror. Rotating mirror 34 is placed in support member 21 in a manner that a reflecting surface opposes beam splitter 33. The reflecting surface of rotating mirror 34 is a plane. Rotating mirror 34 is disposed in a manner that the reflecting surface is inclined to the Z axis by 45°. The optical axis of laser light having been transmitted through beam splitter 33 is bent by 90° by rotating mirror 34. That is, the laser light is reflected by rotating mirror 34 in the direction of imaging lens 35.

Imaging lens 35 is placed in a manner that an optical axis is parallel to the X axis. Imaging lens 35 is disposed in a common optical path of projection light and reflected light. In FIG. 11, the common optical path is an optical path from beam splitter 33 to opening 21e.

Through-hole 35a passing through imaging lens 35 in a direction of the optical axis is formed at a center of imaging lens 35. A diameter of through-hole 35a is set to be slightly larger than that of an area through which laser light entering from a side of rotating mirror 34 passes. Consequently, substantially all the laser light entering from the side of rotating mirror 34 passes through imaging lens 35 to be directed to the distance measurement area. Imaging lens 35 does not have to be constituted by a lens, and may be constituted by a plurality of lenses in combination. In this case, a through-hole for enabling passing of laser light is formed in all the lenses.

When an object is present in the distance measurement area, laser light projected on the distance measurement area is reflected by the object to be directed again to imaging lens 35. Reflected light from the object is thus taken in by imaging lens 35. While being transmitted through imaging lens 35, reflected light is subjected to a convergence action by imaging lens 35. Reflected light having been taken in by imaging lens 35 is reflected by rotating mirror 34 to enter beam splitter 33.

With reference to FIG. 12B, reflected light entering beam splitter 33 is reflected by reflection film 33b in the negative direction of the X axis. FIG. 12B shows reflected light by broken lines. Reflected light entering hole 33c is not reflected and is transmitted through beam splitter 33. Reflected light entering the area of reflection film 33b other than hole 33c is reflected by reflection film 33b in the negative direction of the X axis to be directed to mirror 36b.

For the sake of convenience, while reflected light is shown as parallel light in FIG. 12B, the reflected light is actually converging light.

Returning to FIG. 11, reflected light reflected by beam splitter 33 is reflected by mirror 36b in the negative direction of the Z axis. Mirror 36b is a total reflection mirror having a reflecting surface on its one surface. Mirror 36b is placed in a manner that the reflecting surface is inclined to the Z axis by 45°. Reflected light reflected by mirror 36b is transmitted through filter 37 to converge on photodetector 38.

Filter 37 is configured to transmit light of a wavelength band of laser light emitted from laser light source 31 and to block light of other wavelength bands. A pinhole having a substantially same diameter as a beam diameter of reflected light entering filter 37 may be formed in an incident surface or an emitting surface of filter 37. The pinhole can remove more stray light. Photodetector 38 outputs a detection signal based on the quantity of light received. When a pinhole is formed in filter 37, the optical system may be adjusted in a manner that the pinhole is positioned at the focus position of imaging lens 35.

The optical system shown in FIG. 11 is laid out in a manner that an optical path length from imaging lens 35 to photodetector 38 is substantially equal to a focal length of imaging lens 35. Collimator lens 32a adjusts a divergence angle of laser light in a manner that laser light emitted from laser light source 31 is converted into parallel light by collimator lens 32a. As shown in FIG. 11, even if an optical path length of imaging lens 35 to laser light source 31 is different from the optical path length from imaging lens 35 to photodetector 38, laser light source 31 and photodetector 38 can be placed on identical circuit board 41.

In the configuration of FIG. 11, in addition to circuit board 41, sub-board 43 is placed in support base 11 and detector 16 is placed on sub-board 43. Detector 16 includes an emission part and a light receiving part opposing the emission part. Detector 16 is disposed in a manner that wall 21c on the side of rotating part 20 shown in FIG. 10 is positioned in a gap between the emission part and the light receiving part.

As the rotating part 20 rotates and cut-away part 21f formed in wall 21c is positioned between the emission part and the light receiving part of detector 16, light from the emission part is received by the light receiving part, so that a high-level signal is output from detector 16. When cut-away part 21f passes, light from the emission part is blocked by wall 21c and a signal from detector 16 falls to a low-level. Consequently, when rotating part 20 rotates, a pulse signal having a period based on a rotational speed is output from detector 16. This signal enables the rotation state of rotating part 20 to be detected. Sub-board 43 is electrically connected to circuit board 41 by signal lines (not shown).

Figure 13:
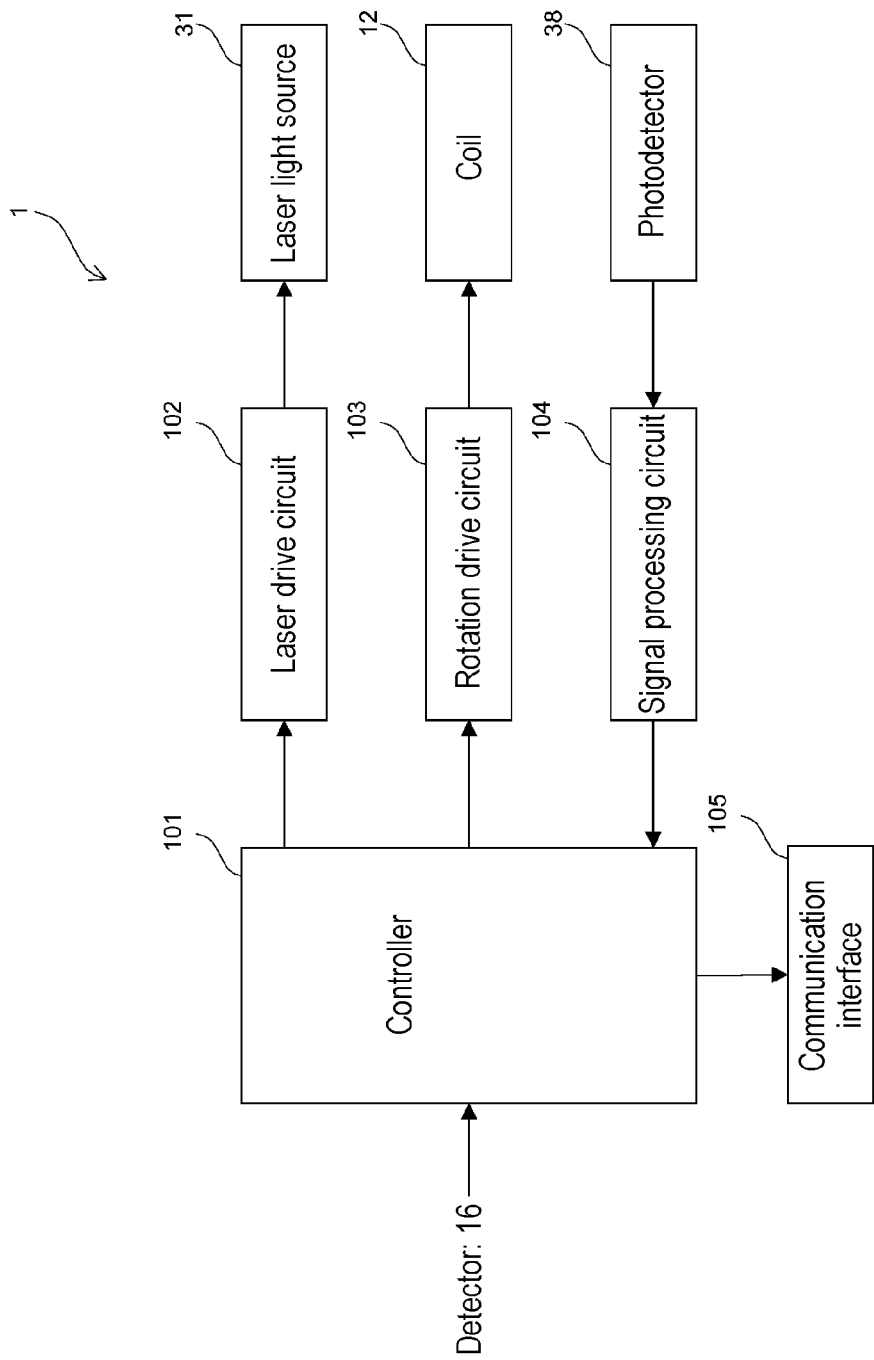
FIG. 13 is a circuit block diagram showing the configuration of the distance measurement device according to the second exemplary embodiment.

FIG. 13 is a circuit block diagram showing the configuration of distance measurement device 1.

As shown in FIG. 13, distance measurement device 1 includes controller 101, laser drive circuit 102, rotation drive circuit 103, and signal processing circuit 104 as components of a circuit unit.

Controller 101 includes an arithmetic processing circuit such as a CPU (Central Processing Unit) and a memory, and controls components based on a predetermined control program. Laser drive circuit 102 drives laser light source 31 in response to control of controller 101. Rotation drive circuit 103 conducts current through coils 12 in response to the control of controller 101. For example, controller 101 controls rotation drive circuit 103 in a manner that rotating part 20 rotates at a predetermined rotational speed, based on a pulse signal input from detector 16. In response thereto, rotation drive circuit 103 adjusts the quantity of current conducting through coils 12 and a conduction timing.

Signal processing circuit 104 performs amplification and noise reduction on a detection signal input from photodetector 38 and outputs a resultant signal to controller 101. Communication interface 105 is used for communication with apparatuses in which distance measurement device 1 is installed.

In a distance measurement operation, controller 101 controls rotation drive circuit 103 to rotate rotating part 20, and at the same time, controls laser drive circuit 102 to output laser light of predetermined pulses from laser light source 31 at every predetermined timing. Based on a detection signal of photodetector 38 input from signal processing circuit 104, controller 101 detects a light receiving timing of a laser light pulse emitted at each emission timing. Controller 101 then measures the distance to an object present in a distance measurement area at each emission timing, based on a time difference (runtime) between the emission timing and the light receiving timing of laser light.

Specifically, controller 101 multiplies the time difference (the runtime) by the speed of light to calculate the distance to the object. Controller 101 transmits data of the distance calculated as described above, as needed, via communication interface 105 to an apparatus in which distance measurement device 1 is installed. Based on the distance data received, the apparatus determines the distance to an object present in the range of 360° and executes predetermined control.

Effects of Second Exemplary Embodiment

The second exemplary embodiment described above achieves the following effects.

Imaging lens 35 and laser light source 31 (light source) are individually disposed, and thus it is not necessary to perform a complicated operation of placing imaging lens 35 and laser light source 31 (light source). Through-hole 35a passing through imaging lens 35 is formed in the area through which laser light (projection light) passes. It is thus possible to prevent a part of laser light (projection light) from being reflected on an incident surface of imaging lens 35 and becoming stray light, and to prevent such stray light from entering photodetector 38. Distance measurement device 1 according to the present exemplary embodiment can eliminate a complicated operation and at the same time, can reduce an influence of stray light on a detection signal.

Collimator lens 32a that converts laser light (projection light) emitted from laser light source 31 (light source) into parallel light is disposed between laser light source 31 (light source) and beam splitter 33. A beam diameter of laser light (projection light) can be reduced, and thus through-hole 35a and hole 33c can be made small. More reflected light can thus be taken in to be guided to photodetector 38. To further reduce the beam diameter of projection light, collimator lens 32a is preferably disposed to be closer to a side of laser light source 31 (light source).

As shown in FIG. 11, laser light source 31 (light source) and photodetector 38 are disposed on common circuit board 41, and mirror 36b that reflects reflected light passing through beam splitter 33 to guide the reflected light to circuit board 41 is disposed in fixed part 10. As laser light source 31 and photodetector 38 that require power supply are placed on common circuit board 41, the configuration can be simplified and the cost reduction can be achieved. As mirror 36b bends the optical path of reflected light, the reflected light can be smoothly guided to photodetector 38 placed on circuit board 41.

As shown in FIGS. 12A and 12B, beam splitter 33 includes a reflection area (reflection film 33b) reflecting reflected light and a transmission area (hole 33c) transmitting laser light (projection light). More reflected light can thus be guided to photodetector 38 and reflected light can be detected successfully.

When laser light (projection light) emitted from laser light source 31 (light source) is converted into parallel light by collimator lens 32a, the beam diameter of laser light (projection light) entering beam splitter 33 can be reduced, and thus an area of a transmission area (hole 33c) for transmitting laser light can be reduced. More reflected light can thus be guided to photodetector 38 and reflected light can be detected successfully.

As shown in FIG. 10, distance measurement device 1 includes a group of coils (12 coils 12) arranged around rotating axis R10 of rotating part 20 on the surface of fixed part 10 on the side of rotating part 20, and a group of magnets (16 magnets 22) arranged around rotating axis R10 so as to oppose the group of coils on the surface of rotating part 20 on the side of fixed part 10. As rotating part 20 is driven by a non-contact linear motor constituted by the group of coils and the group of magnets, distance measurement device 1 can be made compact as shown in FIG. 9, while the optical path of the optical system and a space for disposing the optical system are kept in a center part of distance measurement device 1.

As shown in FIG. 10, distance measurement device 1 includes guide trench 11b (first trench) disposed around rotating axis R10 on the surface of fixed part 10 on the side of rotating part 20 and guide trench 21b (second trench) disposed on the surface of rotating part 20 on the side of fixed part 10 so as to oppose guide trench 11b (first trench). In addition, distance measurement device 1 includes bearing balls 15 fitted into guide trench 11b (first trench) and sandwiched between guide trench 11b (first trench) and guide trench 21b (second trench) and yoke 13 (magnetic part) that is disposed in fixed part 10 so as to oppose magnets 22 and that generates magnetic attraction force between yoke 13 and magnets 22. With this configuration, the support state of rotating part 20 by fixed part 10 is kept using magnetic attraction force between magnets 22 and yoke 13 constituting a part of the linear motor. The mechanism of supporting rotating part 20 by fixed part 10 can be simplified and thus distance measurement device 1 can be made compact as a whole. Rotating part 20 can be rotatably supported by fixed part 10 only by placing rotating part 20 on fixed part 10.

Modification 2A

In addition to the configuration of distance measurement device 1 described in the second exemplary embodiment, various modifications can be made.

Figure 14:
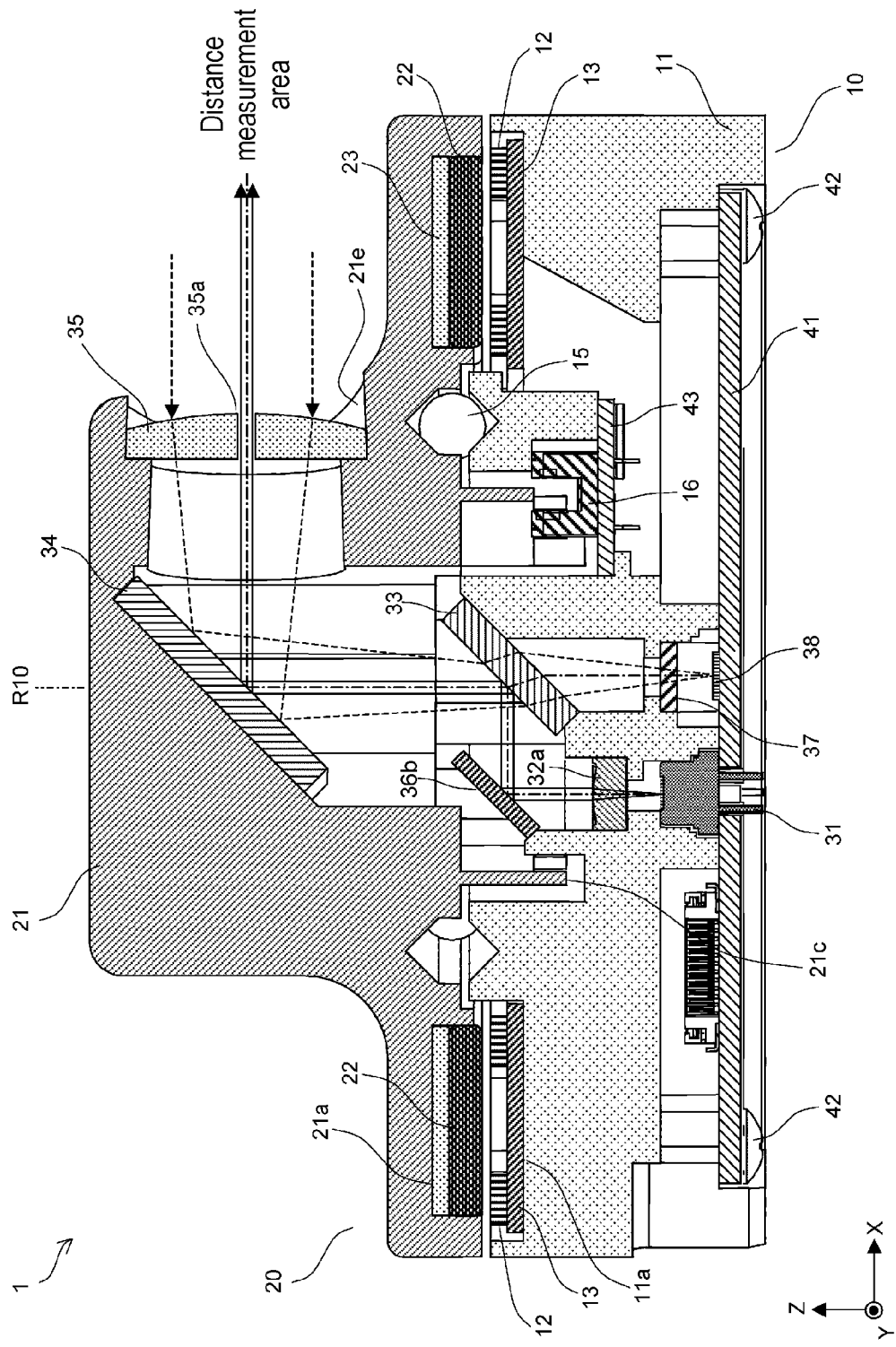
FIG. 14 is a cross-sectional view showing a configuration of a distance measurement device according to a modification 2A.

For example, it may be configured as shown in FIG. 14 that laser light emitted from laser light source 31 is reflected by beam splitter 33 and reflected light from a distance measurement area is transmitted through beam splitter 33 to be guided to photodetector 38. Similarly to FIG. 11, FIG. 14 is a cross-sectional view obtained by cutting distance measurement device 1 shown in FIG. 9 at the center position in the direction of the Y axis along a plane parallel to the X-Z plane.

Figure 15A:
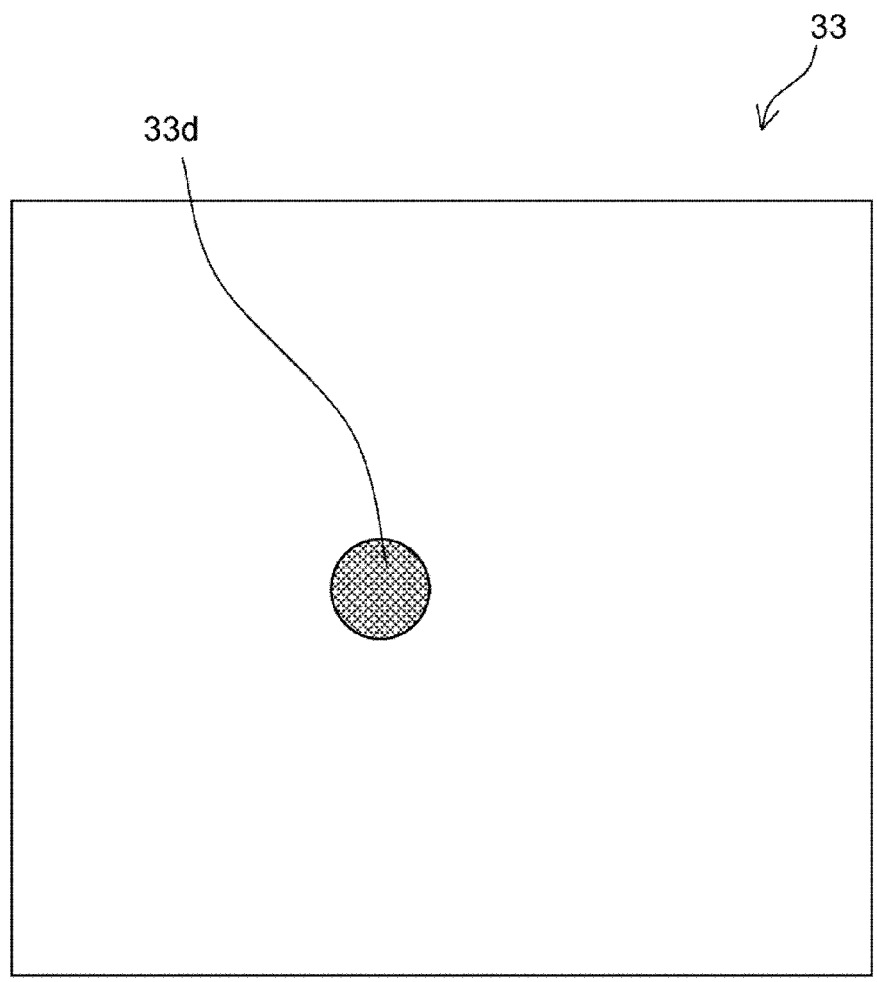
FIG. 15A is a plan view showing a configuration of a beam splitter according to the modification 2A.
Figure 15B:
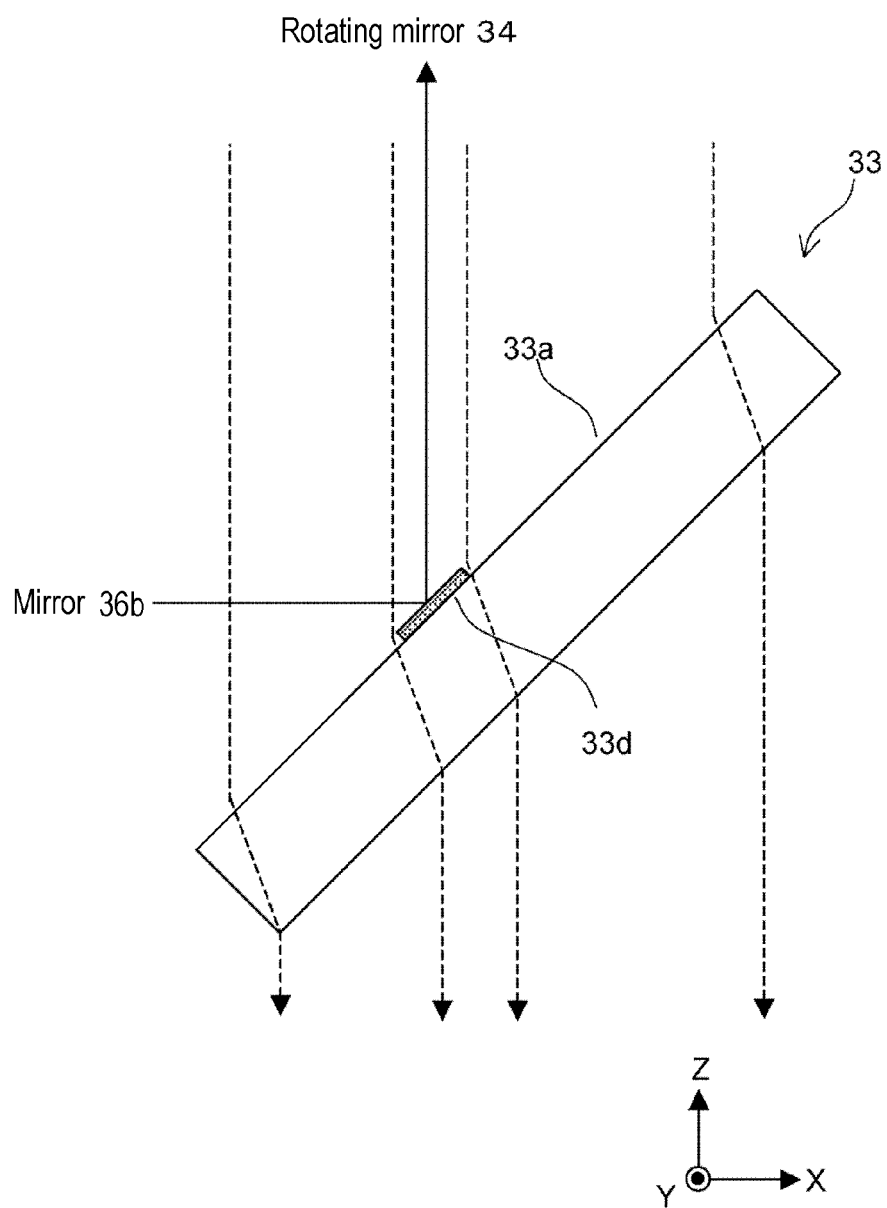
FIG. 15B is a side view showing the configuration of the beam splitter according to the modification 2A.

In this case, laser light emitted from laser light source 31 is reflected by mirror 36b to be guided to beam splitter 33. The configuration of beam splitter 33 is changed to the configuration shown in FIGS. 15A and 15B. That is, as shown in FIGS. 15A and 15B, reflection film 33d is formed on an incident area of laser light (projection light) on a surface of beam splitter 33 on the positive side of the Z axis, and the reflection film is not formed on other areas. Other configurations of modification 2A shown in FIG. 14 are similar to those of the second exemplary embodiment described above.

The modification 2A shown in FIG. 14 may achieve similar effects as those of the second exemplary embodiment described above. However, an optical path of reflected light is not bent by beam splitter 33 and mirror 36b in the configuration of modification 2A. As compared to the second exemplary embodiment described above, an optical path length from imaging lens 35 to photodetector 38 becomes shorter. For this reason, it is necessary to reduce a focal length of imaging lens 35 as compared to the second exemplary embodiment described above, and thus the incident area of reflected light on beam splitter 33 is reduced. Consequently, in the configuration of modification 2A, influences of opening accuracy of a beam splitter, mispositioning in mounting, and the like appear more significantly as variations in the quantity of reflected light taken in by photodetector 38, as compared to the second exemplary embodiment described above. To guide more stable reflected light to photodetector 38, as in the second exemplary embodiment described above, it is preferably configured in a manner that the optical path of reflected light is bent by beam splitter 33 and mirror 36b.

In the configuration of FIG. 14, a relay lens that converges reflected light may be provided between beam splitter 33 and filter 37. Such a configuration can increase the focal length of imaging lens 35, and thus the incident area of reflected light on beam splitter 33 can be increased accordingly. Therefore, more reflected light can be guided to photodetector 38.

Modification 2B

Figure 16:
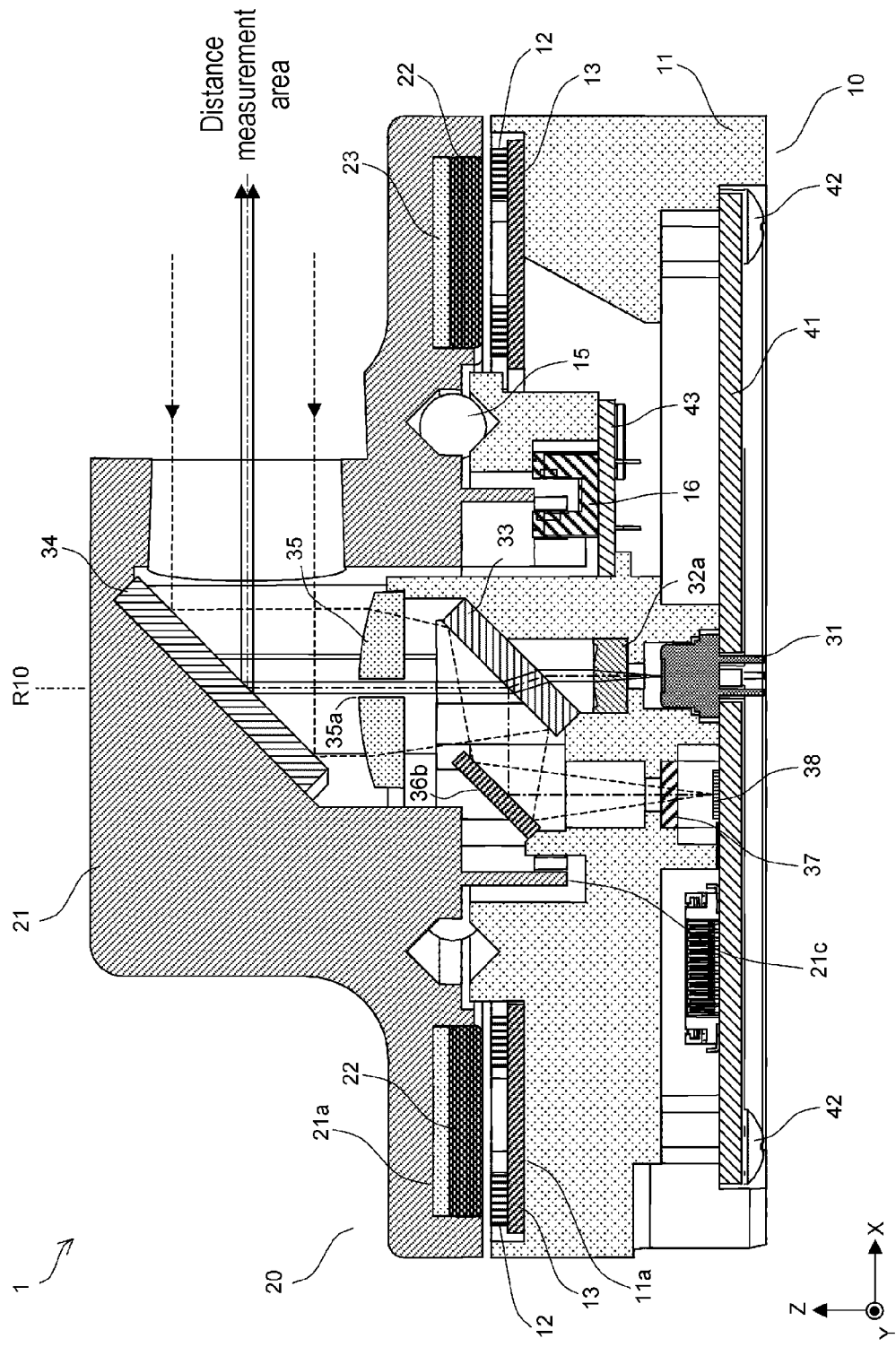
FIG. 16 is a cross-sectional view showing a configuration of a distance measurement device according to a modification 2B.

Imaging lens 35 is not necessarily disposed at the position described in the second exemplary embodiment, and may be disposed at any other positions. For example, as shown in FIG. 16, imaging lens 35 may be disposed not on the side of rotating part 20 but on the side of fixed part 10. In a modification 2B of FIG. 16, imaging lens 35 is disposed in support base 11 of fixed part 10 between beam splitter 33 and rotating mirror 34. Specifically, imaging lens 35 is disposed on projection 11c at the center of support base 11 shown in FIG. 10.

While rotating part 20 is driven by the linear motor constituted by a group of coils and a group of magnets in the second exemplary embodiment described above, rotating part 20 may be driven by other drive mechanisms. For example, a gear may be formed on an overall outer circumferential surface of rotating part 20, and it is possible to configure a drive mechanism in which the gear meshes with a gear placed on a drive shaft of a motor.

The light source is not limited to laser light source 31 and may be an LED or the like. The shape of guide trenches 11b, 21b is not limited to a V-shape, and may be any other shapes capable of guiding bearing balls 15. The projection direction of laser light (projection light) is not necessarily a direction vertical to rotating axis R10, and may be inclined to the direction vertical to rotating axis R10 by a predetermined angle. The number of coils 12 arranged, the number of magnet 22 arranged, and the number of bearing balls 15 may be appropriately changed.

Third Exemplary Embodiment

Figure 17:
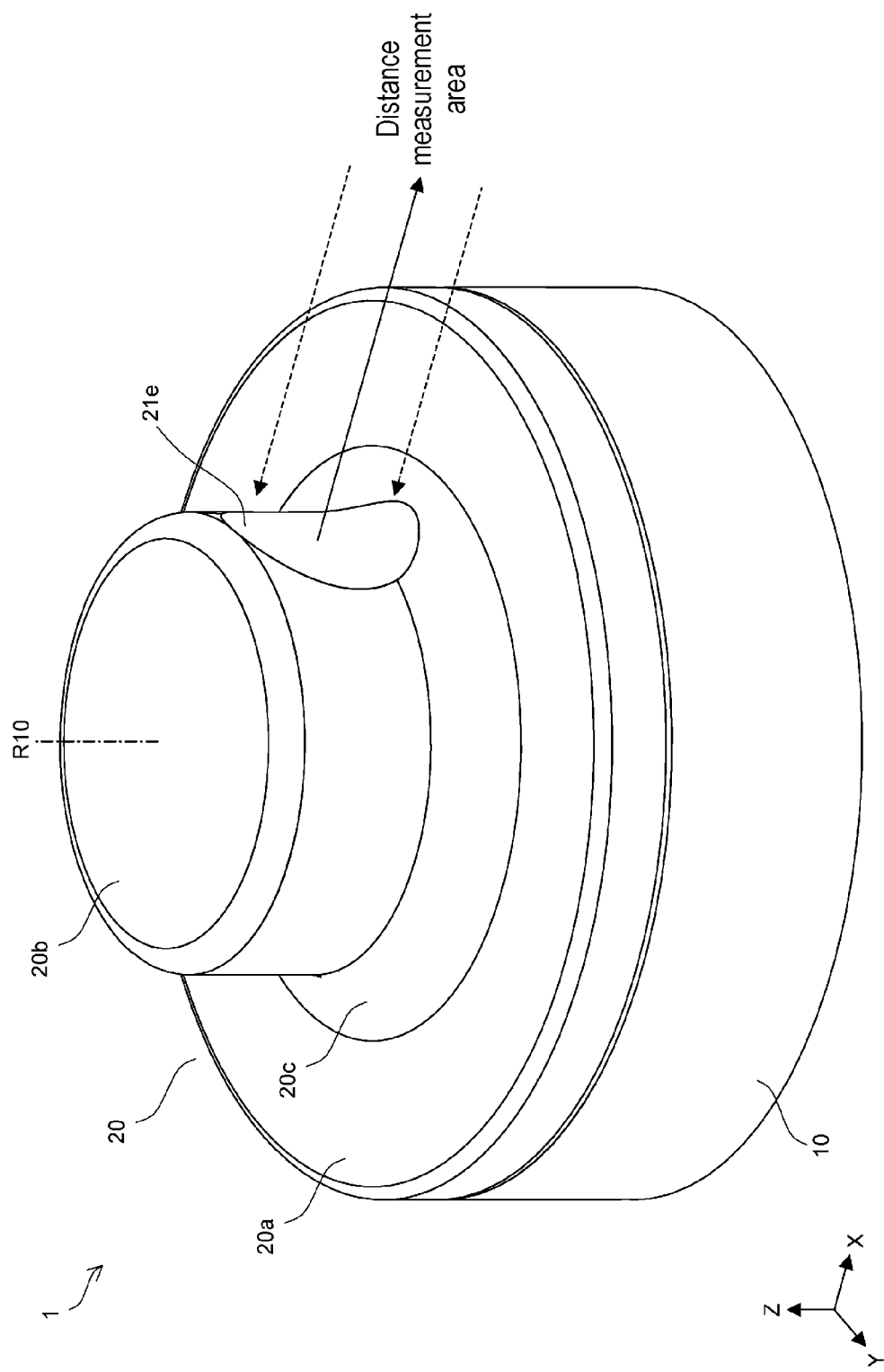
FIG. 17 is a perspective view showing a configuration of a distance measurement device according to a third exemplary embodiment.

FIG. 17 is a perspective view showing the configuration of distance measurement device 1.

As shown in FIG. 17, distance measurement device 1 includes fixed part 10 formed in a cylindrical shape and rotating part 20 rotatably disposed on fixed part 10. Rotating part 20 is constituted by large diameter part 20a having a substantially same diameter as fixed part 10, small diameter part 20b having a smaller diameter than large diameter part 20a, and inclined part 20c connecting large diameter part 20a and small diameter part 20b. Large diameter part 20a and small diameter part 20b are both formed in a cylindrical shape. Fixed part 10, and large diameter part 20a and small diameter part 20b of rotating part 20 are coaxially disposed. Opening 21e is formed in a side surface of small diameter part 20b. Laser light (projection light) is projected from opening 21e to a distance measurement area, and reflected light of laser light reflected by the distance measurement area is taken in through opening 21e.

Rotating part 20 rotates about rotating axis R10 that is parallel to the Z axis and passes through the center of small diameter part 20b. When rotating part 20 rotates, an optical axis of laser light projected from opening 21e rotates about rotating axis R10. The distance measurement area is thus rotated accordingly. As described later, distance measurement device 1 measures the distance to an object present in the distance measurement area based on a time difference (runtime) between a timing when laser light is projected on the distance measurement area and a timing when reflected light of the laser light is received from the distance measurement area. Specifically, the time difference is multiplied by the speed of light, so that the distance to the object is calculated. As rotating part 20 rotates once about rotating axis R10 as described above, distance measurement device 1 can measure the distance to an object present in the range of 360°.

Figure 18:
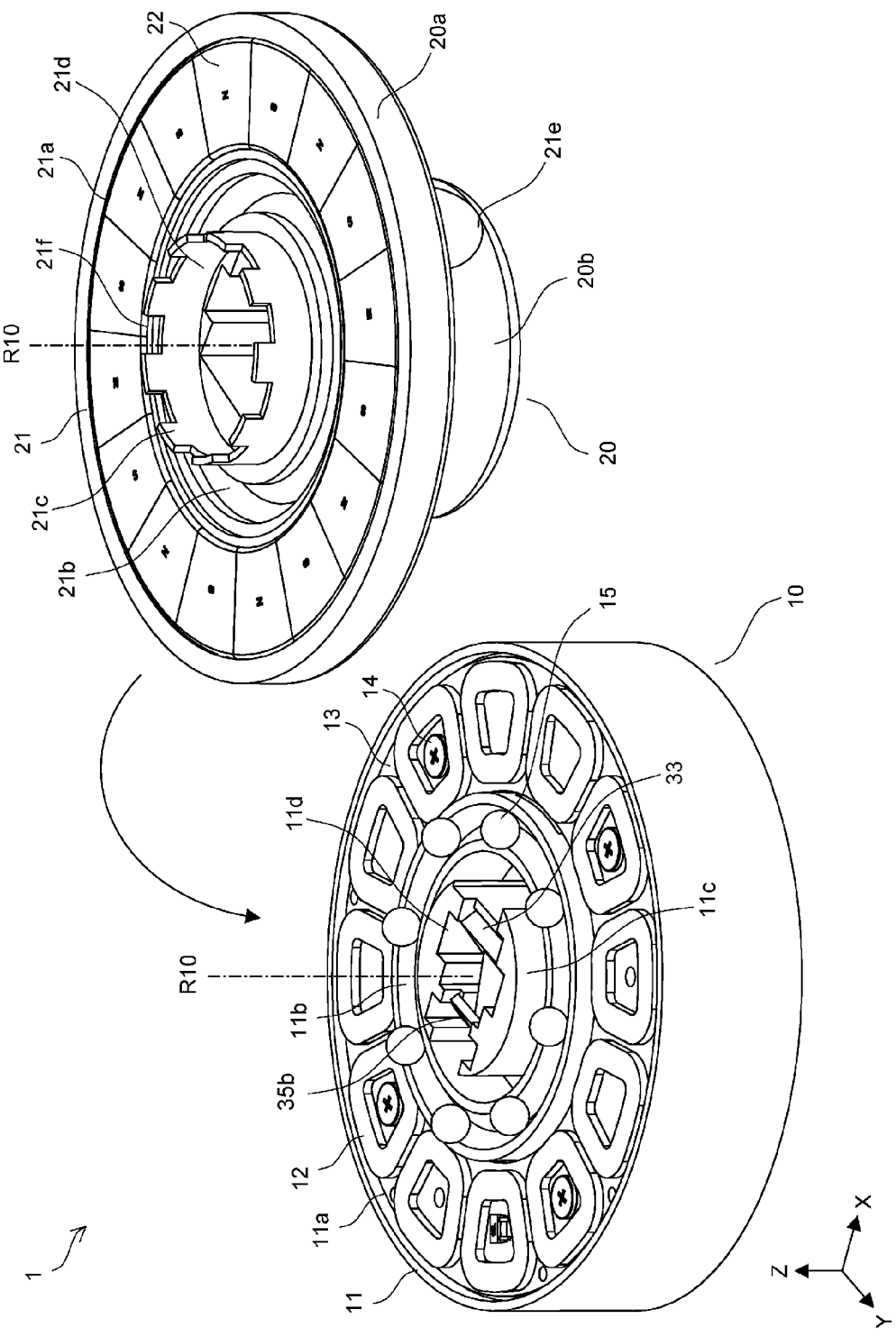
FIG. 18 is a perspective view showing the configuration of the distance measurement device according to the third exemplary embodiment in a state where a fixed part and a rotating part are separated from each other.

FIG. 18 is a perspective view showing the configuration of distance measurement device 1 in a state where fixed part 10 and rotating part 20 are separated from each other.

As shown in FIG. 18, fixed part 10 includes support base 11 formed in a cylindrical shape, coils 12, yoke 13, and bearing balls 15. Support base 11 is composed of, for example, a resin. Recess 11a is formed in an upper surface of support base 11 along a circumferential direction about rotating axis R10. Yoke 13, which is a thin plate, is fitted into recess 11a. Yoke 13 has a disc shape with the center part removed. Yoke 13 is fixed on support base 11 by screws 14.

In addition, a plurality of coils 12 are circumferentially arranged on the upper surface of yoke 13. In this case, 12 coils 12 are mounted on the upper surface of yoke 13. Yoke 13 constitutes a linear motor for rotating rotating part 20 with magnets 22 on a side of rotating part 20.

On the upper surface of support base 11, guide trench 11b with a fixed depth is formed inside of recess 11a to extend circumferentially. The shape of guide trench 11b cut along a plane vertical to the circumferential direction is a V-shape. Guide trench 11b extends circumferentially. Guide trench 11b is used for circumferentially guiding bearing balls 15. Bearing balls 15 are fitted into guide trench 11b. A spacer for keeping a constant distance between bearing balls 15 may be further fitted into guide trench 11b.

Projection 11c having a cylindrical shape is formed in a center part of support base 11, and recess 11d is formed in projection 11c. Optical members constituting an optical system to be described later are disposed in recess 11d. FIG. 18 shows beam splitter 33 and mirror 35b as the optical members.

FIG. 18 shows rotating part 20 upside down. Rotating part 20 includes support member 21 and magnets 22. Although not shown in FIG. 18, yoke 23 (see FIG. 19) is also placed in rotating part 20. In the state of FIG. 18, yoke 23 is covered by magnets 22.

Recess 21a is formed in large diameter part 20a of rotating part 20 along the circumferential direction about rotating axis R10. Yoke 23, which is a thin plate shape (see FIG. 19), is fitted into recess 21a. Yoke 23 has a disc shape with the center part removed. Yoke 23 is fixed on large diameter part 20a by thermosetting adhesives or integral molding of metal and resin.

In addition, a plurality of magnets 22 are circumferentially arranged so as to cover yoke 23. These magnets 22 are arranged in a manner that polarities of adjacent magnets 22 are opposite to each other. In this case, 16 magnets 22 are mounted so as to cover yoke 23. Magnets 22 constitute the linear motor for rotating rotating part 20 with coils 12 on a side of fixed part 10.

In support member 21, guide trench 21b with a fixed depth is formed inside of recess 21a to extend circumferentially. The shape of guide trench 21b cut along a plane vertical to the circumferential direction is a V-shape. Guide trench 21b extends circumferentially. Guide trench 21b is used for circumferentially guiding bearing balls 15 with guide trench 11b on the side of fixed part 10. When rotating part 20 is placed on fixed part 10 as shown in FIG. 17, bearing balls 15 are sandwiched between guide trench 11b on the side of fixed part 10 and guide trench 21b on the side of rotating part 20. Rotating part 20 is thus supported by fixed part 10 so as to be rotatable about rotating axis R10.

Wall 21c having a cylindrical shape is formed in a center part of support member 21, and opening 21d is formed inside of wall 21c. Fresnel lens mirror 34c to be described later (see FIG. 19) is placed in opening 21d. Opening 21d is connected to opening 21e formed in the side surface of small diameter part 20b. Cut-away parts 21f are circumferentially formed in wall 21c at fixed intervals. Cut-away part 21f is used for detecting the rotation state of rotating part 20.

When rotating part 20 is placed on fixed part 10 as described above, rotating part 20 is supported by fixed part 10 through bearing balls 15 so as to be rotatable about rotating axis R10. In this state, magnets 22 arranged on the side of rotating part 20 respectively face coils 12 arranged on the side of fixed part 10. In this way, the linear motor for driving rotating part 20 in a rotating direction is configured.

In addition, in this state, magnetic attraction force is generated between magnets 22 on the side of rotating part 20 and yoke 13 on the side of fixed part 10. This magnetic attraction force attracts rotating part 20 to fixed part 10, thus keeping a support state of rotating part 20 by fixed part 10. That is, yoke 13 constitutes a magnetic part generating magnetic attraction force for preventing fall-off of rotating part 20 between yoke 13 and magnets 22. Support base 11 may be composed of a magnetic body for the purpose of generating the magnetic attraction force.

FIG. 19 is a cross-sectional view showing the configuration of distance measurement device 1. FIG. 19 is a cross-sectional view obtained by cutting distance measurement device 1 shown in FIG. 17 at the center position in the direction of the Y axis along a plane parallel to the X-Z plane. In FIG. 19, laser light (projection light) emitted from laser light source 31 to a distance measurement area is shown by solid lines, whereas reflected light reflected by the distance measurement area is shown by broken lines. A one-dot chain line drawn in the optical system shows an optical axis of the optical system.

As shown in FIG. 19, distance measurement device 1 includes, as components of the optical system, laser light source 31, relay lens 32, beam splitter 33, Fresnel lens mirror 34c, mirror 35b, filter 36, and photodetector 38. Laser light source 31 and photodetector 38 are placed on circuit board 41. Relay lens 32, beam splitter 33, mirror 35b, and filter 36 are placed in support base 11 on the side of fixed part 10. Fresnel lens mirror 34c is placed in support member 21 of rotating part 20.

Laser light source 31 emits laser light of a predetermined wavelength. Laser light source 31 is, for example, a semiconductor laser. An emission optical axis of laser light source 31 is parallel to the Z axis. Laser light source 31 is placed on circuit board 41 placed on a lower surface of support base 11. Circuit board 41 is placed on the lower surface of support base 11 by screws 42. A radiation angle of laser light emitted from laser light source 31 is reduced by relay lens 32, and then the laser light enters beam splitter 33. Laser light is transmitted through beam splitter 33 to be directed to Fresnel lens mirror 34c. Beam splitter 33 separates an optical path of laser light (projection light) emitted from laser light source 31 from an optical path of reflected light reflected by the distance measurement area.

Figure 20A:
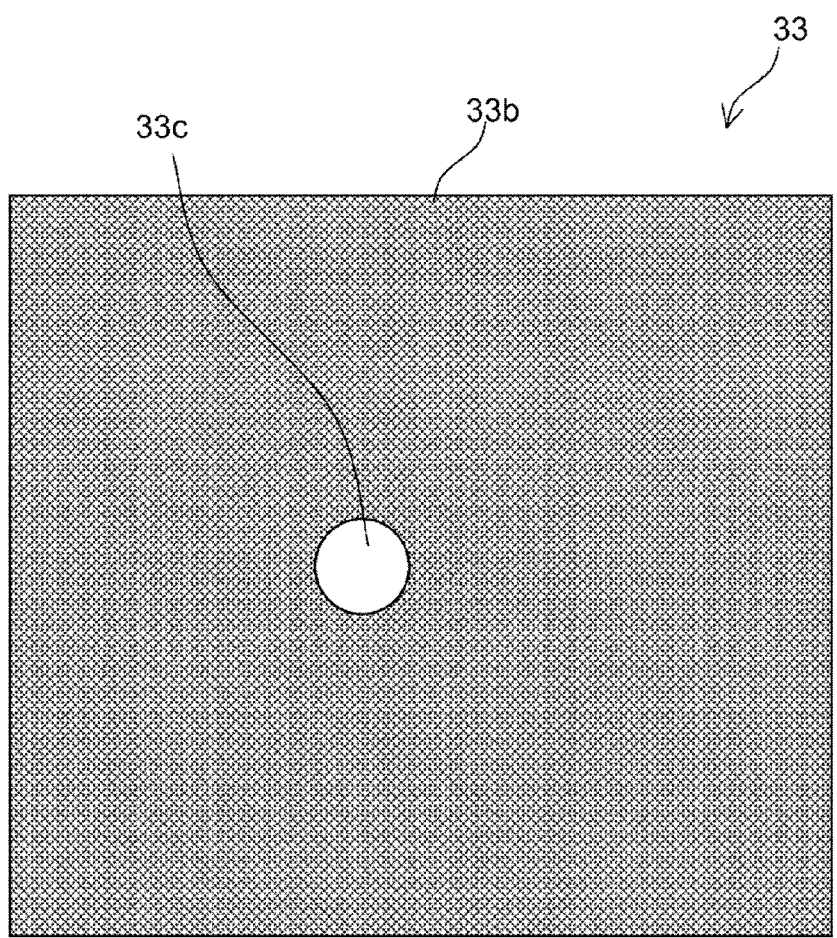
FIG. 20A is a plan view showing a configuration of a beam splitter according to the third exemplary embodiment.
Figure 20B:
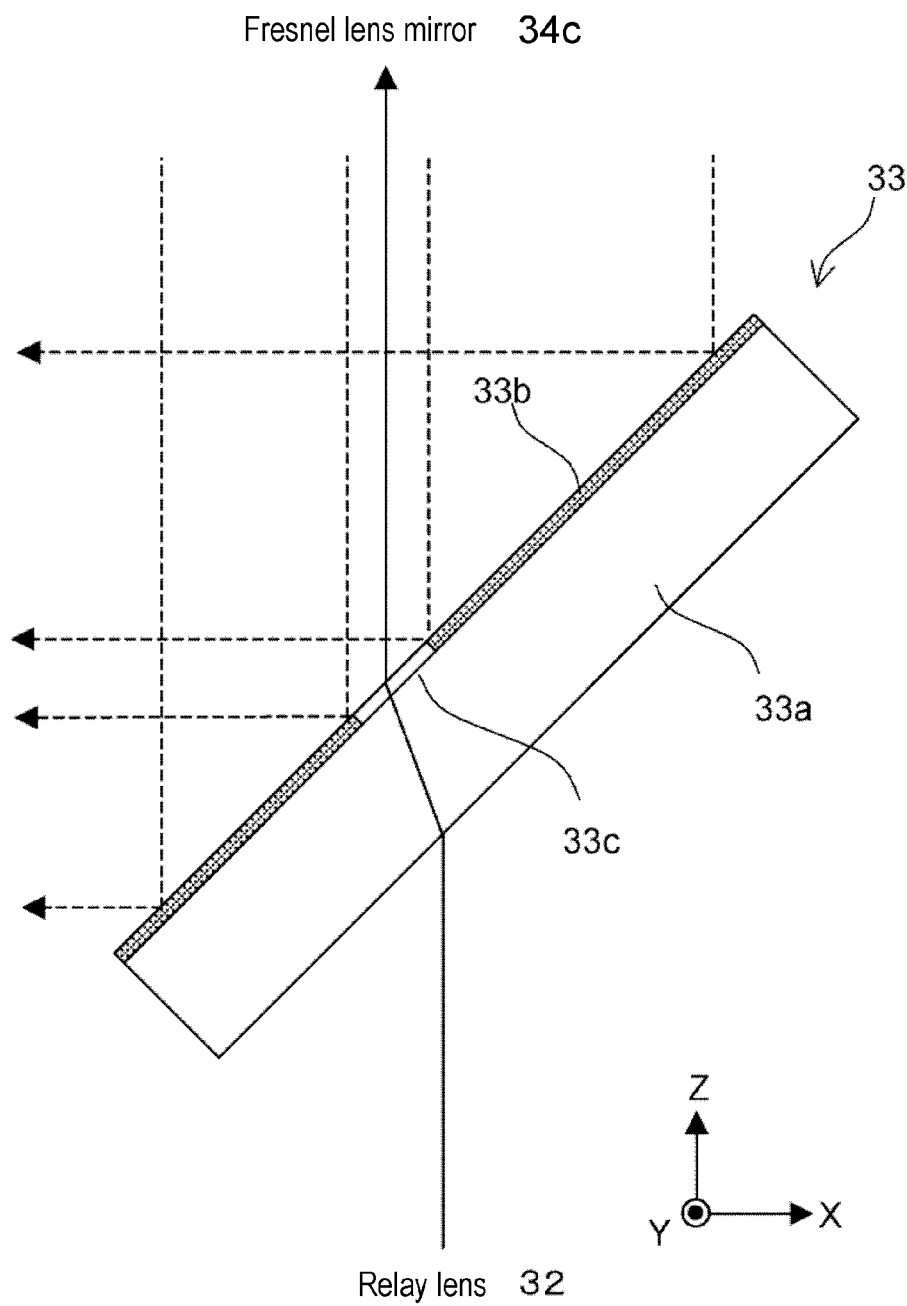
FIG. 20B is a side view showing the configuration of the beam splitter according to the third exemplary embodiment.

FIG. 20A is a plan view showing a configuration of beam splitter 33 and FIG. 20B is a side view showing the configuration of beam splitter 33.

As shown in FIGS. 20A and 20B, beam splitter 33 is configured by forming reflection film 33b on a surface of transparent substrate 33a with a fixed thickness. Reflection film 33b is formed on an overall area other than circular hole 33c. Hole 33c is set to be slightly larger than an area through which laser light entering from a side of relay lens 32 passes. Consequently, substantially all the laser light entering from the side of relay lens 32 is transmitted through beam splitter 33 to be directed to Fresnel lens mirror 34c. Beam splitter 33 is disposed so as to be inclined to the Z axis by 45°.

Returning to FIG. 19, Fresnel lens mirror 34c is disposed in a common optical path of projection light and reflected light. In FIG. 19, the common optical path is an optical path from beam splitter 33 to opening 21e. Fresnel lens mirror 34c is placed in support member 21 in a manner an incident surface opposes beam splitter 33. The incident surface of Fresnel lens mirror 34c is a plane. Fresnel lens mirror 34c is disposed in a manner that the incident surface is inclined to a center axis of the common optical path of projection light and reflected light (the Z axis) by 45°. The optical axis of laser light having been transmitted through beam splitter 33 is bent by 90° by Fresnel lens mirror 34c. That is, the laser light is reflected by Fresnel lens mirror 34c in a direction of opening 21e.

More specifically, laser light is transmitted through the incident surface of Fresnel lens mirror 34c to be reflected by a reflecting surface disposed on further inner side than the incident surface. A reflecting Fresnel lens is formed on the reflecting surface. When laser light having been transmitted through the incident surface of Fresnel lens mirror 34c is reflected by the reflecting surface, the laser light is subjected to a convergence action by the Fresnel lens formed on the reflecting surface to be converted into parallel light. Laser light having been converted into parallel light is emitted from the incident surface of Fresnel lens mirror 34c in the positive direction of the X axis, passed through opening 21e, and projected on a distance measurement area.

Figure 21A:
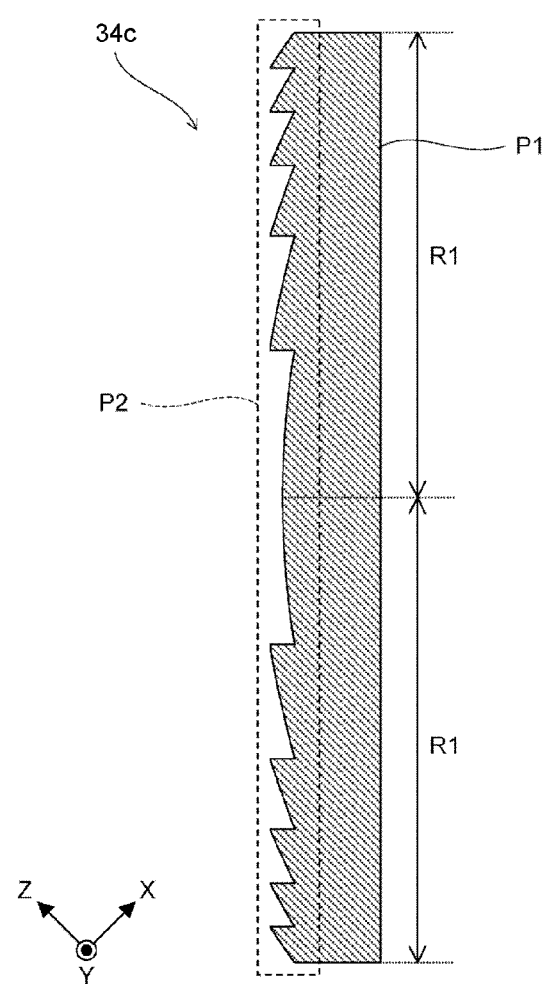
FIG. 21A is a cross-sectional view schematically showing a configuration of a Fresnel lens mirror according to the third exemplary embodiment.
Figure 21B:
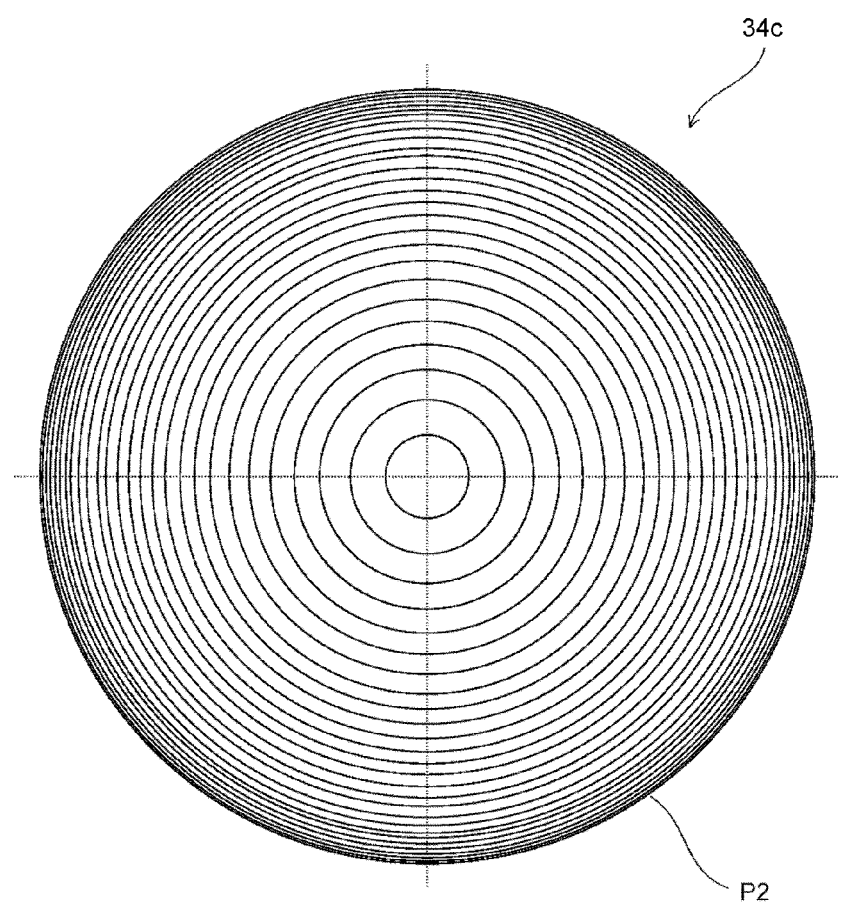
FIG. 21B is a plan view schematically showing the configuration of the Fresnel lens mirror according to the third exemplary embodiment.

FIG. 21A is a cross-sectional view schematically showing a configuration of Fresnel lens mirror 34c according to the third exemplary embodiment and FIG. 21B is a plan view schematically showing the configuration of Fresnel lens mirror 34c according to the third exemplary embodiment. FIG. 21A schematically shows a cross-section obtained by cutting Fresnel lens mirror 34c in a plane vertical to incident surface P1 along a diameter of Fresnel lens mirror 34c. FIG. 21B schematically shows a state of reflecting surface P2 when Fresnel lens mirror 34c is viewed from a side of the incident surface.

A lens pattern is schematically shown as saw-shaped steps in FIG. 21A, whereas the lens pattern is schematically shown as ring-shaped stripes in FIG. 21B. FIGS. 21A and 21B only show the lens pattern schematically. In actual Fresnel lens mirror 34c, fineness (a pitch) of the lens pattern in a radial direction is significantly fine. For the sake of illustration, a number of the lens patterns in FIG. 21A is less than that in FIG. 21B.

As shown in FIGS. 21A and 21B, Fresnel lens mirror 34c has a circular shape in a planar view. A lens area of Fresnel lens mirror 34c is a circular area with radius R1. Fresnel lens mirror 34c is composed of a light transmitting material such as a resin, and has lens patterns constituting the Fresnel lens on a surface opposite to incident surface P1. A reflection film is formed on the surface opposite to incident surface P1, so that reflecting surface P2 is formed. Reflecting surface P2 reflects light that is transmitted through incident surface P1 to reach reflecting surface P2. Reflecting surface P2 applies the convergence action to light by the lens patterns constituting the Fresnel lens.

In a state where Fresnel lens mirror 34c is disposed to be inclined to the optical axis of laser light source 31 by 45° as shown in FIG. 19, the lens patterns of Fresnel lens mirror 34c are adjusted in a manner that reflected light (parallel light) having been reflected by the distance measurement area and passed through opening 21e converges on a light receiving surface of photodetector 38. That is, the lens patterns of Fresnel lens mirror 34c are set in a manner that, on all the areas of Fresnel lens mirror 34c, reflected light (parallel light) having passed through opening 21e is subjected to the convergence action on the light receiving surface of photodetector 38. An optical path length from Fresnel lens mirror 34c to photodetector 38 is substantially equal to a focal length of Fresnel lens mirror 34c.

Laser light (projection light) entering incident surface P1 from a side of beam splitter 33 is emitted as parallel light from incident surface P1 in the positive direction of the X axis. That is, a divergence angle of laser light emitted from laser light source 31 is adjusted by relay lens 32 so that the laser light is converted into parallel light when reflected by Fresnel lens mirror 34c.

Returning to FIG. 19, when an object is present in the distance measurement area, laser light projected from opening 21e on the distance measurement area is reflected by the object to be directed again to opening 21e. Reflected light reflected by the object is taken in through opening 21e to be guided to Fresnel lens mirror 34c. When reflected by Fresnel lens mirror 34c, reflected light is subjected to the convergence action by Fresnel lens mirror 34c, as described above. In this way, reflected light is reflected by Fresnel lens mirror 34c to enter beam splitter 33.

With reference to FIG. 20B, reflected light entering beam splitter 33 is reflected by reflection film 33b in the negative direction of the X axis. FIG. 20B shows reflected light by broken lines. Reflected light entering hole 33c is not reflected and is transmitted through beam splitter 33. Reflected light entering the area of reflection film 33b other than hole 33c is reflected by reflection film 33b in the negative direction of the X axis to be directed to mirror 35b. For the sake of convenience, while reflected light is shown as parallel light in FIG. 20B, the reflected light is actually converging light.

Returning to FIG. 19, reflected light reflected by beam splitter 33 is reflected by mirror 35b in the negative direction of the Z axis. Mirror 35b is a total reflection mirror having a reflecting surface on its one surface. Mirror 35b is placed in a manner that the reflecting surface is inclined to the Z axis by 45°. Reflected light reflected by mirror 35b is transmitted through filter 36 to converge on photodetector 38.

Filter 36 is configured to transmit light of a wavelength band of laser light emitted from laser light source 31 and to block light of other wavelength bands. A pinhole having a substantially same diameter as a beam diameter of reflected light entering filter 36 may be formed in an incident surface or an emitting surface of filter 36. The pinhole can remove more stray light. Photodetector 38 outputs a detection signal based on the quantity of light received. When a pinhole is formed in filter 36, the optical system may be adjusted in a manner that the pinhole is positioned at a focus position of Fresnel lens mirror 34c.

The optical system shown in FIG. 19 is laid out in a manner that an optical path length from Fresnel lens mirror 34c to photodetector 38 is substantially equal to a focal length of Fresnel lens mirror 34c. Relay lens 32 adjusts the divergence angle of laser light in a manner that laser light emitted from laser light source 31 is converted into parallel light by Fresnel lens mirror 34c. As shown in FIG. 19, even if an optical path length from Fresnel lens mirror 34c to laser light source 31 is different from the optical path length from Fresnel lens mirror 34c to photodetector 38, laser light source 31 and photodetector 38 can be placed on identical circuit board 41.

In the configuration of FIG. 19, in addition to circuit board 41, sub-board 43 is placed in support base 11 and detector 16 is disposed on sub-board 43. Detector 16 includes an emission part and a light receiving part opposing the emission part. Detector 16 is disposed in a manner that wall 21c on the side of rotating part 20 shown in FIG. 18 is positioned in a gap between the emission part and the light receiving part.

As the rotating part 20 rotates and cut-away part 21f formed in wall 21c is positioned between the emission part and the light receiving part of detector 16, light from the emission part is received by the light receiving part, so that a high-level signal is output from detector 16. When cut-away part 21f passes, light from the emission part is blocked by wall 21c and a signal from detector 16 falls to a low-level. Consequently, when rotating part 20 rotates, a pulse signal having a period based on a rotational speed is output from detector 16. This signal enables the rotation state of rotating part 20 to be detected. Sub-board 43 is electrically connected to circuit board 41 by signal lines (not shown).

Figure 22:
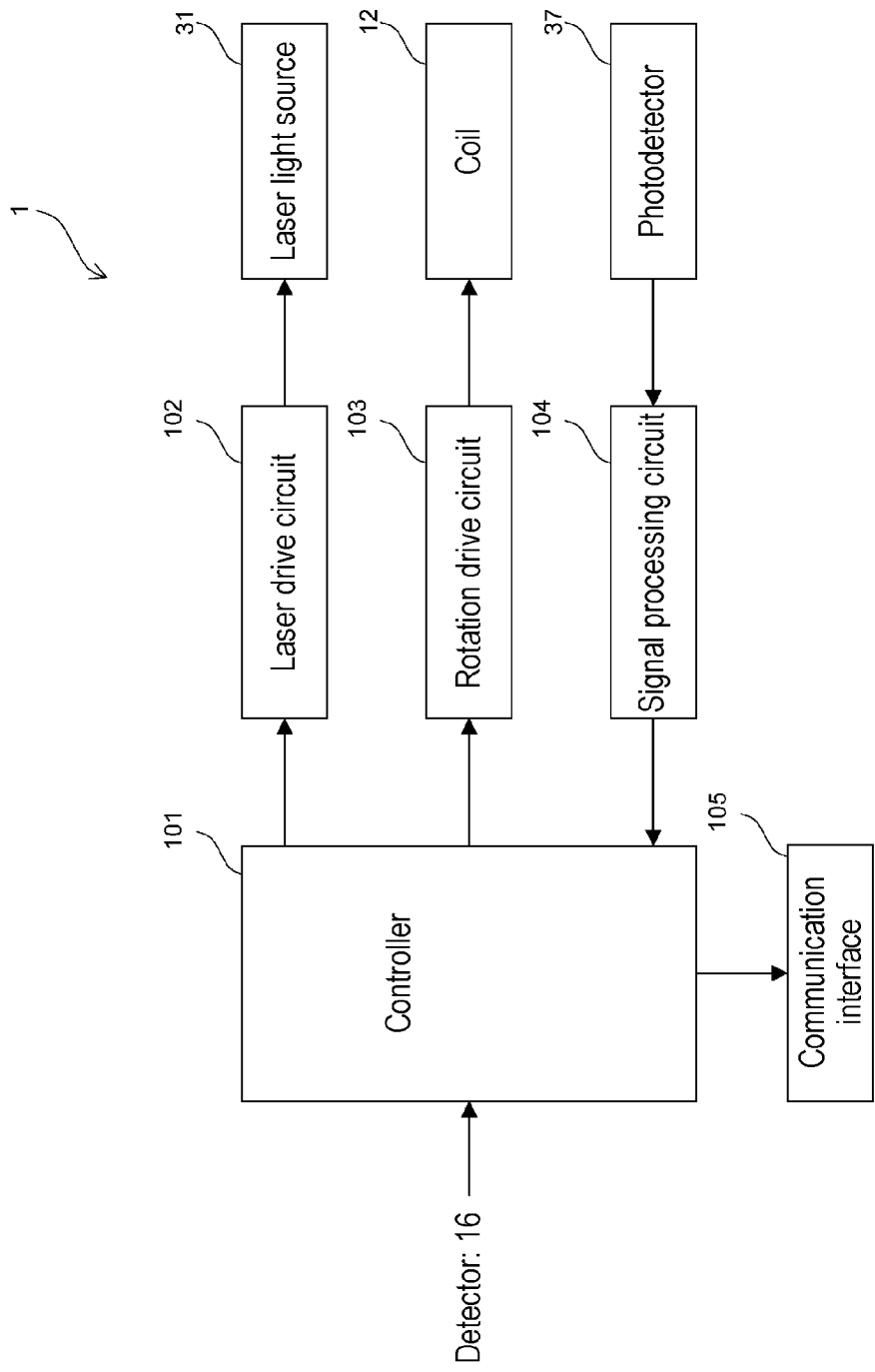
FIG. 22 is a circuit block diagram showing the configuration of the distance measurement device according to the third exemplary embodiment.

FIG. 22 is a circuit block diagram showing the configuration of distance measurement device 1.

As shown in FIG. 22, distance measurement device 1 includes controller 101, laser drive circuit 102, rotation drive circuit 103, and signal processing circuit 104 as components of a circuit unit.

Controller 101 includes an arithmetic processing circuit such as a CPU (Central Processing Unit) and a memory, and controls components based on a predetermined control program. Laser drive circuit 102 drives laser light source 31 in response to control of controller 101. Rotation drive circuit 103 conducts current through coils 12 in response to the control of controller 101. For example, controller 101 controls rotation drive circuit 103 in a manner that rotating part 20 rotates at a predetermined rotational speed, based on a pulse signal input from detector 16. In response thereto, rotation drive circuit 103 adjusts the quantity of current conducting through coils 12 and a conduction timing.

Signal processing circuit 104 performs amplification and noise reduction on a detection signal input from photodetector 38 and outputs a resultant signal to controller 101. Communication interface 105 is used for communication with apparatuses in which distance measurement device 1 is installed.

In a distance measurement operation, controller 101 controls rotation drive circuit 103 to rotate rotating part 20, and at the same time, controls laser drive circuit 102 to output laser light of predetermined pulses from laser light source 31 at every predetermined timing. Based on a detection signal of photodetector 38 input from signal processing circuit 104, controller 101 detects a light receiving timing of a laser light pulse emitted at each emission timing. Controller 101 then measures the distance to an object present in a distance measurement area at each emission timing, based on a time difference (runtime) between the emission timing and the light receiving timing of laser light.

Specifically, controller 101 multiplies the time difference (the runtime) by the speed of light to calculate the distance to the object. Controller 101 transmits data of the distance calculated as described above, as needed, via communication interface 105 to an apparatus in which distance measurement device 1 is installed. Based on the distance data received, the apparatus determines the distance to an object present in the range of 360° and executes predetermined control.

Effects of Third Exemplary Embodiment

The present exemplary embodiment described above achieves the following effects.

Reflected light is condensed by Fresnel lens mirror 34c, and thus it is not necessary to dispose an imaging lens for condensing reflected light in an optical system. It is thus possible to prevent an influence of stray light generated by the imaging lens. As shown in FIG. 19, Fresnel lens mirror 34c is disposed so as to be inclined to a common optical path of laser light (projection light) and reflected light. It is thus possible to prevent a part of laser light (projection light) reflected by Fresnel lens mirror 34c from becoming stray light and being directed to photodetector 38. Consequently, it is possible to prevent an influence of the stray light on a detection signal. Moreover, Fresnel lens mirror 34c has a function as a mirror, that is, a function of reflecting laser light (projection light) to a distance measurement area and reflecting reflected light from the distance measurement area to photodetector 38, and a function as a lens, that is, a function of condensing reflected light on photodetector 38. A number of optical components disposed in the optical system can thus be reduced. Consequently, the configuration of distance measurement device 1 can be simplified. According to the present exemplary embodiment, the simple configuration can reduce the influence of stray light on a detection signal.

As shown in FIG. 19, Fresnel lens mirror 34c is disposed to be inclined to rotating axis R10 of rotating part 20 by 45°, and a common optical path of laser light (projection light) and reflected light is coaxial with rotating axis R10 between fixed part 10 and Fresnel lens mirror 34c. An incident direction and an incident area of laser light (projection light) on Fresnel lens mirror 34c can be identical and a reflection direction of reflected light reflected by Fresnel lens mirror 34c can be identical, regardless of a rotation position of Fresnel lens mirror 34c. Laser light (projection light) can be appropriately guided to a 360-degree distance measurement area and reflected light from the 360-degree distance measurement area can be appropriately condensed on photodetector 38.

As shown in FIGS. 20A and 20B, beam splitter 33 includes a reflection area (reflection film 33b) reflecting reflected light and a transmission area (hole 33c) transmitting laser light (projection light). More reflected light can thus be guided to photodetector 38 and reflected light can be detected successfully.

As shown in FIG. 19, laser light source 31 and photodetector 38 are disposed on common circuit board 41, and mirror 35b that reflects reflected light passing through beam splitter 33 to guide the reflected light to circuit board 41 is disposed in fixed part 10. As laser light source 31 and photodetector 38 that require power supply are placed on common circuit board 41, the configuration can be simplified and the cost reduction can be achieved. As mirror 35b bends the optical path of reflected light, the reflected light can be smoothly guided to photodetector 38 placed on circuit board 41.

As shown in FIG. 19, relay lens 32 is disposed between laser light source 31 and beam splitter 33. Relay lens 32 condenses laser light emitted from laser light source 31, and thus an area of laser light transmitting through beam splitter 33 can be reduced and the reflection area of reflected light on beam splitter 33 can be increased accordingly. More reflected light can thus be guided to photodetector 38.

As shown in FIG. 18, distance measurement device 1 includes a group of coils (12 coils 12) arranged around rotating axis R10 of rotating part 20 on the surface of fixed part 10 on the side of rotating part 20, and a group of magnets (16 magnets 22) arranged around rotating axis R10 so as to oppose the group of coils on the surface of rotating part 20 on the side of fixed part 10. As rotating part 20 is driven by a non-contact linear motor constituted by the group of coils and the group of magnets, distance measurement device 1 can be made compact as shown in FIG. 17, while the optical path of the optical system and a space for disposing the optical system are kept in the center part of distance measurement device 1.

As shown in FIG. 18, distance measurement device 1 includes guide trench 11b (first trench) disposed around rotating axis R10 on the surface of fixed part 10 on the side of rotating part 20 and guide trench 21b (second trench) disposed on the surface of rotating part 20 on the side of fixed part 10 so as to oppose guide trench 11b (first trench). In addition, distance measurement device 1 includes bearing balls 15 fitted into guide trench 11b (first trench) and sandwiched between guide trench 11b (first trench) and guide trench 21b (second trench) and yoke 13 (magnetic part) that is disposed in fixed part 10 so as to oppose magnets 22 and that generates magnetic attraction force between yoke 13 and magnets 22. With this configuration, the support state of rotating part 20 by fixed part 10 is kept using magnetic attraction force between magnets 22 and yoke 13 constituting a part of the linear motor. The mechanism of supporting rotating part 20 by fixed part 10 can be simplified and thus distance measurement device 1 can be made compact as a whole. Rotating part 20 can be rotatably supported by fixed part 10 only by placing rotating part 20 on fixed part 10.

Modification 3A

In addition to the configuration of distance measurement device 1 described in the third exemplary embodiment, various modifications can be made.

Figure 23:
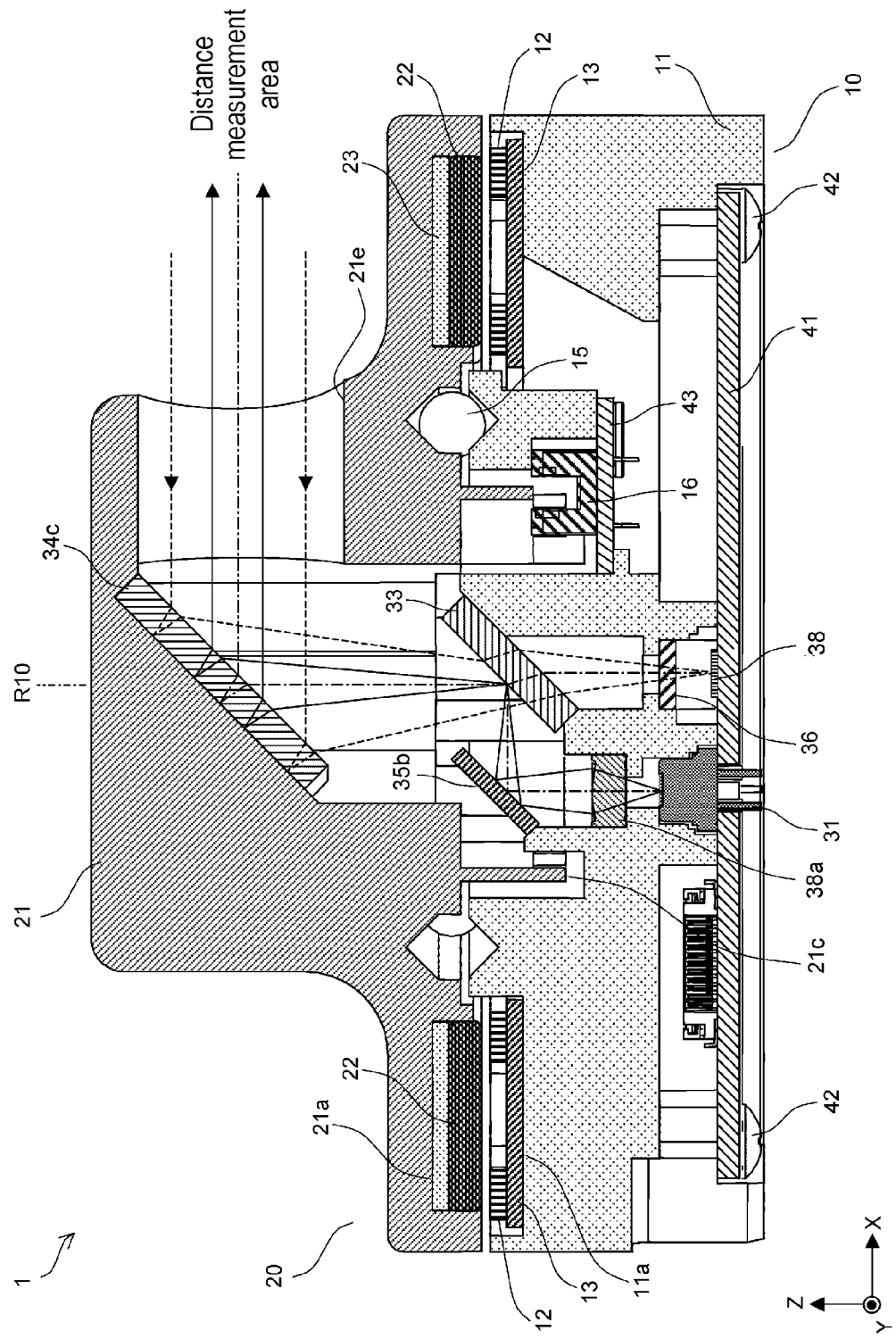
FIG. 23 is a cross-sectional view showing a configuration of a distance measurement device according to a modification 3A.

For example, it may be configured as shown in FIG. 23 that laser light emitted from laser light source 31 is reflected by beam splitter 33 and reflected light from a distance measurement area is transmitted through beam splitter 33 to be guided to photodetector 38. Similarly to FIG. 19, FIG. 23 is a cross-sectional view obtained by cutting distance measurement device 1 shown in FIG. 17 at the center position in the direction of the Y axis along a plane parallel to the X-Z plane.

Figure 24A:
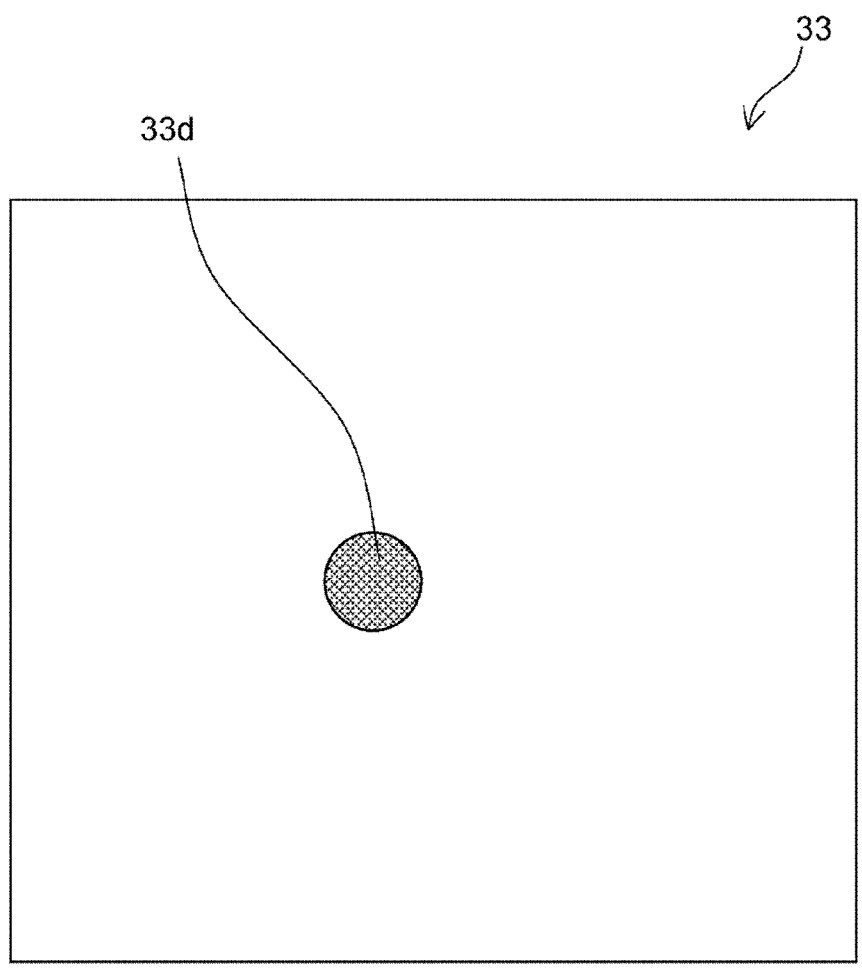
FIG. 24A is a plan view showing a configuration of a beam splitter according to the modification 3A.
Figure 24B:
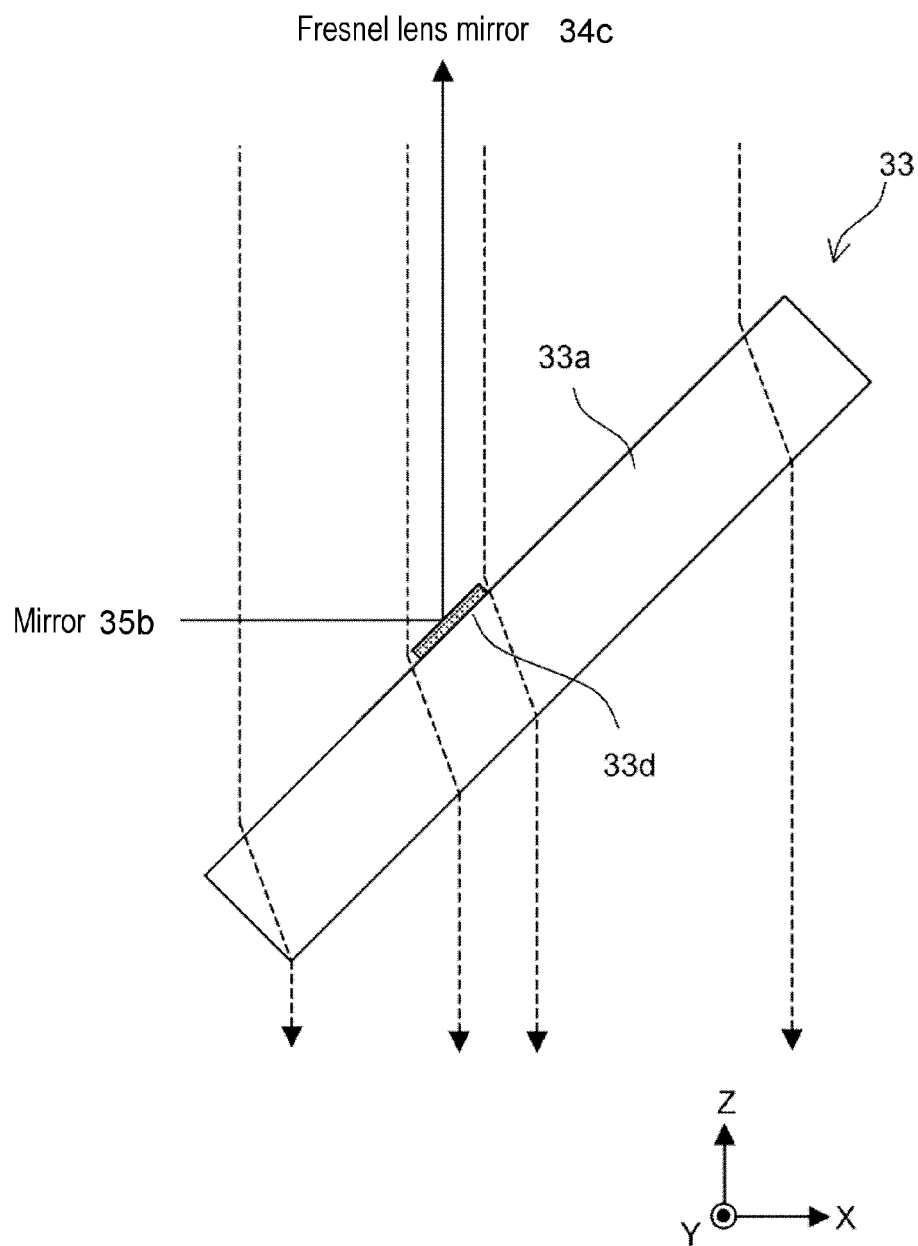
FIG. 24B is a side view showing the configuration of the beam splitter according to the modification 3A.

In this case, laser light emitted from laser light source 31 is reflected by mirror 35b to be guided to beam splitter 33. The configuration of beam splitter 33 is changed to the configuration shown in FIGS. 24A and 24B. That is, as shown in FIGS. 24A and 24B, reflection film 33d is formed on an incident area of laser light (projection light) on a surface of beam splitter 33 on the positive side of the Z axis, and the reflection film is not formed on other areas.

As shown in FIG. 23, instead of relay lens 32, condenser lens 38a that converges laser light emitted from laser light source 31 on a surface of beam splitter 33 on a side of mirror 35b may be disposed in the configuration. In this case, Fresnel lens mirror 34c may be configured to include a first Fresnel lens part for converting laser light (projection light) into parallel light on a center part that laser light (projection light) enters and a second Fresnel lens part for condensing reflected light on photodetector 38 on an area outside the center part.

Figure 25A:
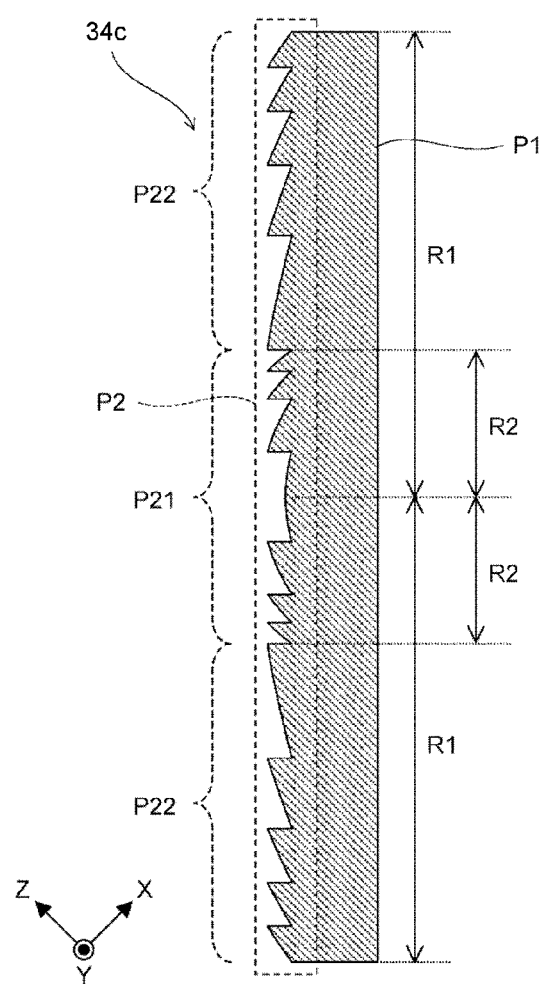
FIG. 25A is a cross-sectional view schematically showing a configuration of a Fresnel lens mirror according to the modification 3A.
Figure 25B:
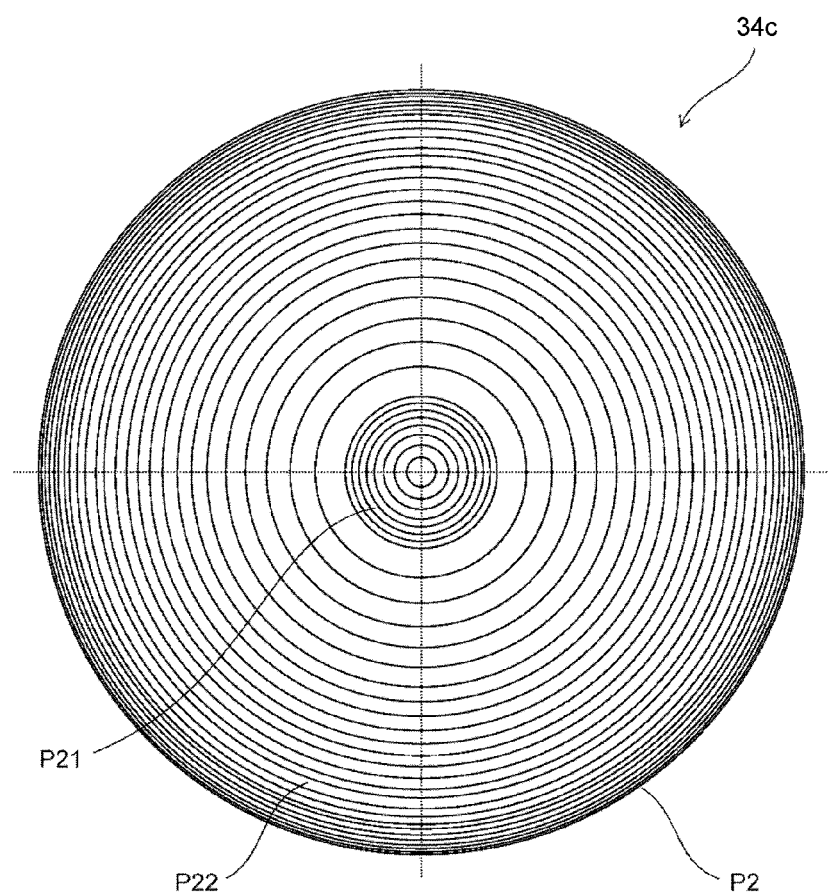
FIG. 25B is a plan view schematically showing the configuration of the Fresnel lens mirror according to the modification 3A.

FIG. 25A is a cross-sectional view schematically showing a configuration of Fresnel lens mirror 34c according to the modification 3A and FIG. 25B is a plan view schematically showing the configuration of Fresnel lens mirror 34c according to the modification 3A. A lens pattern is schematically shown as saw-shaped steps in FIG. 25A, similarly to FIG. 21A. The lens pattern is schematically shown as ring-shaped stripes in FIG. 25B, similarly to FIG. 21B.

In Fresnel lens mirror 34c, first Fresnel lens part P21 is formed on the center part that laser light emitted from laser light source 31 enters and second Fresnel lens part P22 is formed outside first Fresnel lens part P21. As in the third exemplary embodiment, lens patterns constituting a Fresnel lens are formed on a surface opposite to incident surface P1 and a reflection film is formed on this surface, so that reflecting surface P2 is formed.

As in the third exemplary embodiment described above, a lens area of Fresnel lens mirror 34c is a circular area with radius R1. The center area with radius R2 is first Fresnel lens part P21, and a remaining area is second Fresnel lens part P22. Light converging power of first Fresnel lens part P21 is larger than light converging power of second Fresnel lens part P22.

In the state where Fresnel lens mirror 34c is disposed to be inclined to the optical axis of laser light source 31 by 45° as shown in FIG. 19, lens patterns of first Fresnel lens part P21 are adjusted in a manner that laser light (projection light) entering incident surface P1 from a side of beam splitter 33 is emitted as parallel light from incident surface P1 in the positive direction of the X axis. That is, a focal length of Fresnel lens mirror 34*c* is substantially equal to an optical path length between Fresnel lens mirror 34*c* and beam splitter 33.

In the state where Fresnel lens mirror 34*c* is disposed to be inclined to the optical axis of laser light source 31 by 45° as shown in FIG. 19, lens patterns of second Fresnel lens part P22 are adjusted in a manner that reflected light (parallel light) having been reflected by the distance measurement area and passed through opening 21*e* converges on a light receiving surface of photodetector 38. That is, the focal length of Fresnel lens mirror 34*c* is substantially equal to an optical path length between Fresnel lens mirror 34*c* and photodetector 38.

Other configurations of modification 3A shown in FIG. 23 are similar to those of the third exemplary embodiment described above.

The modification 3A shown in FIG. 23 may achieve similar effects as those of the third exemplary embodiment described above. However, an optical path of reflected light is not bent by beam splitter 33 and mirror 35*b* in the configuration of the modification 3A. As compared to the third exemplary embodiment described above, the optical path length from Fresnel lens mirror 34*c* to photodetector 38 becomes shorter. For this reason, it is necessary to reduce the focal length of Fresnel lens mirror 34*c* as compared to the third exemplary embodiment described above, and thus the incident area of reflected light on beam splitter 33 is reduced.

In the modification 3A shown in FIG. 23, laser light is condensed on the incident surface of beam splitter 33 by condenser lens 38*a*. Consequently, even if the incident area of reflected light on beam splitter 33 is reduced, it is possible to prevent influences of opening accuracy of beam splitter 33, mispositioning in mounting, and the like from appearing significantly as variations in the quantity of reflected light taken in by photodetector 38.

FIG. 26 schematically shows a light beam area of laser light (projection light) and reflected light near beam splitter 33.

As shown in FIG. 26, a convergence action of first Fresnel lens part P21 is different from a convergence action of second Fresnel lens part P22, and thus a light beam area of laser light (projection light) and reflected light passing through first Fresnel lens part P21 is separated from a light beam area of reflected light passing through second Fresnel lens part P22 on the incident surface of beam splitter 33. Reflection film 33*d* of beam splitter 33 is disposed inside the area where reflected light enters with a predetermined gap between reflection film 33*d* and the area where reflected light enters. Laser light (projection light) reflected by mirror 35*b* converges on reflection film 33*d* disposed as described above.

Thus, even if beam splitter 33, Fresnel lens mirror 34*c*, and mirror 35*b* are slightly mispositioned, the light beam area of reflected light does not overlap reflection film 33*d* and a convergence position of laser light (projection light) is not out of reflection film 33*d*. Reflected light passing through second Fresnel lens part P22 can be reliably guided to photodetector 38, and laser light (projection light) can be reliably guided to a distance measurement area.

In the present modification, Fresnel lens mirror 34*c* is configured to include first Fresnel lens part P21 for converting laser light (projection light) into parallel light on the center part and second Fresnel lens part P22 for condensing reflected light on photodetector 38 on the area outside the center part. Laser light (projection light) can thus be smoothly guided to a distance measurement area and reflected light from the distance measurement area can be smoothly guided to photodetector 38 regardless of a layout of an optical system and a convergence state of laser light and reflected light.

In addition, distance measurement device 1 includes condenser lens 38*a* that converges laser light (projection light) emitted from laser light source 31 on a branch position of a common optical path at beam splitter 33. Consequently, as described with reference to FIG. 26, even if beam splitter 33 or the like is mispositioned, laser light (projection light) can be reliably guided to the distance measurement area and reflected light from the distance measurement area can be reliably guided to photodetector 38.

Also in the configuration of the third exemplary embodiment shown in FIG. 19, a condenser lens may be used instead of relay lens 32 to converge laser light emitted from laser light source 31 on a surface of beam splitter 33 on the positive side of the Z axis. In this case, the configuration of Fresnel lens mirror 34*c* is changed to a configuration that includes a first Fresnel lens part converting laser light into parallel light and a second Fresnel lens part converging reflected light from a distance measurement area on photodetector 38, as in the present modification.

Modification 3B

Figure 27:
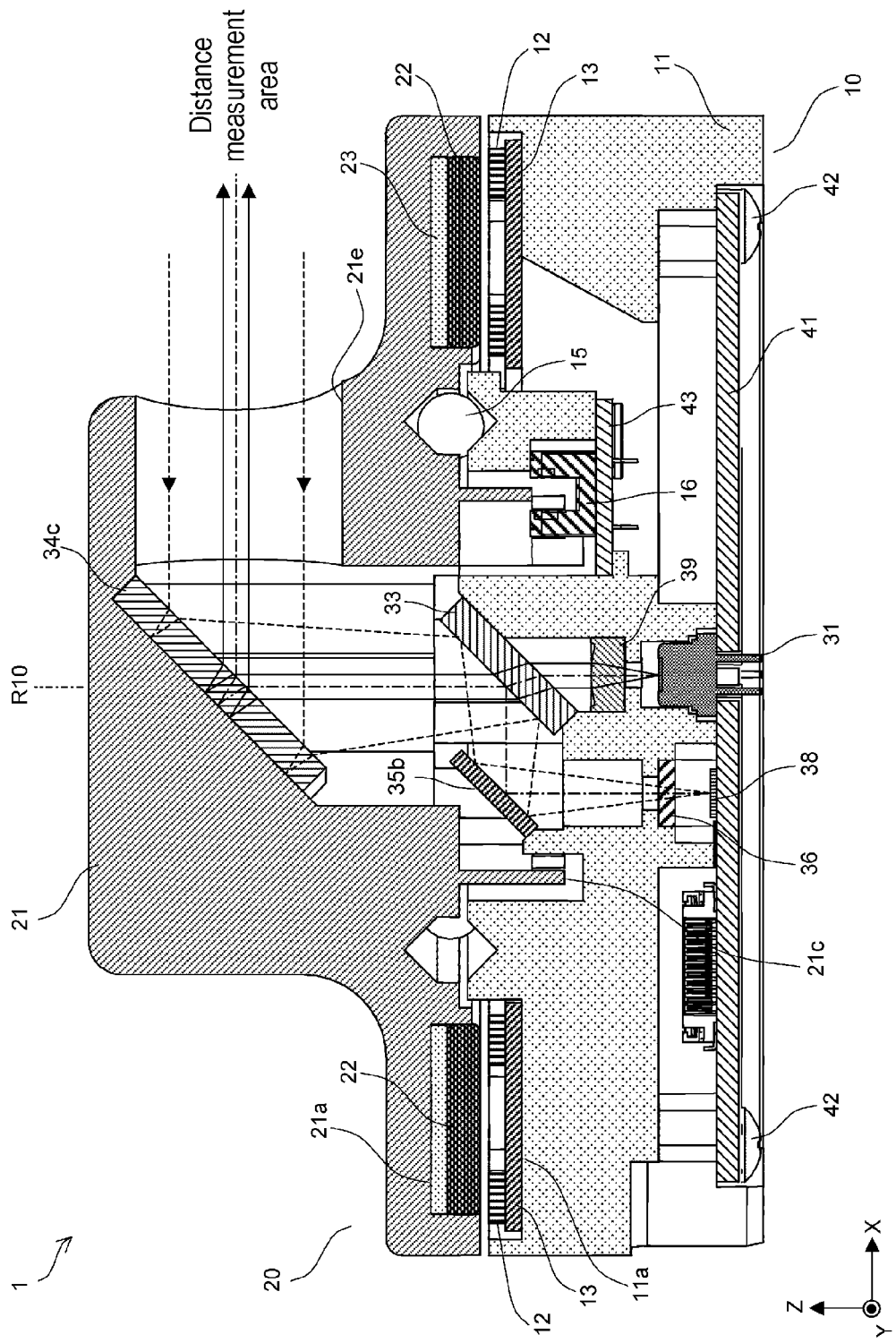
FIG. 27 is a cross-sectional view showing a configuration of a distance measurement device according to a modification 3B.

As shown in FIG. 27, collimator lens 39 may be used instead of relay lens 32 in the configuration of FIG. 19. In this case, laser light is converted into parallel light by collimator lens 39. In addition, Fresnel lens mirror 34*c* is configured to guide laser light to a distance measurement area as parallel light and converge reflected light from the distance measurement area on photodetector 38. Other configurations are the same as those in FIG. 19.

Figure 28A:
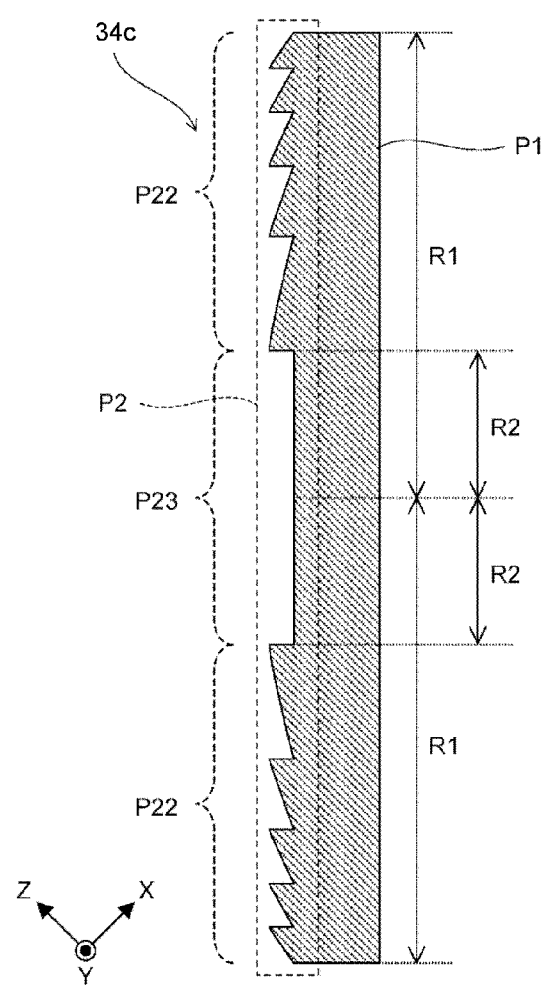
FIG. 28A is a cross-sectional view schematically showing a configuration of a Fresnel lens mirror according to the modification 3B.
Figure 28B:
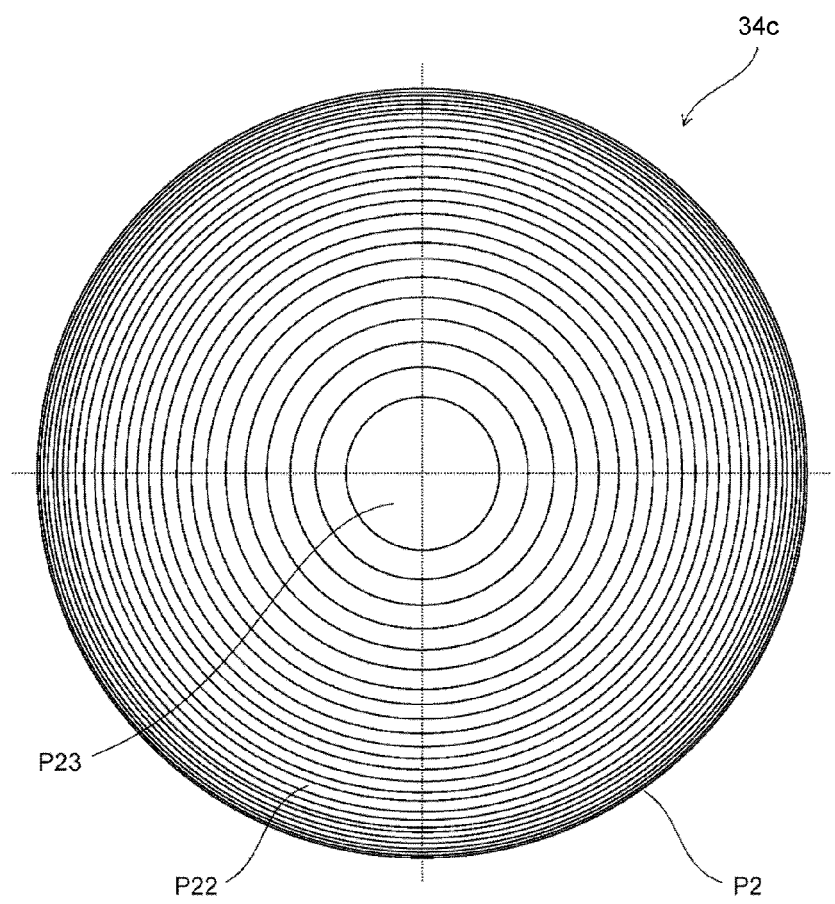
FIG. 28B is a plan view schematically showing the configuration of the Fresnel lens mirror according to the modification 3B.

FIG. 28A is a cross-sectional view schematically showing a configuration of Fresnel lens mirror 34*c* according to the present modification and FIG. 28B is a plan view schematically showing the configuration of Fresnel lens mirror 34*c* according to the present modification.

In the present modification, area P23 where laser light (projection light) enters on reflecting surface P2 of Fresnel lens mirror 34*c* is a plane parallel to incident surface P1. Consequently, laser light (projection light) is not subjected to a lens action of Fresnel lens mirror 34*c* and is reflected to a distance measurement area as parallel light. Second Fresnel lens part P22 is configured to converge reflected light from the distance measurement area on photodetector 38.

The present modification may achieve similar effects as those of the third exemplary embodiment described above. As compared to the third exemplary embodiment described above, a function of a Fresnel lens is not disposed on area P23 and area P23 is a simple plane in the present modification. It is thus possible to improve usage efficiency of laser light (projection light). According to the present modification, more reflected light than in the third exemplary embodiment described above can be guided to photodetector 38.

While rotating part 20 is driven by the linear motor constituted by a group of coils and a group of magnets in the third exemplary embodiment described above, rotating part 20 may be driven by other drive mechanisms. For example, a gear may be formed on the overall outer circumferential surface of rotating part 20, and it is possible to configure a drive mechanism in which the gear meshes with a gear placed on a drive shaft of a motor.

The light source is not limited to laser light source 31 and may be an LED or the like. The shape of guide trenches 11*b*, 21b is not limited to a V-shape, and may be any other shapes capable of guiding bearing balls 15. The projection direction of laser light (projection light) is not necessarily a direction vertical to rotating axis R10, and may be inclined to the direction vertical to rotating axis R10 by a predetermined angle. The number of coils 12 arranged, the number of magnet 22 arranged, and the number of bearing balls 15 may be appropriately changed.

Fourth Exemplary Embodiment

Figure 29:
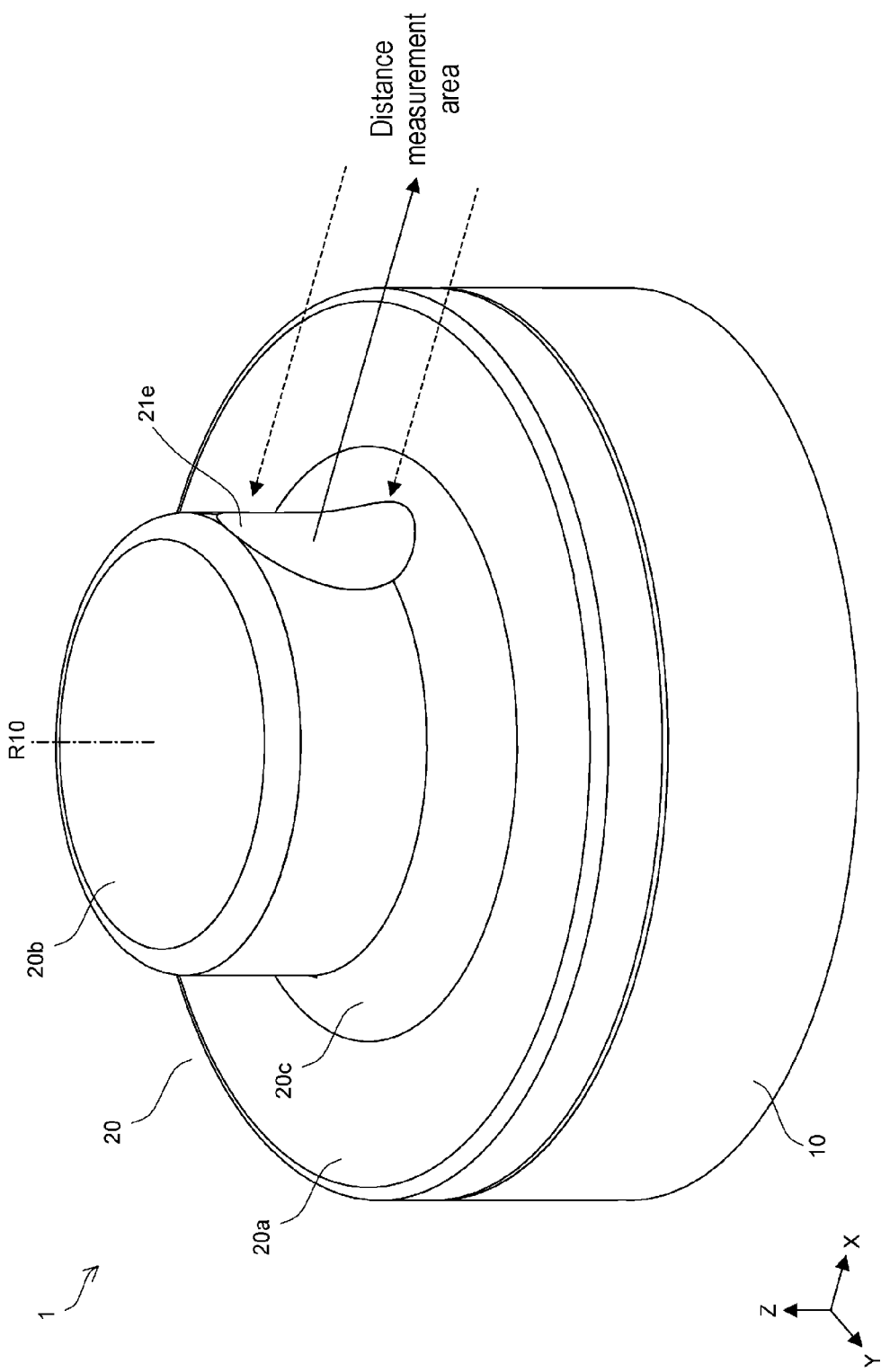
FIG. 29 is a perspective view showing a configuration of a distance measurement device according to a fourth exemplary embodiment.

FIG. 29 is a perspective view showing the configuration of distance measurement device 1.

As shown in FIG. 29, distance measurement device 1 includes fixed part 10 formed in a cylindrical shape and rotating part 20 rotatably disposed on fixed part 10. Rotating part 20 is constituted by large diameter part 20a having a substantially same diameter as fixed part 10, small diameter part 20b having a smaller diameter than large diameter part 20a, and inclined part 20c connecting large diameter part 20a and small diameter part 20b. Large diameter part 20a and small diameter part 20b are both formed in a cylindrical shape. Fixed part 10, and large diameter part 20a and small diameter part 20b of rotating part 20 are coaxially disposed. Opening 21e is formed in a side surface of small diameter part 20b. Laser light (projection light) is projected from opening 21e to a distance measurement area, and reflected light of laser light reflected by the distance measurement area is taken in through opening 21e.

Rotating part 20 rotates about rotating axis R10 that is parallel to the Z axis and passes through the center of small diameter part 20b. When rotating part 20 rotates, an optical axis of laser light projected from opening 21e rotates about rotating axis R10. The distance measurement area is thus rotated accordingly. As described later, distance measurement device 1 measures a distance to an object present in the distance measurement area based on a time difference (runtime) between a timing when laser light is projected on the distance measurement area and a timing when reflected light of the laser light from the distance measurement area is received. Specifically, the time difference is multiplied by the speed of light, so that the distance to the object is calculated. As rotating part 20 rotates once about rotating axis R10 as described above, distance measurement device 1 can measure the distance to an object present in the range of 360°.

Figure 30:
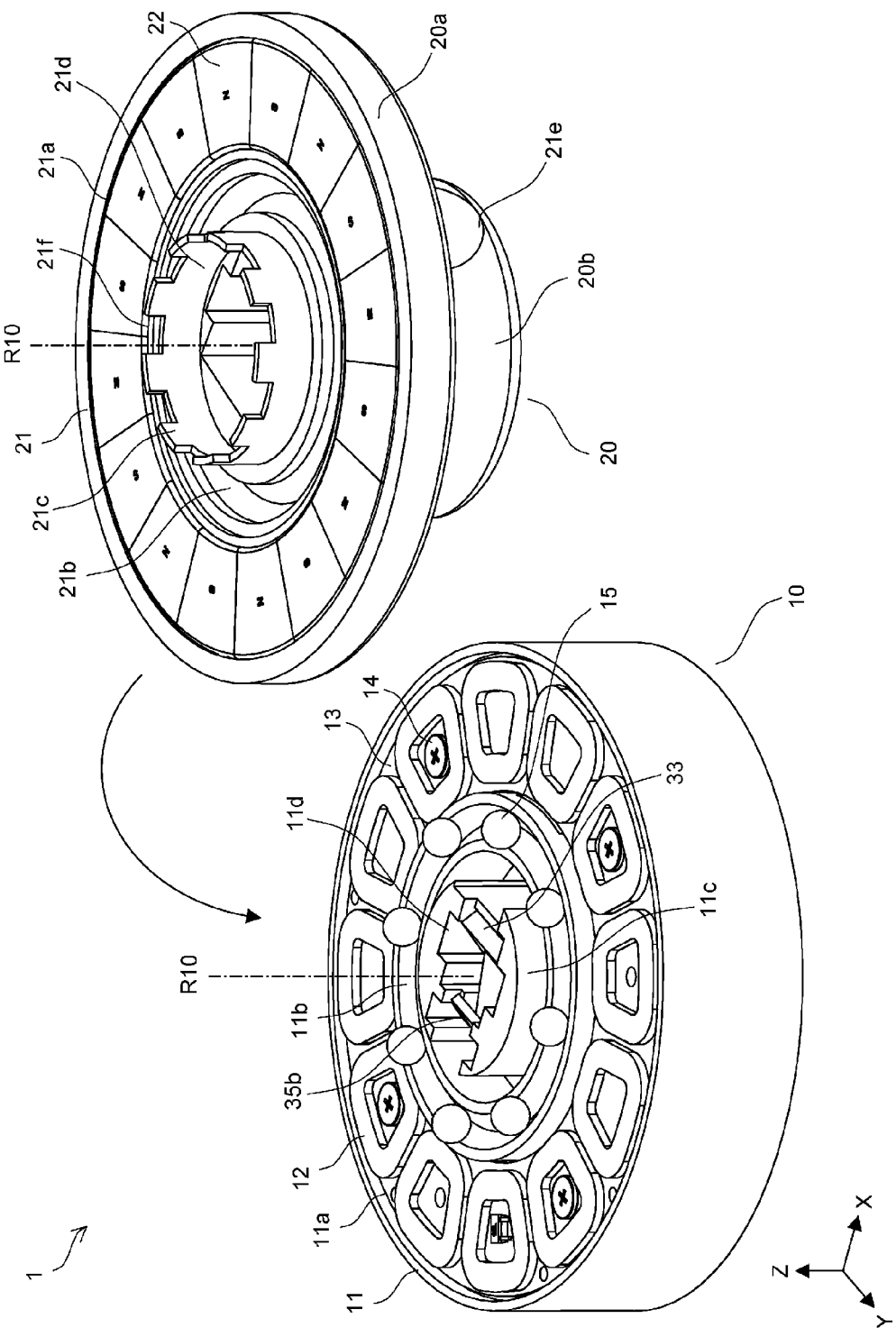
FIG. 30 is a perspective view showing the configuration of the distance measurement device according to the fourth exemplary embodiment in a state where a fixed part and a rotating part are separated from each other.

FIG. 30 is a perspective view showing the configuration of distance measurement device 1 in a state where fixed part 10 and rotating part 20 are separated from each other.

As shown in FIG. 30, fixed part 10 includes support base 11 formed in a cylindrical shape, coils 12, yoke 13, and bearing balls 15. Support base 11 is composed of, for example, a resin. Recess 11a is formed in an upper surface of support base 11 along a circumferential direction about rotating axis R10. Yoke 13, which is a thin plate, is fitted into recess 11a. Yoke 13 has a disc shape with the center part removed. Yoke 13 is fixed on support base 11 by screws 14.

In addition, a plurality of coils 12 are circumferentially arranged on the upper surface of yoke 13. In this case, 12 coils 12 are mounted on the upper surface of yoke 13. Yoke 13 constitutes a linear motor for rotating rotating part 20 with magnets 22 on a side of rotating part 20.

On the upper surface of support base 11, guide trench 11b with a fixed depth is formed inside of recess 11a to extend circumferentially. The shape of guide trench 11b cut along a plane vertical to the circumferential direction is a V-shape. Guide trench 11b extends circumferentially. Guide trench 11b is used for circumferentially guiding bearing balls 15. Bearing balls 15 are fitted into guide trench 11b. A spacer for keeping a constant distance between bearing balls 15 may be further fitted into guide trench 11b.

Projection 11c having a cylindrical shape is formed in a center part of support base 11, and recess 11d is formed in projection 11c. Optical members constituting an optical system to be described later are disposed in recess 11d. FIG. 30 shows beam splitter 33 and mirror 35b as the optical members.

FIG. 30 shows rotating part 20 upside down. Rotating part 20 includes support member 21 and magnets 22. Although not shown in FIG. 30, yoke 23 (see FIG. 31) is also placed in rotating part 20. In the state of FIG. 30, yoke 23 is covered by magnets 22.

Recess 21a is formed in large diameter part 20a of rotating part 20 along the circumferential direction about rotating axis R10. Yoke 23, which is a thin plate shape (see FIG. 31), is fitted into recess 21a. Yoke 23 has a disc shape with the center part removed. Yoke 23 is fixed on large diameter part 20a by thermosetting adhesives or integral molding of metal and resin.

In addition, a plurality of magnets 22 are circumferentially arranged so as to cover yoke 23. These magnets 22 are arranged in a manner that polarities of adjacent magnets 22 are opposite to each other. In this case, 16 magnets 22 are mounted so as to cover yoke 23. Magnets 22 constitute the linear motor for rotating rotating part 20 with coils 12 on a side of fixed part 10.

In support member 21, guide trench 21b with a fixed depth is formed inside of recess 21a to extend circumferentially. The shape of guide trench 21b cut along a plane vertical to the circumferential direction is a V-shape. Guide trench 21b extends circumferentially. Guide trench 21b is used for circumferentially guiding bearing balls 15 with guide trench 11b on the side of fixed part 10. When rotating part 20 is placed on fixed part 10 as shown in FIG. 29, bearing balls 15 are sandwiched between guide trench 11b on the side of fixed part 10 and guide trench 21b on the side of rotating part 20. Rotating part 20 is thus supported by fixed part 10 so as to be rotatable about rotating axis R10.

Wall 21c having a cylindrical shape is formed in a center part of support member 21, and opening 21d is formed inside of wall 21c. Parabolic mirror 34b to be described later (see FIG. 31) is placed in opening 21d. Opening 21d is connected to opening 21e formed in the side surface of small diameter part 20b. Cut-away parts 21f are circumferentially formed in wall 21c at fixed intervals. Cut-away part 21f is used for detecting the rotation state of rotating part 20.

When rotating part 20 is placed on fixed part 10 as described above, rotating part 20 is supported by fixed part 10 through bearing balls 15 so as to be rotatable about rotating axis R10. In this state, magnets 22 arranged on the side of rotating part 20 respectively face coils 12 arranged on the side of fixed part 10. In this way, the linear motor for driving rotating part 20 in a rotating direction is configured.

In addition, in this state, magnetic attraction force is generated between magnets 22 on the side of rotating part 20 and yoke 13 on the side of fixed part 10. This magnetic attraction force attracts rotating part 20 to fixed part 10, thus keeping a support state of rotating part 20 by fixed part 10. That is, yoke 13 constitutes a magnetic part generating magnetic attraction force for preventing fall-off of rotating part 20 between yoke 13 and magnets 22. Support base 11 may be composed of a magnetic body for the purpose of generating the magnetic attraction force.

Figure 31:
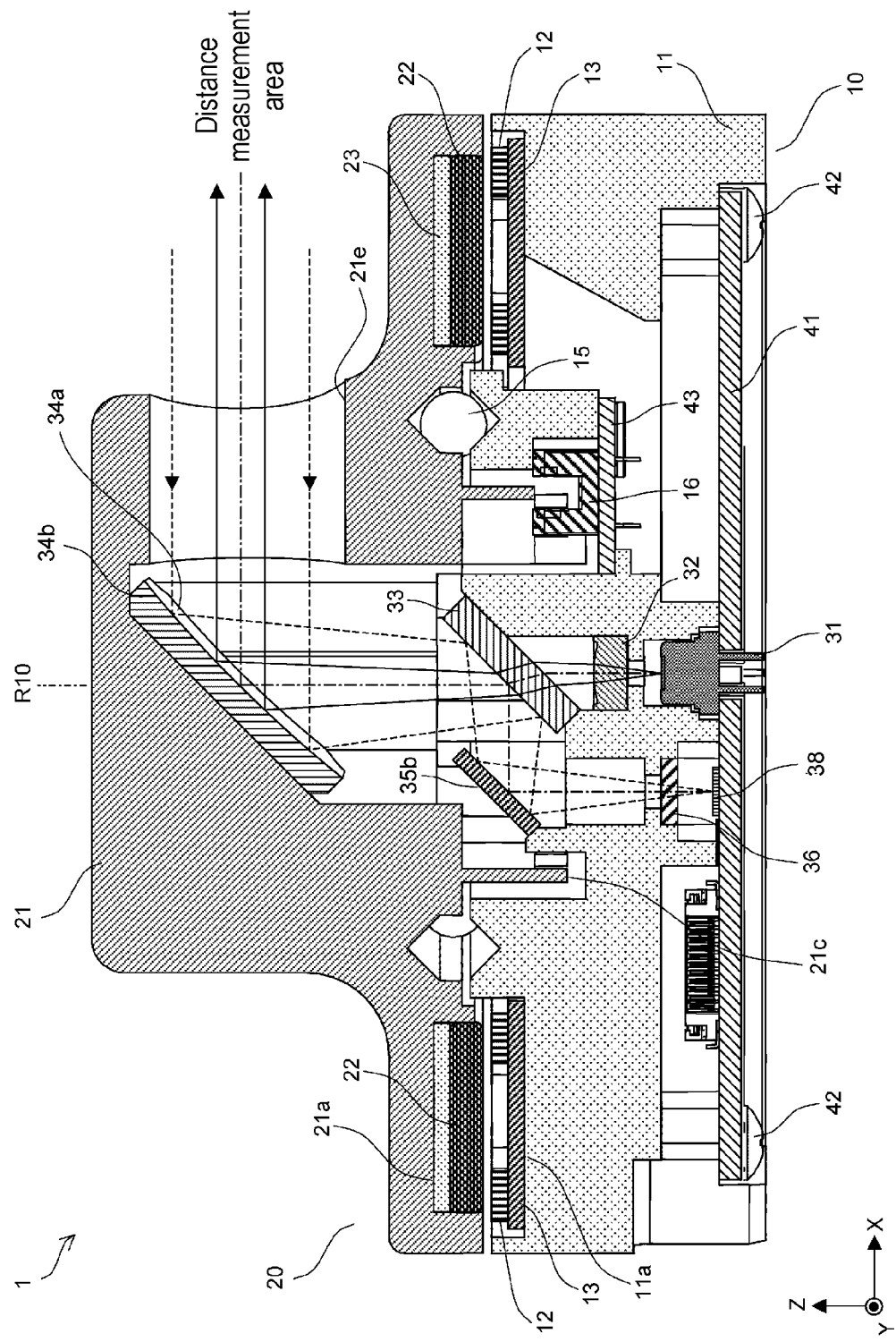
FIG. 31 is a cross-sectional view showing the configuration of the distance measurement device according to the fourth exemplary embodiment.

FIG. 31 is a cross-sectional view showing the configuration of distance measurement device 1. FIG. 31 is a cross-sectional view obtained by cutting distance measurement device 1 shown in FIG. 29 at the center position in the direction of the Y axis along a plane parallel to the X-Z plane. In FIG. 31, laser light (projection light) emitted from laser light source 31 to a distance measurement area is shown by solid lines, whereas reflected light reflected by the distance measurement area is shown by broken lines. A one-dot chain line drawn in an optical system shows the optical axis of the optical system.

As shown in FIG. 31, distance measurement device 1 includes, as components of the optical system, laser light source 31, relay lens 32, beam splitter 33, parabolic mirror 34b, mirror 35b, filter 36, and photodetector 38. Laser light source 31 and photodetector 38 are placed on circuit board 41. Relay lens 32, beam splitter 33, mirror 35b, and filter 36 are placed in support base 11 on the side of fixed part 10. Parabolic mirror 34b is placed in support member 21 of rotating part 20.

Laser light source 31 emits laser light of a predetermined wavelength. Laser light source 31 is, for example, a semiconductor laser. An emission optical axis of laser light source 31 is parallel to the Z axis. Laser light source 31 is placed on circuit board 41 placed on a lower surface of support base 11. Circuit board 41 is placed on the lower surface of support base 11 by screws 42. A radiation angle of laser light emitted from laser light source 31 is reduced by relay lens 32, and then the laser light enters beam splitter 33. Laser light is transmitted through beam splitter 33 to be directed to parabolic mirror 34b. Beam splitter 33 separates an optical path of laser light (projection light) emitted from laser light source 31 from an optical path of reflected light reflected by the distance measurement area.

Figure 32A:
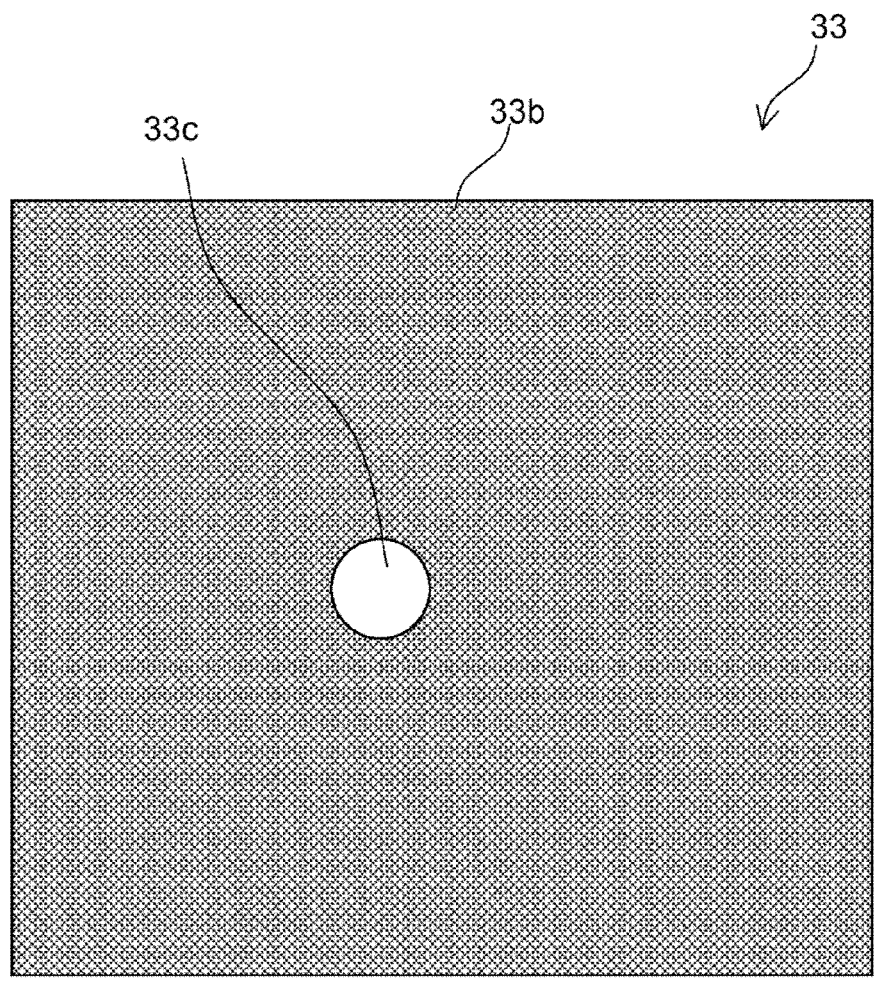
FIG. 32A is a plan view showing a configuration of a beam splitter according to the fourth exemplary embodiment.
Figure 32B:
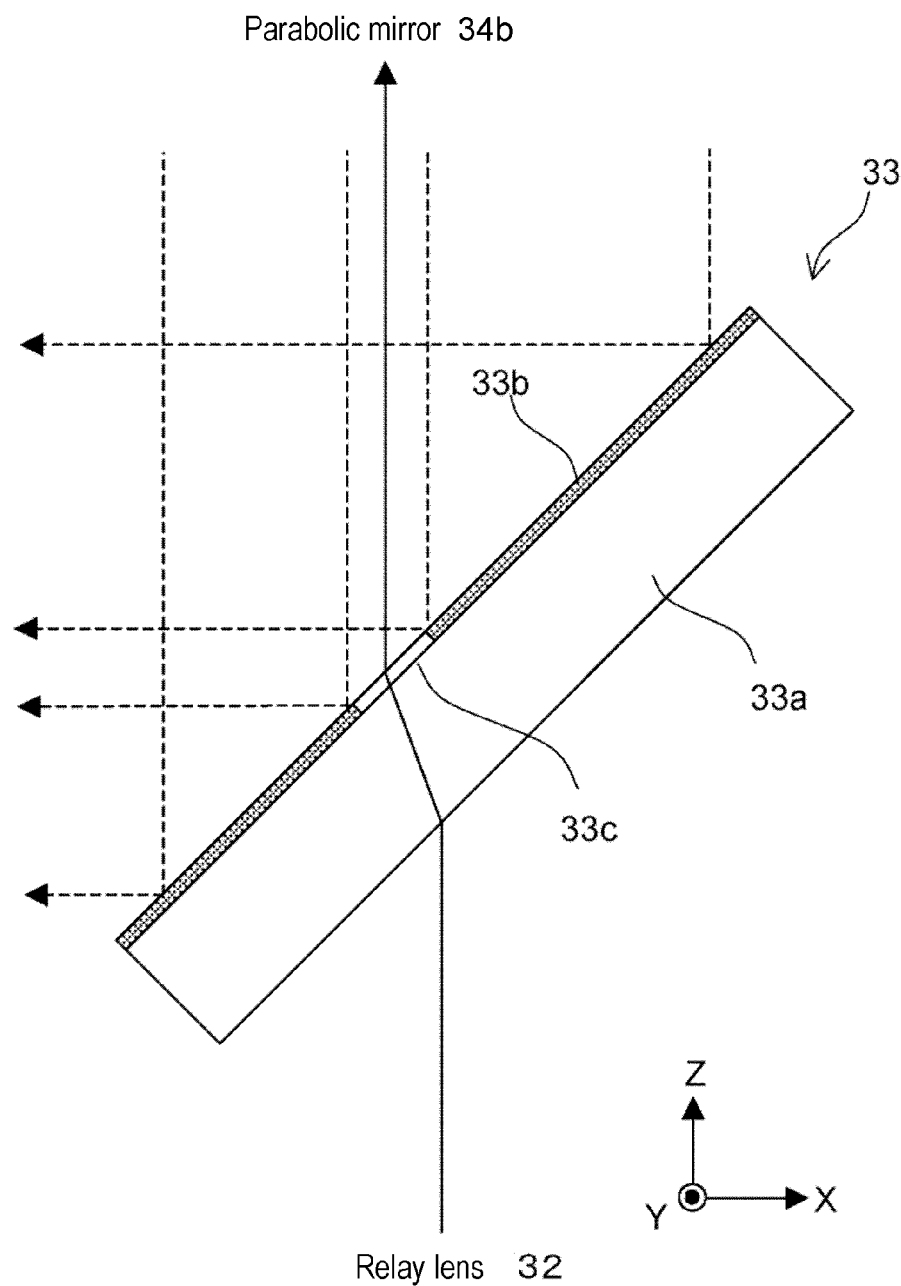
FIG. 32B is a side view showing the configuration of the beam splitter according to the fourth exemplary embodiment.

FIG. 32A is a plan view showing a configuration of beam splitter 33 and FIG. 32B is a side view showing the configuration of beam splitter 33.

As shown in FIGS. 32A and 32B, beam splitter 33 is configured by forming reflection film 33b on a surface of transparent substrate 33a with a fixed thickness. Reflection film 33b is formed on an overall area other than circular hole 33c. Hole 33c is set to be slightly larger than an area through which laser light entering from a side of relay lens 32 passes. Consequently, substantially all the laser light entering from the side of relay lens 32 is transmitted through beam splitter 33 to be directed to parabolic mirror 34b. Beam splitter 33 is disposed so as to be inclined to the Z axis by 45°.

Returning to FIG. 31, parabolic mirror 34b is disposed in a common optical path of projection light and reflected light. In FIG. 31, the common optical path is an optical path from beam splitter 33 to opening 21e. Parabolic mirror 34b is a total reflection mirror. Parabolic mirror 34b has reflecting surface 34a. Reflecting surface 34a is formed by a concave surface part, which is a parabolic surface. Parabolic mirror 34b is placed in support member 21 in a manner reflecting surface 34a opposes beam splitter 33. Parabolic mirror 34b is disposed in a manner that reflecting surface 34a is inclined to a center axis of the common optical path of projection light and reflected light (the Z axis).

The optical axis of projection light having been transmitted through beam splitter 33 is bent by 90° by parabolic mirror 34b. That is, the projection light is reflected by parabolic mirror 34b in a direction of opening 21e. In this case, projection light is converted from scattering light into parallel light by reflecting surface 34a of parabolic mirror 34b. Projection light having been converted into parallel light travels from parabolic mirror 34b in the positive direction of the X axis, passes through opening 21e, and is projected on a distance measurement area.

When an object is present in the distance measurement area, projection light projected from opening 21e on the distance measurement area is reflected by the object to be directed again to opening 21e. Reflected light reflected by the object is taken in through opening 21e to be guided to parabolic mirror 34b. When reflected by parabolic mirror 34b, reflected light is subjected to a convergence action by reflecting surface 34a. In this case, reflected light is converted from parallel light into converging light by reflecting surface 34a of parabolic mirror 34b. In this way, reflected light is reflected by parabolic mirror 34b to enter beam splitter 33. Such optical action by reflecting surface 34a will be described later with reference to FIG. 33.

With reference to FIG. 32B, reflected light entering beam splitter 33 is reflected by reflection film 33b in the negative direction of the X axis. FIG. 32B shows reflected light by broken lines. Reflected light entering hole 33c is not reflected and is transmitted through beam splitter 33. Reflected light entering the area of reflection film 33b other than hole 33c is reflected by reflection film 33b in the negative direction of the X axis to be directed to mirror 35b. For the sake of convenience, while reflected light is shown as parallel light in FIG. 32B, the reflected light is actually converging light.

Returning to FIG. 31, reflected light reflected by beam splitter 33 is reflected by mirror 35b in the negative direction of the Z axis. Mirror 35b is a total reflection mirror having a reflecting surface on its one surface. Mirror 35b is placed in a manner that the reflecting surface is inclined to the Z axis by 45°. Reflected light reflected by mirror 35b is transmitted through filter 36 to converge on photodetector 38.

Filter 36 is configured to transmit light of a wavelength band of laser light emitted from laser light source 31 and to block light of other wavelength bands. A pinhole having a substantially same diameter as a beam diameter of reflected light entering filter 36 may be formed in an incident surface or an emitting surface of filter 36. The pinhole can remove more stray light. Photodetector 38 outputs a detection signal based on the quantity of light received. When a pinhole is formed in filter 36, the optical system may be adjusted in a manner that the pinhole is positioned at a focus position of parabolic mirror 34b.

In the configuration of FIG. 31, in addition to circuit board 41, sub-board 43 is placed in support base 11 and detector 16 is disposed on sub-board 43. Detector 16 includes an emission part and a light receiving part opposing the emission part. Detector 16 is disposed in a manner that wall 21c on the side of rotating part 20 shown in FIG. 30 is positioned in a gap between the emission part and the light receiving part.

As the rotating part 20 rotates and cut-away part 21f formed in wall 21c is positioned between the emission part and the light receiving part of detector 16, light from the emission part is received by the light receiving part, so that a high-level signal is output from detector 16. When cut-away part 21f passes, light from the emission part is blocked by wall 21c and a signal from detector 16 falls to a low-level. Consequently, when rotating part 20 rotates, a pulse signal having a period based on a rotational speed is output from detector 16. This signal enables the rotation state of rotating part 20 to be detected. Sub-board 43 is electrically connected to circuit board 41 by signal lines (not shown).

FIG. 33 is a cross-sectional view for explaining an optical action of parabolic mirror 34b. FIG. 33 schematically shows a cross-section obtained by cutting members along a plane passing through rotating axis R10 and parallel to the X-Z plane.

In FIG. 33, focus F is a focus of reflecting surface 34a when beam splitter 33 is not present. The optical system is laid out in a manner that a radiation angle of projection light condensed by relay lens 32 is substantially equal to a radiation angle of light assumed to be emitted from focus F. That is, relay lens 32 adjusts a divergence angle of projection light in a manner that the radiation angle of projection light transmitted through relay lens 32 is substantially equal to the radiation angle of laser light emitted from focus F. When reflected by parabolic mirror 34b, projection light from relay lens 32 to parabolic mirror 34b is converted from scattering light into parallel light. As relay lens 32 is disposed as described above, a position of laser light source 31 can be shifted in the positive direction of the Z axis relative to focus F to be disposed on a board surface of circuit board 41.

Meanwhile, when reflected by parabolic mirror 34b, reflected light (parallel light) reflected by a distance measurement area is converted into converging light converging on focus F. The optical system is laid out in a manner that an optical path length from parabolic mirror 34b to photodetector 38 is substantially equal to a focal length of parabolic mirror 34b. The optical path of reflected light is bent by beam splitter 33 and then the reflected light converges on a light receiving surface of photodetector 38. With the configuration of the optical system shown in FIG. 33, even if the optical path length from parabolic mirror 34b to laser light source 31 is different from the optical path length from parabolic mirror 34b to photodetector 38, laser light source 31 and photodetector 38 can be placed on identical circuit board 41.

Figure 34:
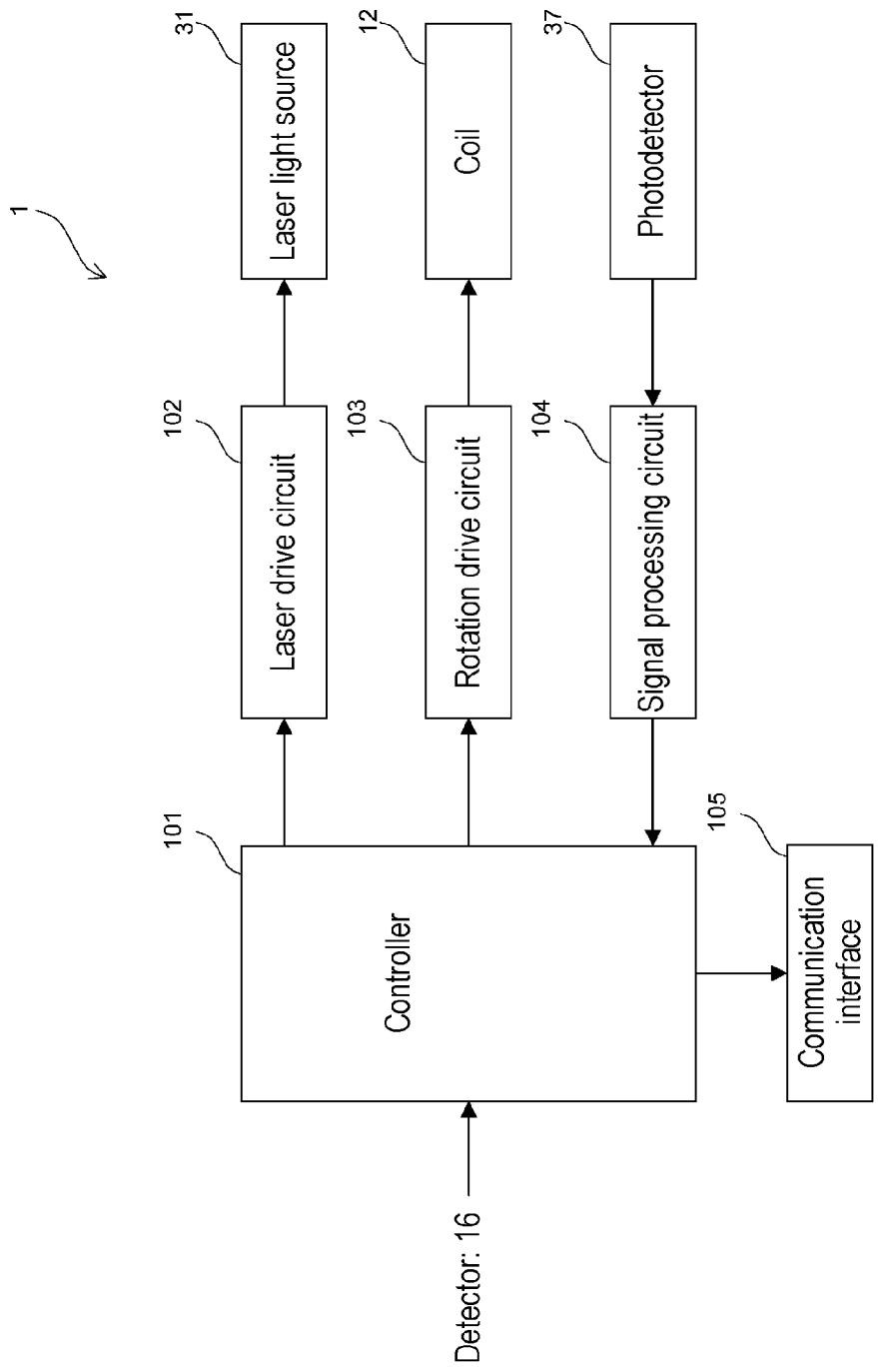
FIG. 34 is a circuit block diagram showing the configuration of the distance measurement device according to the fourth exemplary embodiment.

FIG. 34 is a circuit block diagram showing the configuration of distance measurement device 1.

As shown in FIG. 34, distance measurement device 1 includes controller 101, laser drive circuit 102, rotation drive circuit 103, and signal processing circuit 104 as components of a circuit unit.

Controller 101 includes an arithmetic processing circuit such as a CPU (Central Processing Unit) and a memory, and controls components based on a predetermined control program. Laser drive circuit 102 drives laser light source 31 in response to control of controller 101. Rotation drive circuit 103 conducts current through coils 12 in response to the control of controller 101. For example, controller 101 controls rotation drive circuit 103 in a manner that rotating part 20 rotates at a predetermined rotational speed, based on a pulse signal input from detector 16. In response thereto, rotation drive circuit 103 adjusts the quantity of current conducting through coils 12 and a conduction timing.

Signal processing circuit 104 performs amplification and noise reduction on a detection signal input from photodetector 38 and outputs a resultant signal to controller 101. Communication interface 105 is used for communication with apparatuses in which distance measurement device 1 is installed.

In a distance measurement operation, controller 101 controls rotation drive circuit 103 to rotate rotating part 20, and at the same time, controls laser drive circuit 102 to output laser light of predetermined pulses from laser light source 31 at every predetermined timing. Based on a detection signal of photodetector 38 input from signal processing circuit 104, controller 101 detects a light receiving timing of a laser light pulse emitted at each emission timing. Controller 101 then measures the distance to an object present in a distance measurement area at each emission timing, based on a time difference (runtime) between an emission timing and a light receiving timing of laser light.

Specifically, controller 101 multiplies the time difference (the runtime) by the speed of light to calculate the distance to the object. Controller 101 transmits data of the distance calculated as described above, as needed, via communication interface 105 to an apparatus in which distance measurement device 1 is installed. Based on the distance data received, the apparatus determines the distance to an object present in the range of 360° and executes predetermined control.

Effects of Fourth Exemplary Embodiment

The present exemplary embodiment described above achieves the following effects.

Reflected light is condensed by parabolic mirror 34b, and thus it is not necessary to dispose an imaging lens for condensing reflected light in an optical system. It is thus possible to prevent an influence of stray light generated by the imaging lens. As shown in FIG. 31, parabolic mirror 34b is disposed so as to be inclined to a common optical path of laser light (projection light) and reflected light. It is thus possible to prevent a part of laser light (projection light) reflected by parabolic mirror 34b from becoming stray light and being directed to photodetector 38. Consequently, it is possible to prevent an influence of the stray light on a detection signal. Moreover, parabolic mirror 34b has a function as a mirror, that is, a function of reflecting laser light (projection light) to a distance measurement area and reflecting reflected light from the distance measurement area to photodetector 38, and a function as a lens, that is, a function of condensing reflected light on photodetector 38. A number of optical components disposed in the optical system can thus be reduced. Consequently, the configuration of distance measurement device 1 can be simplified. According to the present exemplary embodiment, the simple configuration can reduce the influence of stray light on a detection signal.

As shown in FIG. 31, reflecting surface 34a of parabolic mirror 34b is disposed to be inclined to rotating axis R10 of rotating part 20, and the common optical path of laser light (projection light) and reflected light is coaxial with rotating axis R10 between fixed part 10 and parabolic mirror 34b. An incident direction and an incident area of laser light (projection light) on parabolic mirror 34b can be identical and a reflection direction of reflected light reflected by parabolic mirror 34b can be identical, regardless of a rotation position of parabolic mirror 34b. Laser light (projection light) can be appropriately guided to a 360-degree distance measurement area and reflected light from the 360-degree distance measurement area can be appropriately condensed to photodetector 38.

As shown in FIGS. 32A and 32B, beam splitter 33 includes a reflection area (reflection film 33b) reflecting reflected light and a transmission area (hole 33c) transmitting laser light (projection light). More reflected light can thus be guided to photodetector 38 and reflected light can be detected successfully.

As shown in FIG. 31, laser light source 31 and photodetector 38 are disposed on common circuit board 41, and mirror 35b that reflects reflected light passing through beam splitter 33 to guide the reflected light to circuit board 41 is disposed in fixed part 10. As laser light source 31 and photodetector 38 that require power supply are placed on common circuit board 41, the configuration can be simplified and the cost reduction can be achieved. As mirror 35b bends the optical path of reflected light, the reflected light can be smoothly guided to photodetector 38 placed on circuit board 41.

As shown in FIG. 31, relay lens 32 is disposed between laser light source 31 and beam splitter 33. Relay lens 32 condenses laser light emitted from laser light source 31, and thus an area of the laser light transmitting through beam splitter 33 can be reduced and the reflection area of reflected light on beam splitter 33 can be increased accordingly. More reflected light can thus be guided to photodetector 38.

As shown in FIG. 30, distance measurement device 1 includes a group of coils (12 coils 12) arranged around rotating axis R10 of rotating part 20 on the surface of fixed part 10 on the side of rotating part 20, and a group of magnets (16 magnets 22) arranged around rotating axis R10 so as to oppose the group of coils on the surface of rotating part 20 on the side of fixed part 10. As rotating part 20 is driven by a non-contact linear motor constituted by the group of coils and the group of magnets, distance measurement device 1 can be made compact as shown in FIG. 29, while the optical path of the optical system and a space for disposing the optical system are kept in a center part of distance measurement device 1.

As shown in FIG. 30, distance measurement device 1 includes guide trench 11b (first trench) disposed around rotating axis R10 on the surface of fixed part 10 on the side of rotating part 20 and guide trench 21b (second trench) disposed on the surface of rotating part 20 on the side of fixed part 10 so as to oppose guide trench 11b (first trench). In addition, distance measurement device 1 includes bearing balls 15 fitted into guide trench 11b (first trench) and sandwiched between guide trench 11b (first trench) and guide trench 21b (second trench) and yoke 13 (magnetic part) that is disposed in fixed part 10 so as to oppose magnets 22 and that generates magnetic attraction force between yoke 13 and magnets 22. With this configuration, the support state of rotating part 20 by fixed part 10 is kept using magnetic attraction force between magnets 22 and yoke 13 constituting a part of the linear motor. The mechanism of supporting rotating part 20 by fixed part 10 can be simplified and thus distance measurement device 1 can be made compact as a whole. Rotating part 20 can be rotatably supported by fixed part 10 only by placing rotating part 20 on fixed part 10.

Modification 4A

In addition to the configuration of distance measurement device 1 described in the fourth exemplary embodiment, various modifications can be made.

For example, it may be configured as shown in FIG. 35 that laser light emitted from laser light source 31 is reflected by beam splitter 33 and reflected light from a distance measurement area is transmitted through beam splitter 33 to be guided to photodetector 38. Similarly to FIG. 31, FIG. 35 is a cross-sectional view obtained by cutting distance measurement device 1 shown in FIG. 29 at the center position in the direction of the Y axis along a plane parallel to the X-Z plane.

Figure 36A:
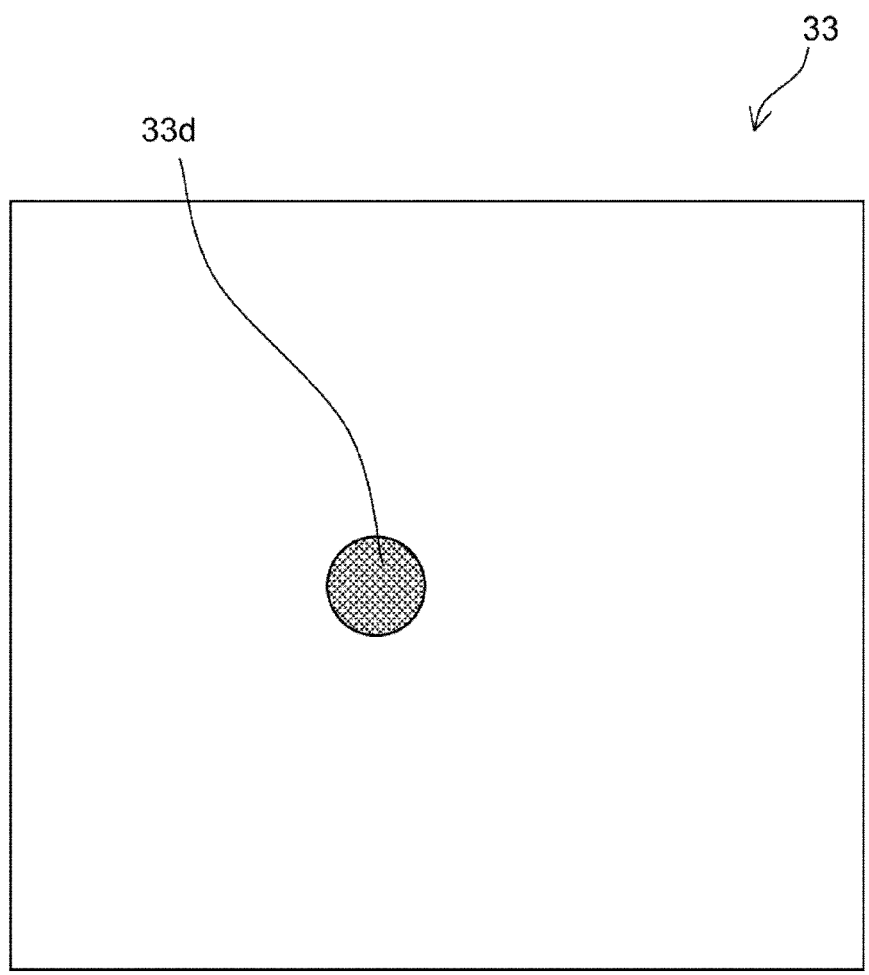
FIG. 36A is a plan view showing a configuration of a beam splitter according to the modification 4A.
Figure 36B:
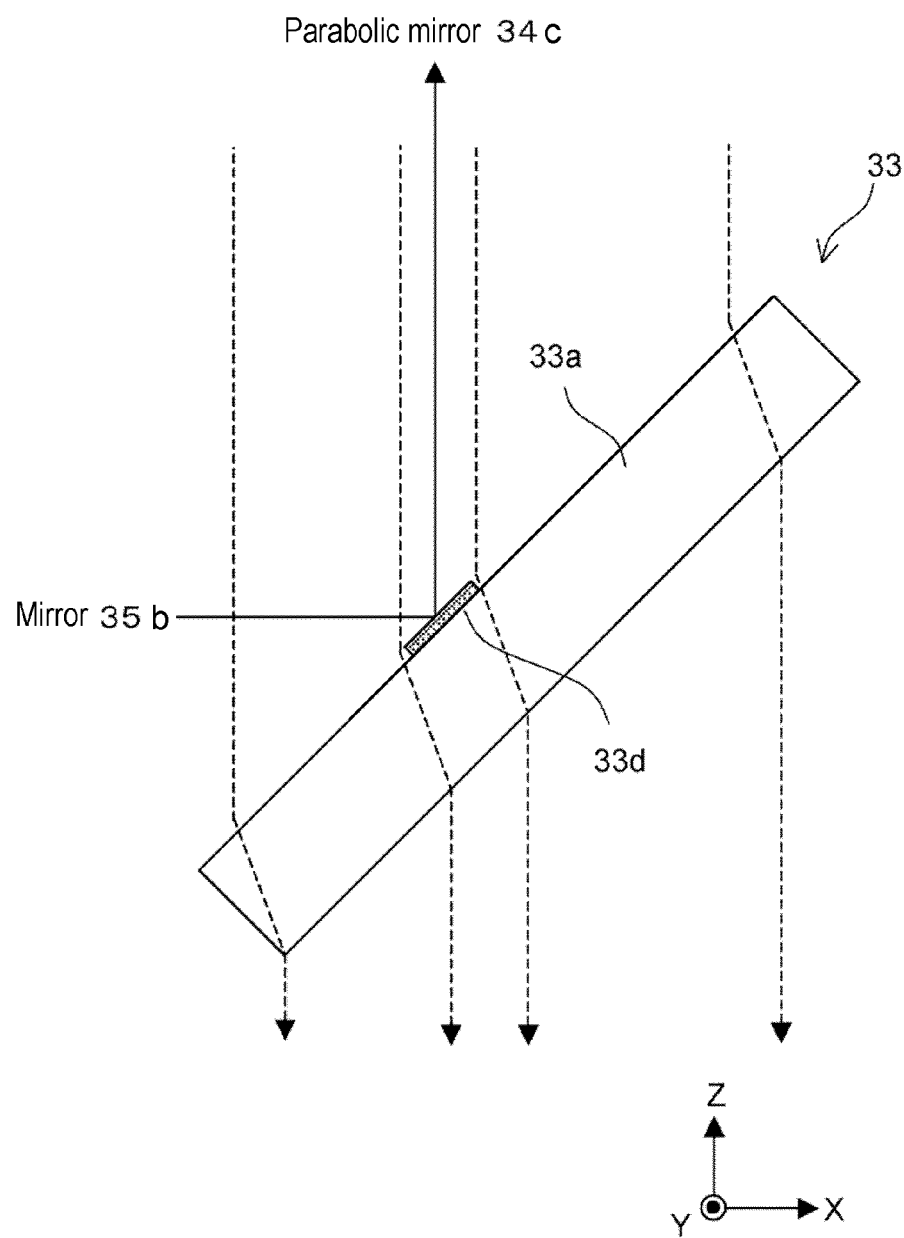
FIG. 36B is a side view showing the configuration of the beam splitter according to the modification 4A.

In this case, laser light emitted from laser light source 31 is reflected by mirror 35a to be guided to beam splitter 33. The configuration of beam splitter 33 is changed to the configuration shown in FIGS. 36A and 36B. That is, as shown in FIGS. 36A and 36B, reflection film 33d is formed on an incident area of laser light (projection light) on a surface of beam splitter 33 on the positive side of the Z axis, and the reflection film is not formed on other areas.

As shown in FIG. 35, instead of relay lens 32, condenser lens 38a that converges laser light emitted from laser light source 31 on a surface of beam splitter 33 on a side of mirror 35a may be disposed in the configuration. In this case, reflecting surface 34a of parabolic mirror 34b may be configured to include concave surface part P11 for converting laser light (projection light) into parallel light on a center part that laser light (projection light) enters and second concave surface part P12 for condensing reflected light on photodetector 38 on an area outside the center part.

FIG. 37 is a cross-sectional view for explaining an optical action of parabolic mirror 34b according to the modification.

As shown in FIG. 37, in parabolic mirror 34b, first concave surface part P11 is formed on the center part of reflecting surface 34a that laser light emitted from laser light source 31 enters and second concave surface part P12 is formed outside first concave surface part P11. Light converging power of first concave surface part P11 is larger than light converging power of second concave surface part P12. As in the fourth exemplary embodiment described above, parabolic mirror 34b is disposed in a manner that first concave surface part P11 and second concave surface part P12 are inclined to a center axis of the common optical path of projection light and reflected light (the Z axis).

First concave surface part P11 and second concave surface part P12 are parabolic surfaces with different shapes. First focus F1 is a focus of first concave surface part P11 whereas second focus F2 is a focus of second concave surface part P12. First focus F1 is positioned on the positive side of the Z axis relative to second focus F2. First concave surface part P11 is configured in a manner that first focus F1 substantially matches a branch position of the common optical path of projection light and reflected light. That is, a focal length of first concave surface part P11 is substantially equal to an optical path length between first concave surface part P11 and beam splitter 33. In addition, condenser lens 38a is configured to substantially converge laser light (projection light) emitted from laser light source 31 on the branch position of the common optical path of projection light and reflected light. When reflected by first concave surface part P11, projection light from beam splitter 33 to parabolic mirror 34b is thus converted from scattering light into parallel light.

Meanwhile, when reflected by second concave surface part P12, reflected light (parallel light) reflected by a distance measurement area is converted into converging light converging on second focus F2. Second concave surface part P12 is configured in a manner that second focus F2 is positioned on a light receiving surface of photodetector 38. That is, a focal length of second concave surface part P12 is substantially equal to an optical path length between second concave surface part P12 and photodetector 38. With the configuration of the optical system shown in FIG. 37, even if the optical path length from parabolic mirror 34b to laser light source 31 is different from the optical path length from parabolic mirror 34b to photodetector 38 as in the fourth exemplary embodiment, laser light source 31 and photodetector 38 can be placed on identical circuit board 41.

Other configurations of modification 4A shown in FIGS. 35 to 37 are similar to those of the fourth exemplary embodiment described above.

The modification 4A shown in FIGS. 35 to 37 may achieve similar effects as those of the fourth exemplary embodiment described above. However, an optical path of reflected light is not bent by beam splitter 33 and mirror 35b in the configuration of modification. As compared to the fourth exemplary embodiment described above, the optical path length from parabolic mirror 34b to photodetector 38 becomes shorter. For this reason, it is necessary to reduce a distance required for converging reflected light by parabolic mirror 34b as compared to the fourth exemplary embodiment described above, and thus the incident area of reflected light on beam splitter 33 is reduced.

In the modification shown in FIGS. 35 to 37, laser light is condensed on the incident surface of beam splitter 33 by condenser lens 38a. Consequently, even if the incident area of reflected light on beam splitter 33 is reduced, it is possible to prevent influences of opening accuracy of beam splitter 33, mispositioning in mounting, and the like from appearing significantly as variations in the quantity of reflected light taken in by photodetector 38.

FIG. 38 schematically shows a light beam area of laser light (projection light) and reflected light near beam splitter 33.

As shown in FIG. 38, a convergence action of first concave surface part P11 is different from a convergence action of second concave surface part P12, and thus a light beam area of laser light (projection light) and reflected light passing through first concave surface part P11 is separated from a light beam area of reflected light passing through second concave surface part P12 on the incident surface of beam splitter 33. Reflection film 33d of beam splitter 33 is disposed inside the area where reflected light enters with a predetermined gap between reflection film 33d and the area where reflected light enters. Laser light (projection light) reflected by mirror 35b converges on reflection film 33d disposed as described above.

Thus, even if beam splitter 33, parabolic mirror 34b, and mirror 35b are slightly mispositioned, the light beam area of reflected light does not overlap reflection film 33d and a convergence position of laser light (projection light) is not out of reflection film 33d. Reflected light passing through second concave surface part P12 can be reliably guided to photodetector 38, and laser light (projection light) can be reliably guided to a distance measurement area.

In this modification, parabolic mirror 34b may be configured to include first concave surface part P11 for converting laser light (projection light) into parallel light on the center part and second concave surface part P12 for condensing reflected light on photodetector 38 on the area outside the center part. Laser light (projection light) can thus be smoothly guided to a distance measurement area and reflected light from the distance measurement area can be smoothly guided to photodetector 38 regardless of the layout of an optical system and the convergence state of laser light and reflected light.

In addition, distance measurement device 1 includes condenser lens 38a that converges laser light (projection light) emitted from laser light source 31 on a branch position of the common optical path at beam splitter 33. Consequently, as described with reference to FIG. 38, even if beam splitter 33 or the like is mispositioned, laser light (projection light) can be reliably guided to the distance measurement area and reflected light from the distance measurement area can be reliably guided to photodetector 38.

Also in the configuration of the fourth exemplary embodiment shown in FIG. 31, a condenser lens may be used instead of relay lens 32 to converge laser light emitted from laser light source 31 on a surface of beam splitter 33 on the positive side of the Z axis. In this case, the configuration of parabolic mirror 34b is changed to a configuration that includes a first concave surface part converting laser light into parallel light and a second concave surface part converging reflected light from the distance measurement area on photodetector 38, as in the present modification.

While rotating part 20 is driven by the linear motor constituted by a group of coils and a group of magnets in the fourth exemplary embodiment described above, rotating part 20 may be driven by other drive mechanisms. For example, a gear may be formed on the overall outer circumferential surface of rotating part 20, and it is possible to configure a drive mechanism in which the gear meshes with a gear placed on a drive shaft of a motor.

The light source is not limited to laser light source 31 and may be an LED or the like. The shape of guide trenches 11b, 21b is not limited to a V-shape, and may be any other shapes capable of guiding bearing balls 15. The projection direction of laser light (projection light) is not necessarily a direction vertical to rotating axis R10, and may be inclined to the direction vertical to rotating axis R10 by a predetermined angle. The number of coils 12 arranged, the number of magnet 22 arranged, and the number of bearing balls 15 may be appropriately changed.

Besides, the exemplary embodiments of the present disclosure can be variously modified appropriately within the technical idea described in claims.

As described above, a distance measurement device according to the present disclosure can successfully take in reflected light from a distance measurement area and at the same time, can effectively achieve compactness of the device. The distance measurement device can further eliminate a complicated operation and at the same time, can reduce an influence of stray light on a detection signal.

According to the distance measurement device of the present disclosure, it is possible to provide a distance measurement device in which an influence of stray light on a detection signal can be reduced with a simple configuration, which is industrially useful.

What is claimed is:
1. A distance measurement device comprising:
a fixed part;
a movable part that is movably disposed on the fixed part;
a light source that is disposed on the fixed part;
a photodetector that is disposed on the fixed part;
a beam splitter that is disposed on the fixed part and separates an optical path of projection light emitted from the light source from an optical path of reflected light reflected by a distance measurement area;
a reflecting member that is disposed on the movable part, guides the projection light having passed through the beam splitter to the distance measurement area, and guides the reflected light reflected by the distance measurement area to the beam splitter;
a group of coils disposed on a surface of the fixed part and arranged around a movable axis of the movable part, the surface of the fixed part facing movable part;
a group of magnets disposed on a surface of the movable part to oppose the group of coils and arranged around the movable axis, the surface of the movable part facing the fixed part;
a first trench disposed on a surface of the fixed part and arranged around a movable axis the movable part;
a second trench disposed on a surface of the movable part and arranged around the fixed part so as to oppose the first trench;
a plurality of bearing balls that are fitted into the first trench and sandwiched between the first trench and the second trench; and a magnetic part that is disposed at a position of the fixed part opposing the magnets and generates magnetic attraction force between the magnetic part and the magnets.

2. The distance measurement device according to claim 1, wherein the beam splitter includes a reflection area that reflects one of the projection light and the reflected light and a transmission area that transmits an other of the projection light and the reflected light.

3. The distance measurement device according to claim 1, wherein
the light source and the photodetector are placed on a common circuit board, and
a mirror is disposed on the fixed part, the mirror reflecting at least one of the projection light directed to the beam splitter and the reflected light having passed through the beam splitter is disposed on the fixed part.

4. The distance measurement device according to claim 1, further comprising the reflecting member is a movable mirror.

5. The distance measurement device according to claim 4, further comprising a lens part that is disposed on a common optical path of the projection light and the reflected light and is used for taking in the reflected light reflected by a distance measurement area.

6. The distance measurement device according to claim 5, wherein the lens part is disposed on the movable part.

7. The distance measurement device according to claim 4, wherein a relay lens is disposed between the light source and the beam splitter.

8. A distance measurement device comprising:
a fixed part;
a movable part that is movably disposed on the fixed part;
a light source that is disposed on the fixed part;
a photodetector that is disposed on the fixed part;
a beam splitter that is disposed on the fixed part and separates an optical path of projection light emitted from the light source from an optical path of reflected light reflected by a distance measurement area; and
a reflecting member that is disposed on the movable part, guides the projection light having passed through the beam splitter to the distance measurement area, and guides the reflected light reflected by the distance measurement area to the beam splitter;
wherein the reflecting member is a movable mirror,
the distance measurement device further includes an imaging lens that is disposed on an optical path of projection light from the light source to a distance measurement area and condenses reflected light of the projection light reflected by the distance measurement area on the photodetector, and
a through-hole passing through the imaging lens is formed in an area of the imaging lens through which the projection light passes.

9. The distance measurement device according to claim 8, wherein the imaging lens is disposed on the movable part.

10. The distance measurement device according to claim 8, wherein the imaging lens is disposed on a common optical path of the projection light and the reflected light.

11. The distance measurement device according to claim 8, wherein a collimator lens that converts the projection light emitted from the light source into parallel light is disposed between the light source and the beam splitter.

12. A distance measurement device comprising:
a fixed part;
a movable part that is movably disposed on the fixed part;
a light source that is disposed on the fixed part;
a photodetector that is disposed on the fixed part;
a beam splitter that is disposed on the fixed part and separates an optical path of projection light emitted from the light source from an optical path of reflected light reflected by a distance measurement area; and
a reflecting member that is disposed on the movable part, guides the projection light having passed through the beam splitter to the distance measurement area, and guides the reflected light reflected by the distance measurement area to the beam splitter;
wherein the reflecting member is a Fresnel lens mirror, and the Fresnel lens mirror condenses the reflected light reflected by the distance measurement area on the photodetector,
the Fresnel lens mirror is disposed so as to be inclined to a movable axis of the movable part by 45°,
a common optical path of the projection light and the reflected light is coaxial with the movable axis between the fixed part and the Fresnel lens mirror, and
the Fresnel lens mirror includes a first Fresnel lens part and a second Fresnel lens part, the first Fresnel lens part being disposed on a center part of the Fresnel lens mirror and converting the projection light into parallel lights, the second Fresnel lens part being disposed on a part of the Fresnel lens mirror outside the center part and condensing the reflected light onto the photodetector.

13. The distance measurement device according to claim 12, further comprising a condenser lens that converges the projection light emitted from the light source on a branch position of the common optical path at the beam splitter.

14. The distance measurement device according to claim 12, further comprising a relay lens is disposed between the light source and the beam splitter.

15. The distance measurement device according to claim 1, further comprising the reflecting member is a parabolic mirror, and the parabolic mirror condenses the reflected light reflected by the distance measurement area on the photodetector.

16. The distance measurement device according to claim 15, wherein a common optical path of the projection light and the reflected light is coaxial with a movable axis of the movable part between the fixed part and the parabolic mirror.

17. The distance measurement device according to claim 15, wherein a reflecting surface of the parabolic mirror includes a first concave surface part a second concave surface part, the first concave surface part converting the projection light into parallel light on a center part, and the second concave surface part for condensing the reflected light on the photodetector outside the center part.

18. The distance measurement device according to claim 15, further comprising a condenser lens that converges the projection light emitted from the light source on a branch position of the common optical path at the beam splitter.

19. The distance measurement device according to claim 15, further comprising a relay lens is disposed between the light source and the beam splitter.

* * * * *